(12) United States Patent
Osari et al.

(10) Patent No.: US 7,839,542 B2
(45) Date of Patent: Nov. 23, 2010

(54) IMAGE FORMING APPARATUS

(75) Inventors: Yoshihito Osari, Chuo-ku (JP); Michio Kawase, Abiko (JP); Noriyoshi Chizawa, Moriya (JP); Masashi Oyumi, Abiko (JP); Shigeo Hata, Toride (JP); Kiyoshi Okamoto, Moriya (JP)

(73) Assignee: Canon Kabushiki Kaisha (JP)

( * ) Notice: Subject to any disclaimer, the term of this patent is extended or adjusted under 35 U.S.C. 154(b) by 1052 days.

(21) Appl. No.: 11/470,212

(22) Filed: Sep. 5, 2006

(65) Prior Publication Data

US 2007/0053021 A1 Mar. 8, 2007

(30) Foreign Application Priority Data

Sep. 7, 2005 (JP) ............................ 2005-259780
Jul. 28, 2006 (JP) ............................ 2006-205676

(51) Int. Cl.
H04N 1/04 (2006.01)

(52) U.S. Cl. ............... 358/474; 358/1.13; 358/1.14; 358/400; 399/110; 399/401

(58) Field of Classification Search ............... 358/1.14, 358/498, 471, 474, 1.13, 400, 442, 1.5; 399/401, 399/71, 49, 55, 50, 110, 111, 121; 271/9.02, 271/9.11, 9.13
See application file for complete search history.

(56) References Cited

U.S. PATENT DOCUMENTS 5,781,823 A * 7/1998 Isobe et al. .................... 399/2

| | | | |
|---|---|---|---|
| 6,204,494 B1 * | 3/2001 | Chavez | 250/208.1 |
| 6,252,684 B1 * | 6/2001 | Lin | 358/498 |
| 6,308,027 B1 * | 10/2001 | Obu et al. | 399/110 |
| 6,400,472 B1 * | 6/2002 | Yoshimizu | 358/498 |
| 6,536,762 B1 * | 3/2003 | Sheng et al. | 271/273 |
| 6,628,433 B1 * | 9/2003 | Westcott et al. | 358/474 |
| 7,379,218 B1 * | 5/2008 | Terashima et al. | 358/498 |
| 2004/0196488 A1 * | 10/2004 | Tanaka et al. | 358/1.14 |

FOREIGN PATENT DOCUMENTS

| JP | 2-120870 A | 5/1990 |
|---|---|---|
| JP | 5-307281 A | 11/1993 |
| JP | 6-78083 A | 3/1994 |
| JP | 9-34511 A | 2/1997 |
| JP | 11292335 A | 10/1999 |
| JP | 2003-80804 A | 3/2003 |
| JP | 2004-93599 A | 3/2004 |

* cited by examiner

*Primary Examiner*—Negussie Worku
(74) *Attorney, Agent, or Firm*—Rossi, Kimms & McDowell LLP

(57) ABSTRACT

A plurality of subsystems having diverse individual functions can be connected to an image forming apparatus. Each of the subsystems is made up of, for example, plural kinds of units which are different in performance from each other. Each of the units has inherent information related to the performance, and decides the operation specification of the entire image forming apparatus according to the combination of those units.

9 Claims, 38 Drawing Sheets

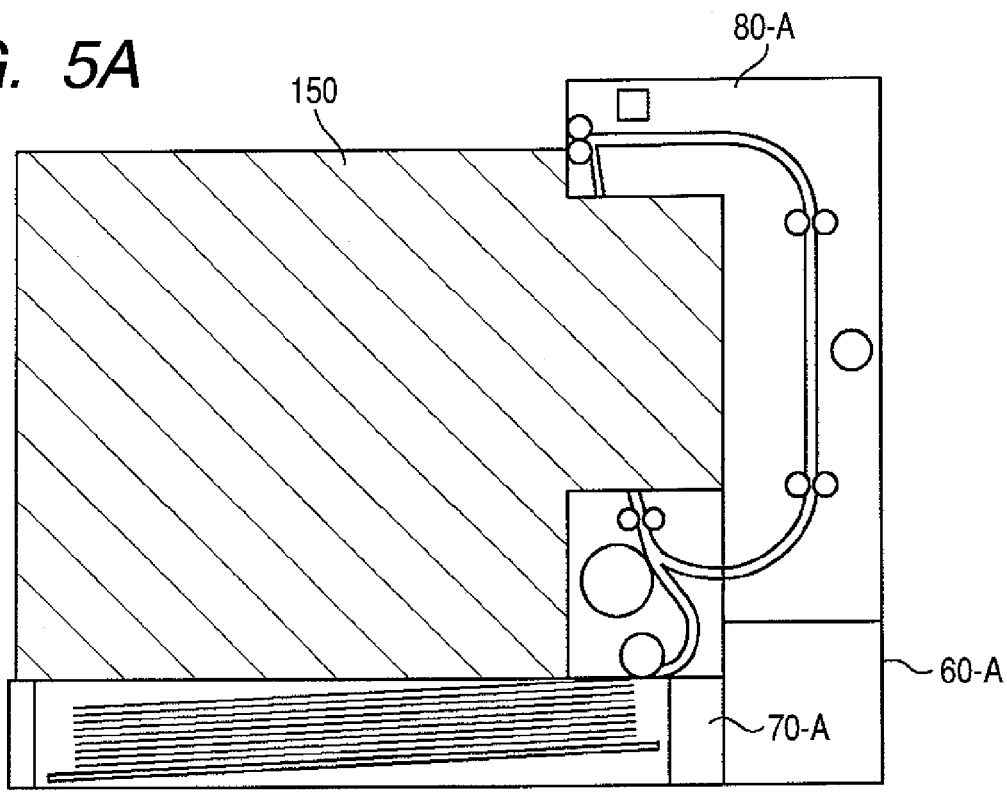
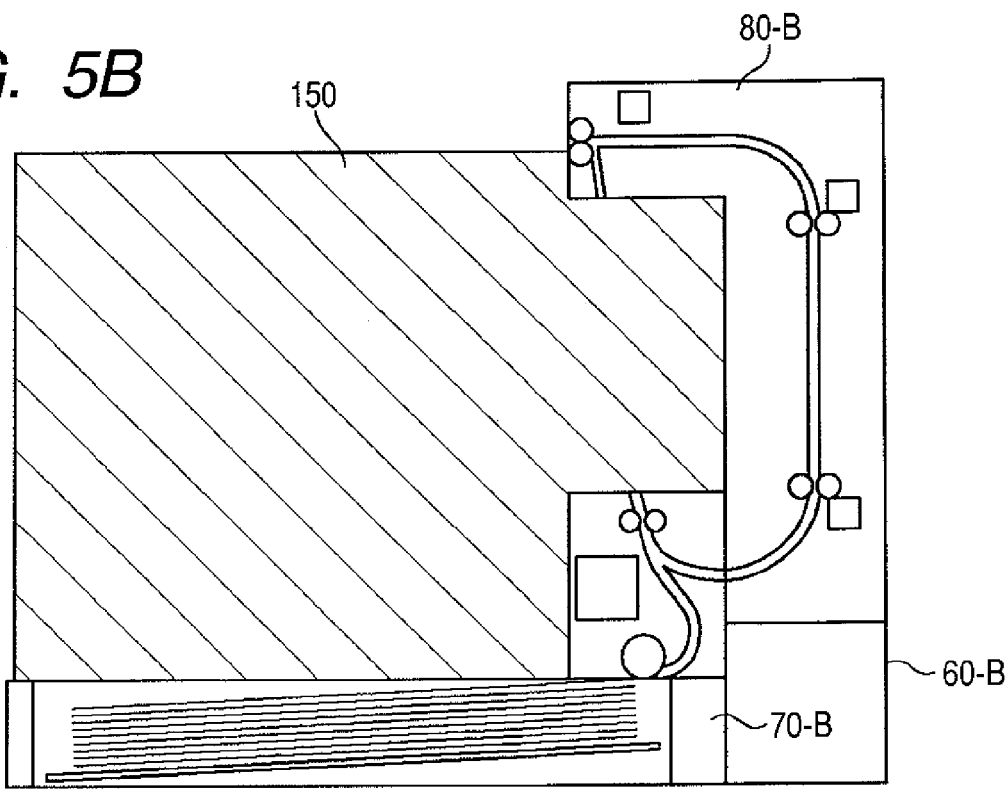

FIG. 20A
CONFIGURATION INFORMATION NOTICE FROM EACH UNIT (SUB SYSTEM)

701

| 1 | UNIT ID |
|---|---|
| 2 | PROCESS SPEED (ps) 1: X1 mm/sec |
| 3 | COLOR MODE AT ps1 (C/BW/common) |
| 4 | UNIT POWER CONSUMPTION AT ps1: x1 (W) |
| 5 | OPERABLE MATERIAL AT ps1: A |
| 6 | OPERABLE MATERIAL AT ps1: B |
| ⋮ | ⋮ |
| N | PROCESS SPEED (ps) 2: X2 mm/sec |
| N+1 | COLOR MODE AT ps2 (C/BW/common) |
| N+2 | UNIT POWER CONSUMPTION AT ps2: x2 (W) |
| N+3 | OPERABLE MATERIAL AT ps2: C |
| ⋮ | ⋮ |
| M | PROCESS SPEED (ps) 3: X3 mm/sec |
| M+1 | COLOR MODE AT ps3 (C/BW/common) |
| M+2 | UNIT POWER CONSUMPTION AT ps3: x3 (W) |
| M+3 | OPERABLE MATERIAL AT ps3: E |
| ⋮ | ⋮ |
| L | MINIMUM SHEET-TO-SHEET DISTANCE: Ymm |

FIG. 20B
AVAILABLE POWER NOTICE FROM POWER UNIT 90

702

| 1 | UNIT ID (POWER UNIT ID) |
|---|---|
| 2 | AVAILABLE POWER: TT (W) |
| 3 | POWER SYSTEM DATA (5v, 24v, etc) |

FIG. 20C
CONFIGURATION INFORMATION (UNIQUE PART) FROM IMAGE FORMING CONTROLLER 160

703

| 1 | ARCHITECTURE INFORMATION (4D, 1D COLOR, BW) |
|---|---|
| 2 | ITOP INTERVAL (COLOR) |
| 3 | ITOP → SECOND TRANSFER DISTANCE (COLOR) |

FIG. 21A

OPERATION INFORMATION NOTICE FROM PRINTER ENGINE CONTROLLER 105

704

| 1 | PROCESS SPEED (ps) 1: Z1 mm/sec |
|---|---|
| 2 | COLOR MODE AT ps1 (C/BW/common) |
| 3 | OPERABLE MATERIAL AT ps1: A |
| 4 | OPERABLE MATERIAL AT ps1: B |
| 5 | PPM AT ps1: XXppm |
| ⋮ | ⋮ |
| N | PROCESS SPEED (ps) 2: Z2 mm/sec |
| N+1 | COLOR MODE AT ps2 (C/BW/common) |
| N+2 | OPERABLE MATERIAL AT ps2: C |
| N+3 | PPM AT ps2: YYppm |
| ⋮ | ⋮ |
| M | PROCESS SPEED (ps) 3: Z3 mm/sec |
| M+1 | COLOR MODE AT ps3 (C/BW/common) |
| M+2 | OPERABLE MATERIAL AT ps3: D |
| M+3 | PPM AT ps3: ZZppm |
| ⋮ | ⋮ |
| L | NONCOMPLIANT MATERIAL 1: E |
| L+1 | COLOR MODE OF NONCOMPLIANT MATERIAL 1 |
| L+2 | NONCOMPLIANT MATERIAL 2: F |
| L+3 | COLOR MODE OF NONCOMPLIANT MATERIAL 2 |
| ⋮ | ⋮ |

FIG. 21B

POWER CONSUMPTION NOTICE FROM EACH UNIT

705

| 1 | UNIT ID |
|---|---|
| 2 | UNIT POWER CONSUMPTION: TT (W) |
| 3 | CONSUMED POWER SYSTEM DATA (5v, 24v, etc) |

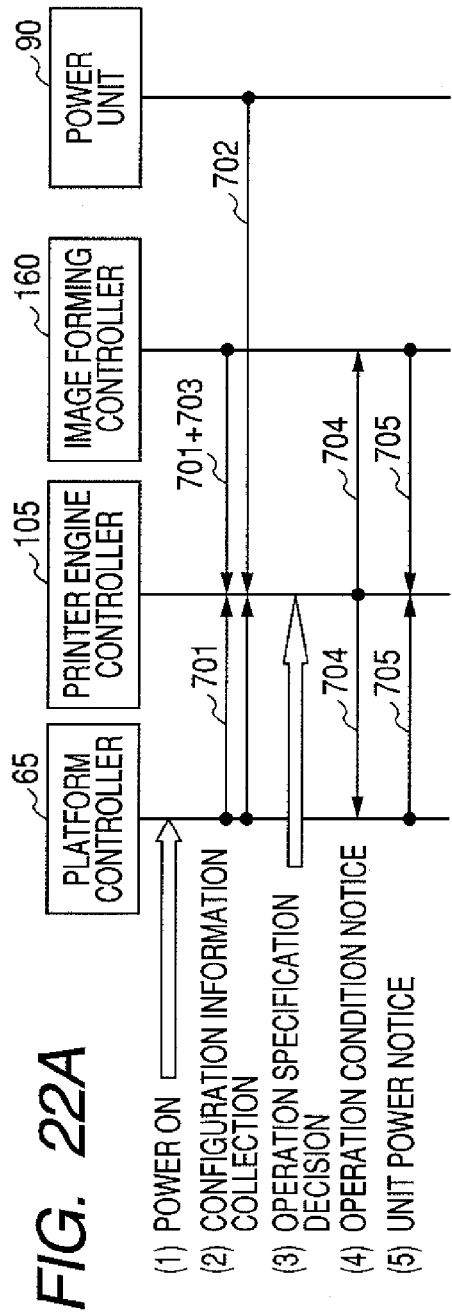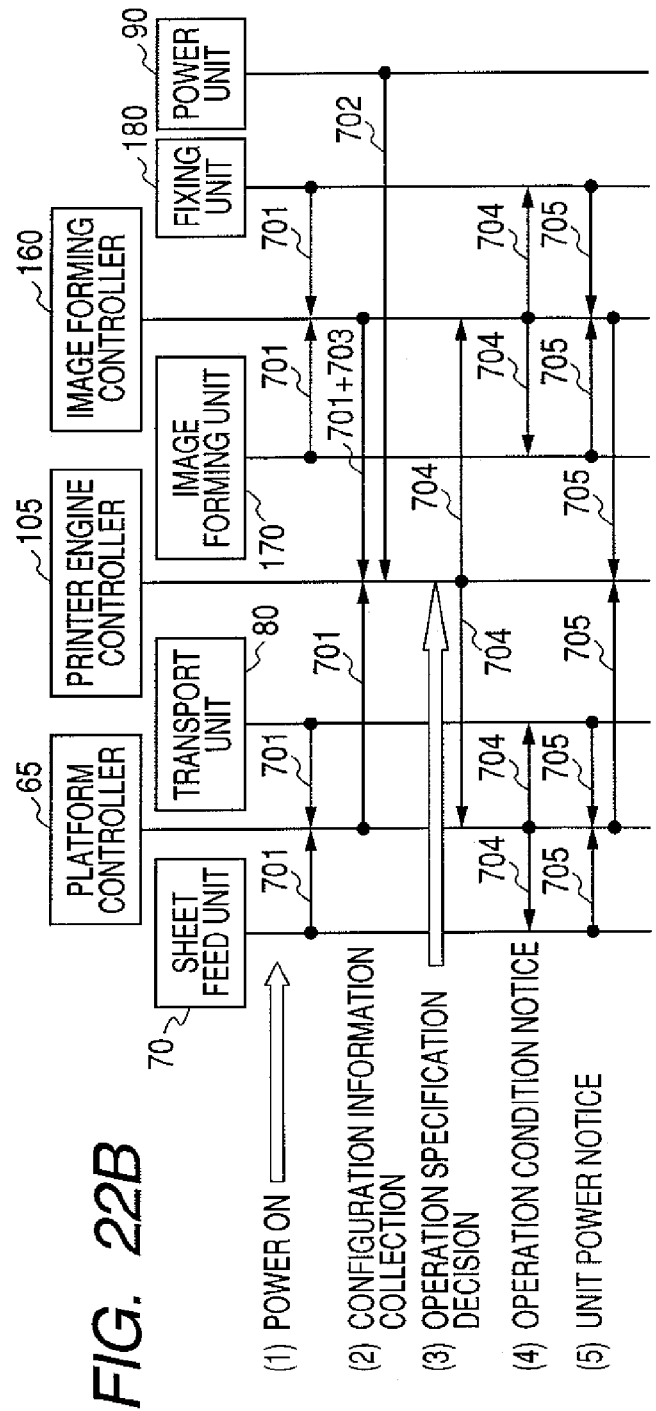

FIG. 23A
SHEET FEED REQUEST INFORMATION TO EACH UNIT (COMMON PART)

711

| | |
|---|---|
| 1 | COMMAND ID (SHEET FEED REQUEST) |
| 2 | PAGE ID |
| 3 | COLOR MODE |
| 4 | SHEET SIZE |
| 5 | MATERIAL INFORMATION |
| 6 | PRINT SURFACE (1ST, 2ND SURFACE) INFORMATION |

FIG. 23B
SHEET FEED REQUEST INFORMATION (UNIQUE PART) TO PLATFORM CONTROLLER 65

712

| | |
|---|---|
| 1 | SHEET FEED STAGE INFORMATION |
| 2 | SHEET DISCHARGE DIRECTION (REVERSE, STRAIGHT, BOTH-SIDE) |

FIG. 23C
SHEET FEED REQUEST Ack INFORMATION FROM PLATFORM CONTROLLER 65

713

| | |
|---|---|
| 1 | COMMAND ID (SHEET FEED REQUEST Ack) |
| 2 | PAGE ID |
| 3 | SHEET FEED STAGE INFORMATION |
| 4 | SHEET FEED STATUS (OK or NG) |
| 5 | NG FACTOR |

FIG. 23D
IMAGE FORMING REQUEST TO IMAGE FORMING CONTROLLER 160

714

| | |
|---|---|
| 1 | COMMAND ID (IMAGE FORMING REQUEST) |
| 2 | PAGE ID |
| 3 | COLOR MODE |

FIG. 23E
IMAGE FORMING OPERATION START NOTICE FROM IMAGE FORMING CONTROLLER 160

715

| | |
|---|---|
| 1 | COMMAND ID (IMAGE FORMING NOTICE) |
| 2 | PAGE ID |

FIG. 23F
IMAGE FORMING/SHEET TRANSPORT END NOTICE FROM PLATFORM CONTROLLER 65

716

| | |
|---|---|
| 1 | COMMAND ID (PAGE END NOTICE) |
| 2 | END STATUS (OK or NG) |
| 3 | NG FACTOR |

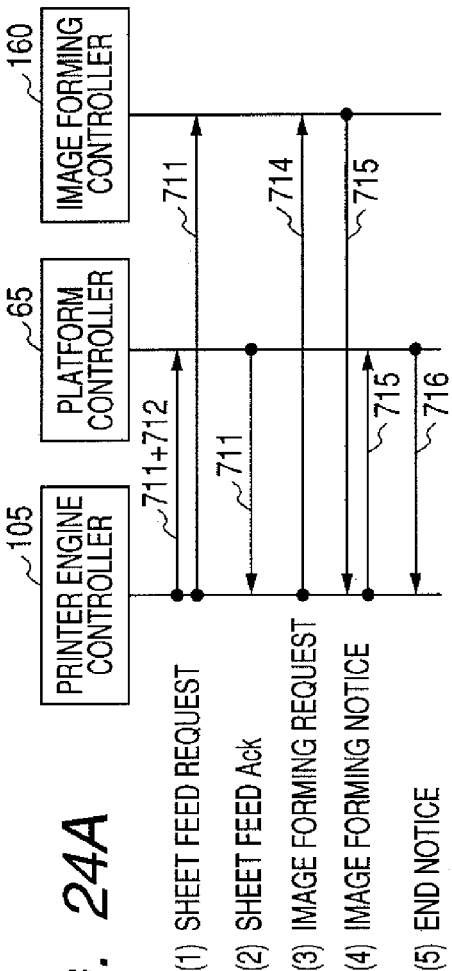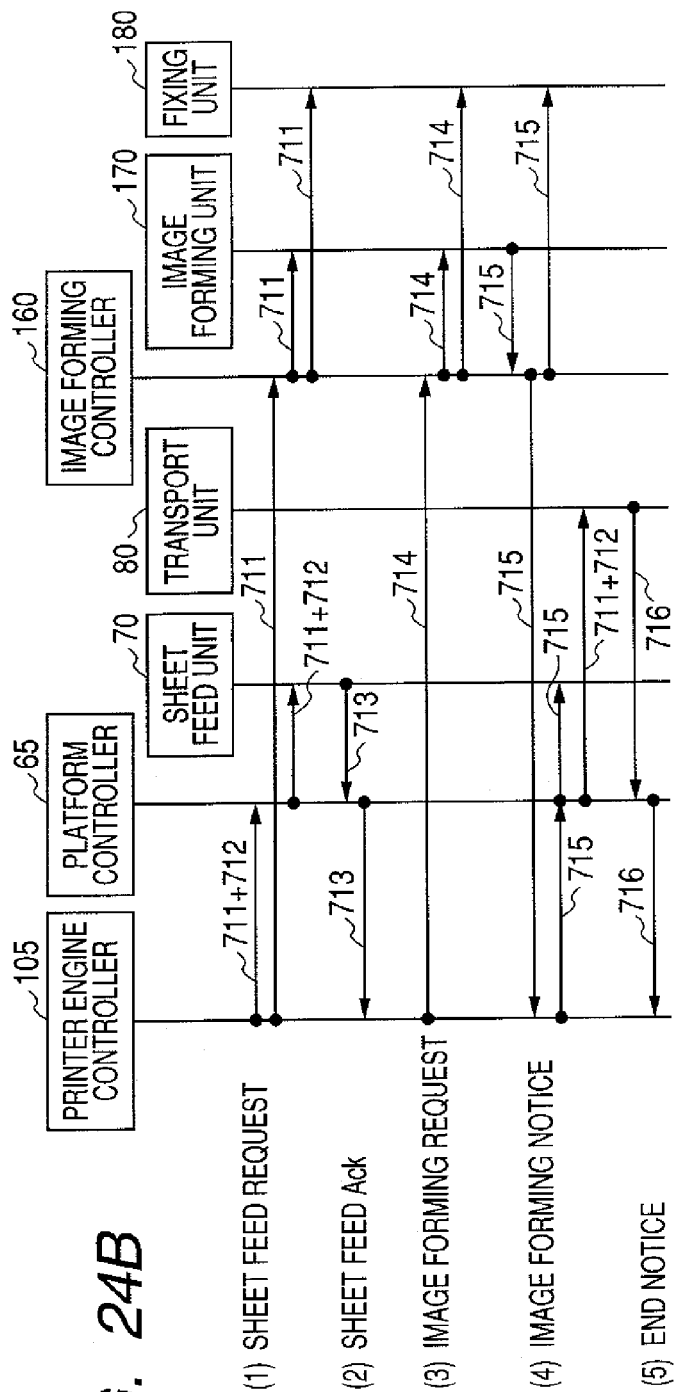

FIG. 25A

CONFIGURATION INFORMATION FROM IMAGE FORMING CONTROLLER 160

1750

| 1 | UNIT ID (0x160) |
|---|---|
| 2 | PROCESS SPEED (ps) 1: 180 mm/sec |
| 3 | COLOR MODE AT ps1: Color |
| 4 | UNIT POWER CONSUMPTION AT ps1: 800 (W) |
| 5 | OPERABLE MATERIAL AT ps1: NORMAL |
| 6 | OPERABLE MATERIAL AT ps1: RECYCLE PAPER |
| 7 | Continue marker |
| 8 | PROCESS SPEED (ps) 2: 90 mm/sec |
| 9 | COLOR MODE AT ps2: Color |
| 10 | UNIT POWER CONSUMPTION AT ps2: 600 (W) |
| 11 | OPERABLE MATERIAL AT ps2: THICK PAPER |
| 12 | OPERABLE MATERIAL AT ps2: OHT |
| 13 | Continue marker |
| 14 | PROCESS SPEED (ps) 3: 320 mm/sec |
| 15 | COLOR MODE AT ps3: BW |
| 16 | UNIT POWER CONSUMPTION AT ps3: 800 (W) |
| 17 | OPERABLE MATERIAL AT ps3: ALL |
| 18 | Continue marker |
| 19 | MINIMUM SHEET-TO-SHEET DISTANCE: 25 mm |
| 20 | MINIMUM TRANSPORT SPEED: 60 mm/sec |
| 21 | ARCHITECTURE INFORMATION: 4D |
| 22 | ITOP INTERVAL (COLOR): 100 mm |
| 23 | ITOP → SECOND TRANSFER DISTANCE: 432.3 mm |
| 24 | End marker |

FIG. 25B   CONFIGURATION INFORMATION FROM PLATFORM
           CONTROLLER 65

1751

| 1 | UNIT ID (0x065) |
|---|---|
| 2 | PROCESS SPEED (ps) 1: 350 mm/sec |
| 3 | COLOR MODE AT ps1: Common |
| 4 | UNIT POWER CONSUMPTION AT ps1: 300 (W) |
| 5 | OPERABLE MATERIAL AT ps1: ALL |
| 6 | MINIMUM SHEET-TO-SHEET DISTANCE: 25 mm |
| 7 | MINIMUM TRANSPORT SPEED: 70 mm/sec |
| 8 | End marker |

FIG. 25C   AVAILABLE POWER NOTICE FROM POWER UNIT 90

1752

| 1 | UNIT ID (0x90) |
|---|---|
| 2 | AVAILABLE POWER: 1200 (W) |
| 3 | POWER SYSTEM DATA: 3.3v, 5v, 24v |

FIG. 28A

IMAGE FORMING CONTROLLER 160 FULL COLOR LIST

1753 →

| MATERIAL: NORMAL |
|---|
| (ps) 1: 180 mm/sec |
| MATERIAL: RECYCLE PAPER |
| (ps) 1: 180 mm/sec |
| MATERIAL: THICK PAPER |
| (ps) 2: 90 mm/sec |
| MATERIAL: OHP |
| (ps) 2: 90 mm/sec |
| MINIMUM SHEET-TO-SHEET DISTANCE: 30 mm |
| MINIMUM TRANSPORT SPEED: 60 mm/sec |

FIG. 28B

MONOCHROME LIST

1754 →

| MATERIAL: ALL |
|---|
| (ps) 3: 250 mm/sec |
| MINIMUM SHEET-TO-SHEET DISTANCE: 30 mm |
| MINIMUM TRANSPORT SPEED: 60 mm/sec |

FIG. 28C

PLATFORM CONTROLLER 65

1755 →

| MATERIAL: ALL |
|---|
| Common |
| UPPER LIMIT: 350 mm/sec |
| LOWER LIMIT: 70 mm/sec |

FIG. 29A
OPERATION INFORMATION NOTICE FROM PRINTER ENGINE CONTROLLER 105

1756

| 1 | PROCESS SPEED (ps) 1: 180 mm/sec |
|---|---|
| 2 | COLOR MODE AT ps1: Color |
| 3 | OPERABLE MATERIAL AT ps1: NORMAL |
| 4 | OPERABLE MATERIAL AT ps1: RECYCLE PAPER |
| 5 | PPM AT ps1: 43.7 ppm |
| 7 | Continue marker |
| 8 | PROCESS SPEED (ps) 2: 90 mm/sec |
| 9 | COLOR MODE AT ps2: Color |
| 11 | OPERABLE MATERIAL AT ps2: THICK PAPER |
| 12 | OPERABLE MATERIAL AT ps2: OHT |
| 13 | PPM AT ps2: 21.8 ppm |
| 14 | Continue marker |
| 15 | PROCESS SPEED (ps) 3: 250 mm/sec |
| 16 | COLOR MODE AT ps3: BW |
| 17 | OPERABLE MATERIAL AT ps3: ALL |
| 18 | PPM AT ps3: 60.7 ppm |
| 19 | End marker |

FIG. 29B
POWER CONSUMPTION NOTICE FROM IMAGE FORMING CONTROLLER 160

1757

| 1 | UNIT ID (0x0160) |
|---|---|
| 2 | UNIT POWER CONSUMPTION: 800 (W) |
| 3 | CONSUMED POWER SYSTEM DATA (3.3v, 5v, 24v) |

FIG. 29C
POWER CONSUMPTION NOTICE FROM PLATFORM CONTROLLER 65

1758

| 1 | UNIT ID (0x0065) |
|---|---|
| 2 | UNIT POWER CONSUMPTION: 215 (W) |
| 3 | CONSUMED POWER SYSTEM DATA (3.3v, 5v, 24v) |

FIG. 30A — CONFIGURATION INFORMATION FROM IMAGE FORMING UNIT 170

| 1 | UNIT ID (0x170) |
|---|---|
| 2 | PROCESS SPEED (ps) 1: 130 mm/sec |
| 3 | COLOR MODE AT ps1: Color |
| 4 | UNIT POWER CONSUMPTION AT ps1: 300 (W) |
| 5 | OPERABLE MATERIAL AT ps1: ALL |
| 6 | Continue marker |
| 7 | PROCESS SPEED (ps) 2: 250 mm/sec |
| 8 | COLOR MODE AT ps2: BW |
| 9 | UNIT POWER CONSUMPTION AT ps2: 200 (W) |
| 10 | OPERABLE MATERIAL AT ps2: ALL |
| 11 | END OF Each ps marker |
| 12 | MINIMUM SHEET-TO-SHEET DISTANCE: 30 mm |
| 13 | MINIMUM TRANSPORT SPEED: 40 mm/sec |
| 14 | ARCHITECTURE INFORMATION: 4D |
| 15 | ITOP INTERVAL (COLOR): 100 mm |
| 16 | ITOP → SECOND TRANSFER DISTANCE: 432.3 mm |
| 17 | End marker |

FIG. 30B

CONFIGURATION INFORMATION FROM FIXING UNIT 180

1761

| 1 | UNIT ID (0x180) |
|---|---|
| 2 | PROCESS SPEED (ps) 1: 150 mm/sec |
| 3 | COLOR MODE AT ps1: Color |
| 4 | UNIT POWER CONSUMPTION AT ps1: 800 (W) |
| 5 | OPERABLE MATERIAL AT ps1: NORMAL |
| 6 | OPERABLE MATERIAL AT ps1: RECYCLE PAPER |
| 7 | Continue marker |
| 8 | PROCESS SPEED (ps) 2: 70 mm/sec |
| 9 | COLOR MODE AT ps2: Color |
| 10 | UNIT POWER CONSUMPTION AT ps2: 600 (W) |
| 11 | OPERABLE MATERIAL AT ps2: THICK PAPER |
| 12 | OPERABLE MATERIAL AT ps2: OHT |
| 13 | Continue marker |
| 14 | PROCESS SPEED (ps) 3: 300 mm/sec |
| 15 | COLOR MODE AT ps3: BW |
| 16 | UNIT POWER CONSUMPTION AT ps3: 800 (W) |
| 17 | OPERABLE MATERIAL AT ps3: ALL |
| 18 | END OF Each PS marker |
| 19 | MINIMUM SHEET-TO-SHEET DISTANCE: 45 mm |
| 20 | MINIMUM TRANSPORT SPEED: 50 mm/sec |
| 24 | End marker |

FIG. 33A
FULL COLOR LIST OF IMAGE FORMING UNIT 170

1762

| MATERIAL: ALL |
| --- |
| (ps) 1: 180 mm/sec |
| POWER CONSUMPTION AT ps1: 300 W |
| MINIMUM SHEET-TO-SHEET DISTANCE: 30 mm |
| MINIMUM TRANSPORT SPEED: 40 mm/sec |

FIG. 33B
MONOCHROME LIST

1763

| MATERIAL: ALL |
| --- |
| (ps) 2: 250 mm/sec |
| POWER CONSUMPTION AT ps2: 200 W |
| MINIMUM SHEET-TO-SHEET DISTANCE: 30 mm |
| MINIMUM TRANSPORT SPEED: 40 mm/sec |

FIG. 33C
FULL COLOR LIST OF FIXING UNIT 180

1764

| MATERIAL: NORMAL |
| --- |
| (ps) 1: 150 mm/sec |
| MATERIAL: RECYCLE PAPER |
| (ps) 1: 150 mm/sec |
| POWER CONSUMPTION AT ps1: 800 W |
| MATERIAL: THICK PAPER |
| (ps) 2: 70 mm/sec |
| MATERIAL: OHT |
| (ps) 2: 70 mm/sec |
| POWER CONSUMPTION AT ps2: 600 W |
| MINIMUM SHEET-TO-SHEET DISTANCE: 45 mm |
| MINIMUM TRANSPORT SPEED: 50 mm/sec |

FIG. 33D
MONOCHROME LIST

1765

| MATERIAL: ALL |
| --- |
| (ps) 3: 300 mm/sec |
| POWER CONSUMPTION AT ps3: 800 W |
| MINIMUM SHEET-TO-SHEET DISTANCE: 45 mm |
| MINIMUM TRANSPORT SPEED: 50 mm/sec |

FIG. 34

CONFIGURATION INFORMATION OF IMAGE FORMING CONTROLLER 160 TO BE SENT TO PRINTER ENGINE CONTROLLER 105

| 1 | UNIT ID (0x0160) |
|---|---|
| 2 | PROCESS SPEED (ps) 1: 13 mm/sec |
| 3 | COLOR MODE AT ps1: Color |
| 4 | POWER CONSUMPTION AT ps1: 1100 (W) |
| 5 | OPERABLE MATERIAL AT ps1: NORMAL |
| 7 | OPERABLE MATERIAL AT ps1: RECYCLE PAPER |
| 8 | Continue marker |
| 9 | PROCESS SPEED (ps) 2: 70 mm/sec |
| 10 | COLOR MODE AT ps2: Color |
| 11 | POWER CONSUMPTION AT ps2: 900 (W) |
| 12 | OPERABLE MATERIAL AT ps2: THICK PAPER |
| 13 | OPERABLE MATERIAL AT ps2: OHT |
| 14 | Continue marker |
| 15 | PROCESS SPEED (ps) 3: 250 mm/sec |
| 16 | COLOR MODE AT ps3: BW |
| 17 | POWER CONSUMPTION AT ps3: 1000 (W) |
| 18 | OPERABLE MATERIAL AT ps3: ALL |
| 19 | END OF Each PS marker |
| 20 | MINIMUM SHEET-TO-SHEET DISTANCE: 45 mm |
| 21 | MINIMUM TRANSPORT SPEED: 50 mm/sec |
| 22 | ARCHITECTURE INFORMATION: 4D |
| 23 | ITOP INTERVAL (COLOR): 100 mm |
| 24 | ITOP → SECOND TRANSFER DISTANCE: 432.3 mm |
| 25 | End marker |

1766

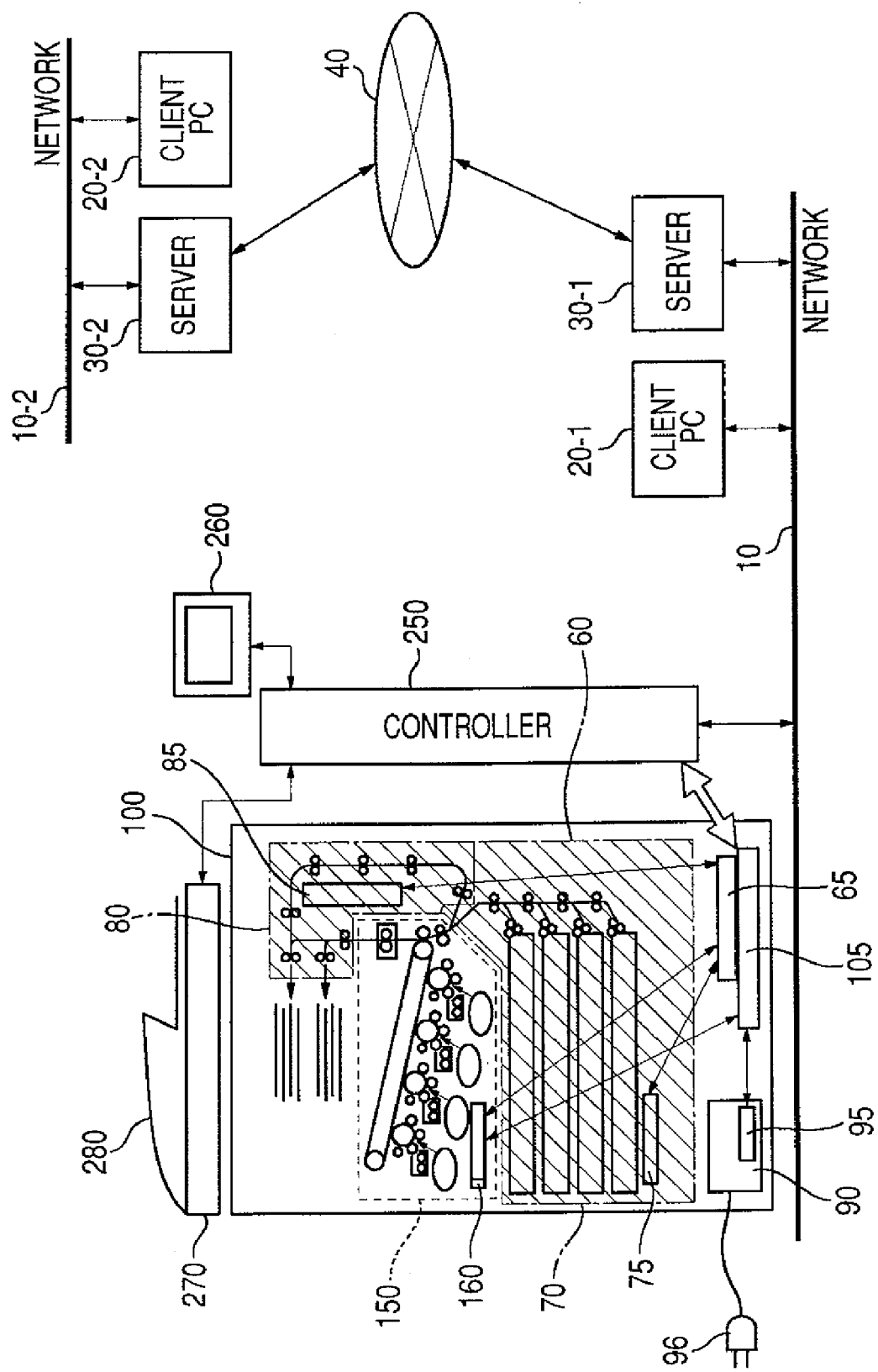

IMAGE FORMING APPARATUS

BACKGROUND OF THE INVENTION

1. Field of the Invention

This invention relates to an image forming apparatus which is capable of interchanging an engine, a sheet feed system, or a discharge system of the image forming apparatus.

2. Description of the Related Art

For an image forming apparatus such as a copying machine or a printer, there has been generally known image forming apparatuses that are capable of selectively making only a monochrome copy or both of the monochrome copy and a color copy depending on a user's demand.

There exists an image forming system having a structure in which a main body of the above-mentioned image forming apparatus is connected to another device to provide a function that matches an intended purpose in cooperation between the image forming apparatus and another device, which cannot be realized solely by the image forming apparatus.

JP-A-H11-292335 A discloses a copying machine having a structure in which an image reading device is connected to an image forming apparatus to copy a document image that has been read by the image reading device. Also, there has been proposed an image forming apparatus in which plural sheet feed units that also function as a base of the image forming apparatus are interchangeably stacked, which enables various device configurations of sheet feed devices and the like. In addition, there has been known an image forming apparatus that is connectable to a post-processing device (accessory) that sorts or staples for sorting recording sheets which have been printed by the image forming apparatus.

On the other hand, there have been proposed various image forming apparatuses having a structure in which a unit can be incorporated in the apparatus. For example, for an image forming apparatus of the standard specification which suppresses the functions of the apparatus main body to the minimum, there has also been proposed a device configuration in which a duplex transport unit reverses a recording sheet that has been printed in order to newly perform duplex printing can be incorporated into the image forming apparatus. There has been known the image forming apparatus in which part of units within the apparatus are detachably attached to the apparatus as described above, thereby matching the intended purpose of the user.

Up to now, the user selects an image forming apparatus that realizes a desired function or performance (monochrome, color, the number of sheets outputted per minute, or the like), or the usability (size or discharge position) from diverse line-ups. In addition, in the case where the user demands a function or performance (duplex, sort, or stable) which cannot be obtained solely by the selected image forming apparatus, the user selects the device configuration in such a manner that the image formation apparatus is combined with the above-mentioned incorporatable accessories, diverse devices, or diverse units so as to utilize the desired function or performance. Then, the image forming apparatus operates in cooperation with the connected accessories, diverse devices, or diverse units, thereby making it possible to conduct a diversity of operation. As a result, various conveniences are supplied to the user.

However, in the conventional image forming apparatus, device designing is performed while simulating the merchantability of the device configuration or the accessory configuration so that a large majority of users are capable of using the device in an optimum state. As a result, the device configuration does not flexibly meet the wishes of the individual users.

That is, because the conventional image forming apparatus is so configured as to conduct the system operation in cooperation with the accessories, the diverse devices, or the diverse units, the conventional image forming apparatus conducts nothing other than the operation depending on the operation mode, the function, or the performance which can be conducted in the above-mentioned structure. Therefore, for example, in the case where the sheet feed unit or the accessory is connected to the image forming apparatus, the operation performance of the entire device may be limited depending on the combination of the performance and the function of the image forming apparatus. Also, the operation performance of the entire image forming apparatus is also decided according to the configuration of an image forming unit, a sheet feed unit, or a sheet transport unit within the image forming apparatus. As a result, there is a case in which the image forming apparatus cannot sufficiently meet the functions that are demanded by the individual users.

SUMMARY OF THE INVENTION

In view of the above-mentioned circumstances, an object of the present invention is to solve at least one of the above-mentioned problems and other problems. Other problems can be understood throughout the overall specification.

According to one aspect of the present invention, it is characterized in an image forming apparatus which is capable of detachably mounting and supporting; an image forming subsystem which is interchangeable and has an image bearing member, exposure means, charging means, and developing means; and a sheet transport subsystem which is interchangeable and transports the sheet material within the image forming apparatus, said apparatus comprising: a deciding unit which decides an operation specification of the image forming apparatus, wherein the image forming apparatus is capable of attaching the image forming subsystem that is different in performance and the sheet transport subsystem that is different in specification, and wherein the deciding unit decides the operation specification of the image forming apparatus according to the inherent information of the attached image forming subsystem and sheet transport system.

According to the present invention, the operation of the entire device is capable of flexibly meeting the demands of the individual users.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 5A and 5B are cross-sectional views showing an interchange configuration example of a sheet transport platform, respectively.

FIGS. 20A, 20B, and 20C are diagrams showing parameters of a configuration communication when a power is on, respectively.

FIGS. 21A and 21B are diagrams showing parameters of a configuration communication when the power is on, respectively.

FIGS. 22A and 22B are diagrams showing details of a command sequence in configuration information when the power is on, respectively.

FIGS. 23A, 23B, 23C, 23D, 23E and 23F are explanatory diagrams showing communication parameters in conducting image forming operation, respectively.

FIGS. 24A and 24B are explanatory diagrams of a communication command sequence in conducting the image forming operation, respectively.

FIGS. 25A, 25B, and 25C are diagrams showing specific examples of inherent information of the image forming sub-system, a platform, and a power unit, respectively.

FIGS. 28A, 28B, and 28C are diagrams for explaining an example of the process for deciding the operation specification in the respective parameters, and its results, respectively.

FIGS. 29A, 29B, and 29C are diagrams for explaining the example of the process for deciding the operation specification in the respective parameters, and its results, respectively.

FIGS. 30A and 30B are diagrams showing specific examples of inherent information of an image forming unit and a fixing unit, respectively.

FIGS. 33A, 33B, 33C and 33D are diagrams for explaining an example of deciding inherent information data of an image forming controller, and its results, respectively.

FIG. 34 is a diagram for explaining an example of deciding the inherent information data of the image forming controller, and its results, respectively.

FIG. 35 is a schematic diagram showing an overall hardware configuration of an image forming apparatus according to a second embodiment of the present invention.

DESCRIPTION OF THE EMBODIMENTS

Preferred embodiments of the present invention will now be described in detail in accordance with the accompanying drawings. Note that, the following embodiments do not limit the present invention pertained to the scopes of claims, and all of the combination of the features described in the following embodiments are not always essential to the solving means of the present invention.

Hardware Configuration According to First Embodiment

<Overall Structure>

Figure 1:
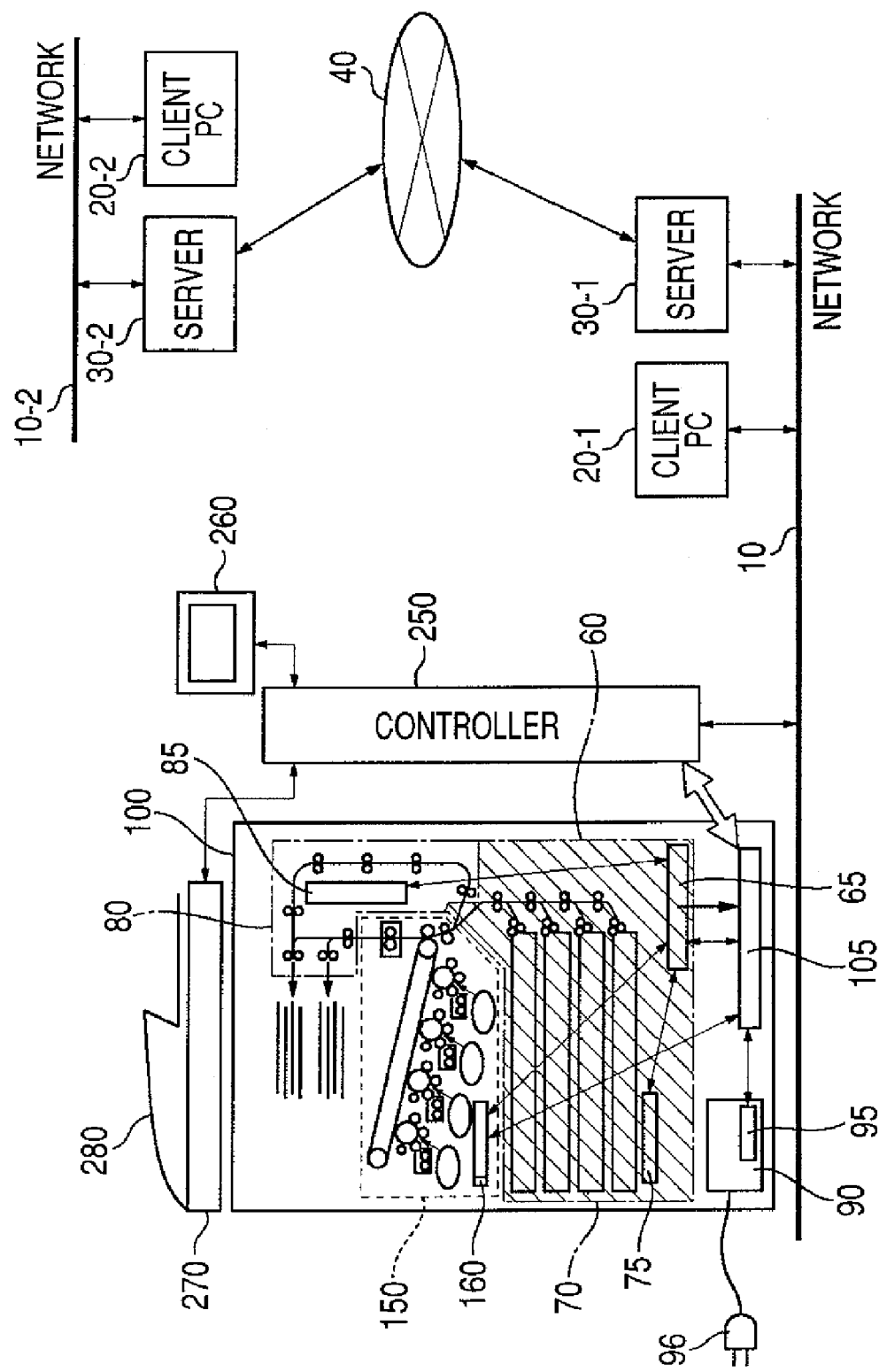
FIG. 1 is a schematic diagram showing an overall hardware configuration of an image forming apparatus according to a first embodiment of the present invention.

FIG. 1 is a schematic diagram showing the overall hardware configuration of an image forming apparatus according to a first embodiment of the present invention.

The image forming apparatus according to this embodiment is directed to a multiple function printer (MFP) that includes an electrophotographic printer unit 100, and functions as a printer that receives data from a scanner, a facsimile machine, a copying machine, or a personal computer (PC), and prints the data. Also, the printer unit has a color printing function of an intermediate transfer system having a photosensitive body.

Referring to FIG. 1, reference numeral 260 denotes an operation portion that is used to instruct a printing condition or to conduct a maintenance operation by a serviceman. When a print start key (not shown) in the operation portion 260 is depressed, the reading operation of a document image starts, and a desired device operation such as the printing operation of the printer engine or the transmitting operation of the document image starts.

The printer engine 100 functions as the backbone for the printing operation of the image forming apparatus, and the printer engine 100 converts the document image into image information and prints out the image information. The printer engine 100 is equipped with a sheet transport subsystem (hereinafter referred to as "sheet transport platform") 60, and an image forming subsystem 150. Also, the sheet transport platform 60 is equipped with a sheet feed unit 70 and a transport unit 80. The printer engine 100 is also equipped with a power unit 90.

Also, a document feed device 280 feeds a setup document onto a reading position of an image reading device 270. The image data of the document that has been fed onto the reading position of the image reading device 270 is converted into image information by the image reading device 270, and then transmitted to a controller 250. The image information is subjected to a desired process by the controller 250, and then transmitted to the printer engine 100. The image information on the read document image is printed by the printer engine 100 to realize a function of copying the document image.

Also, the document image is converted into the image information by the image reading device 270 and then transmitted to the controller 250. The document image is then stored in memory means within a server 30-1 from the controller 250 via a network 10. The image information is transmitted to a client PC 20-1 from the server 30-1. After a user has stored desired image information in a memory unit within the client PC 20-1, the user is capable of using the image information that has been received by the user per se.

Also, when the destination address of an electric mail is designated as a destination, it is possible that the image information is transmitted to a server 30-2 which is the address of a desired destination from the server 30-1 via an internet network 40, and then stored in a memory unit within the server 30-2. The image information that is stored in the destination server 30-2 is transmitted to a client PC 20-2, the image information is stored in a memory unit of the client PC 20-2, and the image information can be used even in the destination client PC 20-2.

On the contrary, it is possible that the image information is transmitted to the printer engine 100 from the client PCs 20-1 and 20-2 each of which is connected to the network 10 or 10-2 through the controller 250, and an output image is printed by the printer engine 100.

In this embodiment, the image forming subsystem 150 that mainly conducts the image formation is interchangeably configured, to thereby supply diverse advantages to the user and the serviceman.

<Interchange Structural Example of Image Forming Subsystem>

In this embodiment, the image forming subsystem 150 that mainly conducts the image formation is interchangeably configured, to thereby supply the following diverse advantages to the user and the serviceman. Hereinafter, as the interchange structural example of the image forming subsystem, the configuration examples of three kinds of printer engines 100 which are different in the performance will be described with reference to FIGS. 2, 3, and 4.

Figure 2:
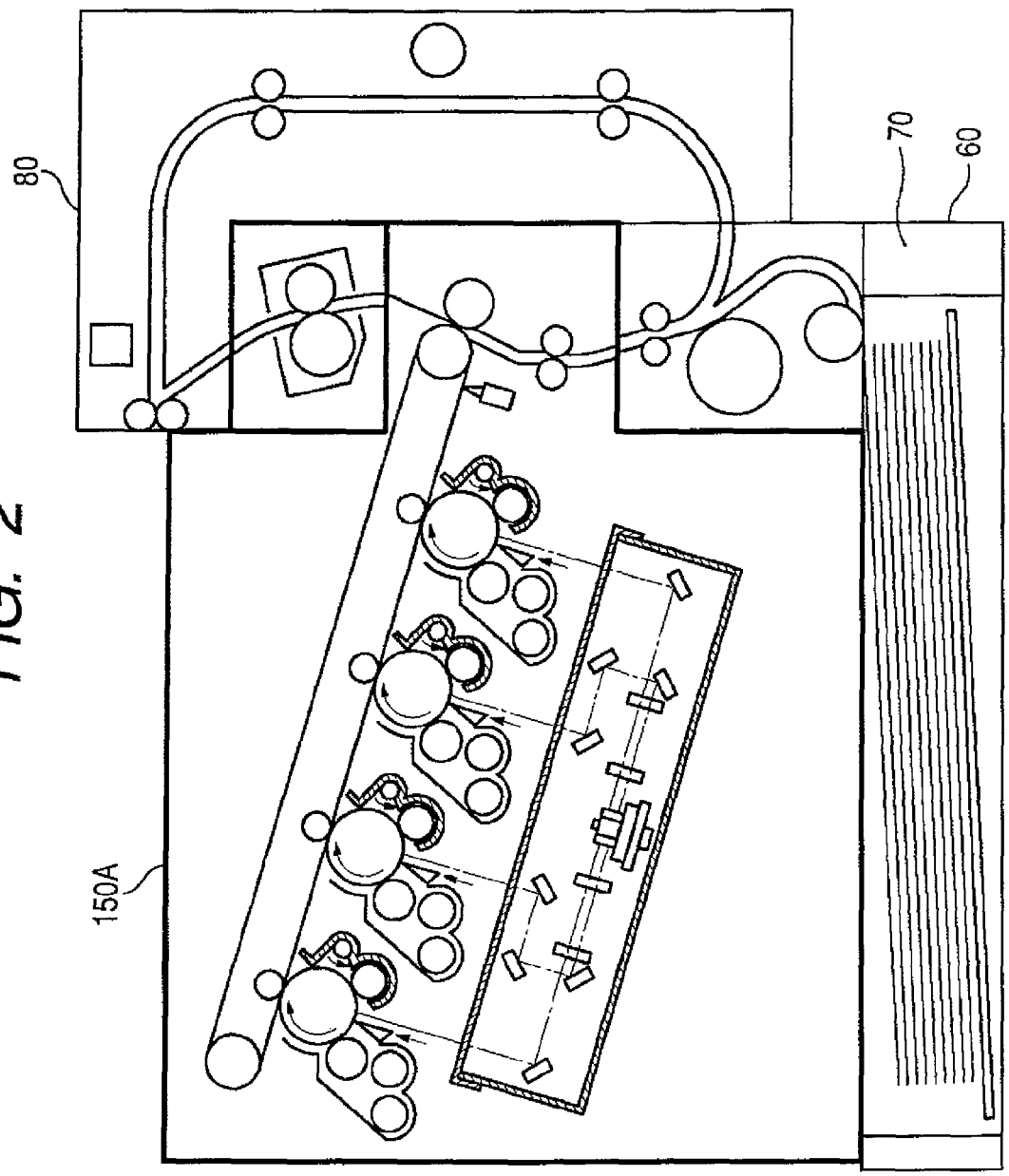
FIG. 2 is a cross sectional view showing a first example of an interchange configuration of an image forming sub-system.

FIG. 2 is a cross-sectional view showing a first example of a structure in which the image forming subsystem 150 is interchanged. This example is directed to a structural example of the color printer engine 100 in the case where a color image forming subsystem 150A of a four-drum system (hereinafter referred to as "4D system") having four photosensitive drums is incorporated into the color printer engine 100 as the image forming subsystem 150. The color image forming subsystem 150A includes four photosensitive drums, exposure means, charging means, and developing means, which constitute image bearing members.

The above-mentioned configuration is particularly suitable for high-productivity color image formation, and may be intended for an office or intended for light printing. Also, the image forming subsystem 150A may be designed in such a manner that diverse image forming subsystems 150 such as an image forming subsystem having the productivity of 20 sheets per minute on the basis of color printing of A4 size, or an image forming subsystem having the productivity of 70 sheets per minute on the basis of color printing can be incorporated into the printer engine 100 according to the user's demand.

Figure 3:
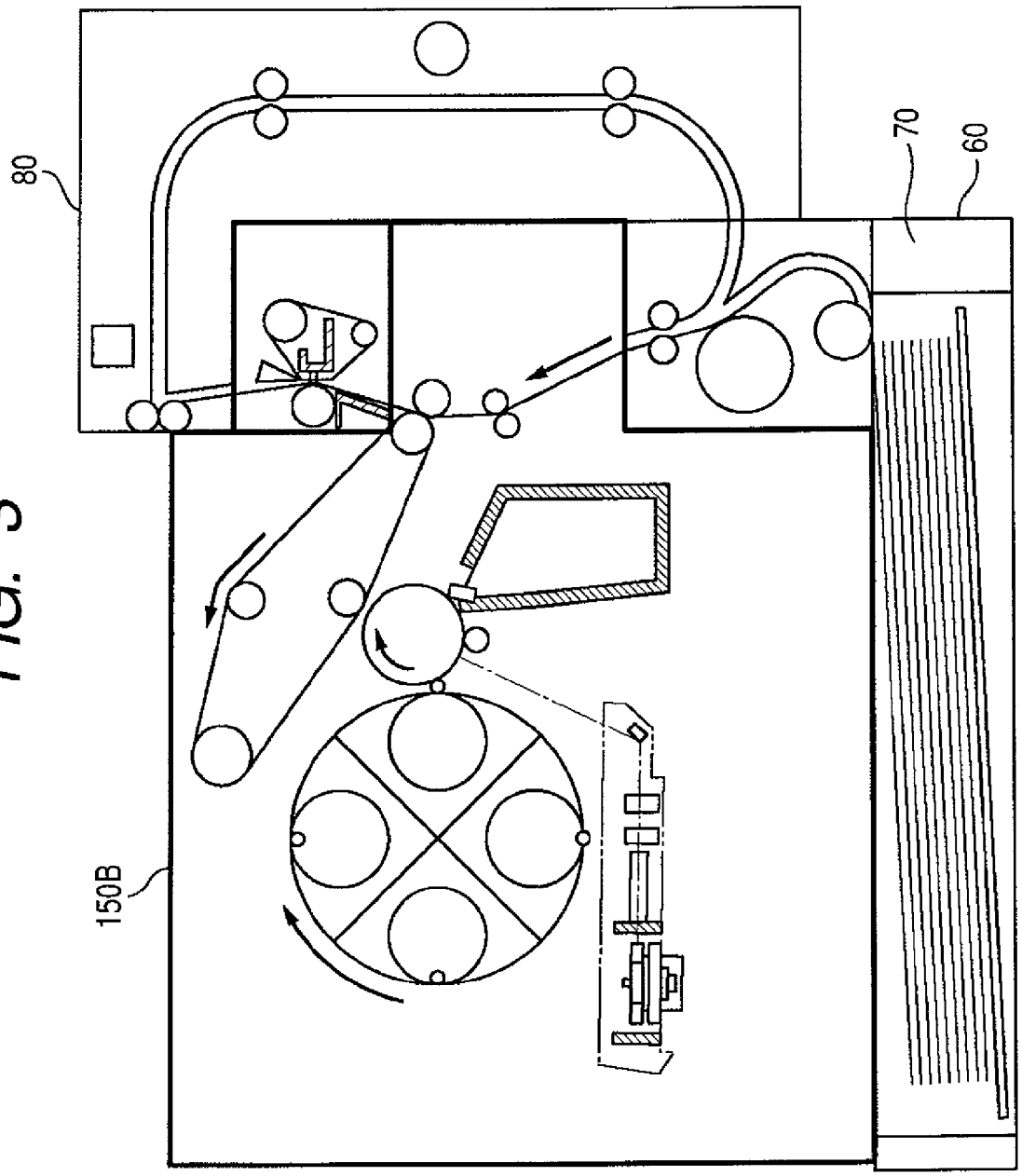
FIG. 3 is a cross-sectional view showing a second example of the interchange configuration of the image forming sub-system.

FIG. 3 is a structural example of the color printer engine 100 in the case where a color image forming subsystem 150B of a one-drum system having one photosensitive drum is incorporated into the printer engine 100, as the image forming subsystem 150. The color image forming subsystem 150B includes one photosensitive drum, exposure means, charging means, and developing means which constitute image bearing members.

The above-mentioned structure is suitable for color image formation intended for high image quality such as a printing sheet photographic document or a graphic design field. Diverse image forming subsystems 150 such as an image forming subsystem that is different in the print resolution such as 400 dpi, 600 dpi, or 1200 dpi, or an image forming subsystem that are rich in the kind of toner to be used in printing or the kind of printable transfer materials can be incorporated into the printer engine 100 according to the user's demand.

Figure 4:
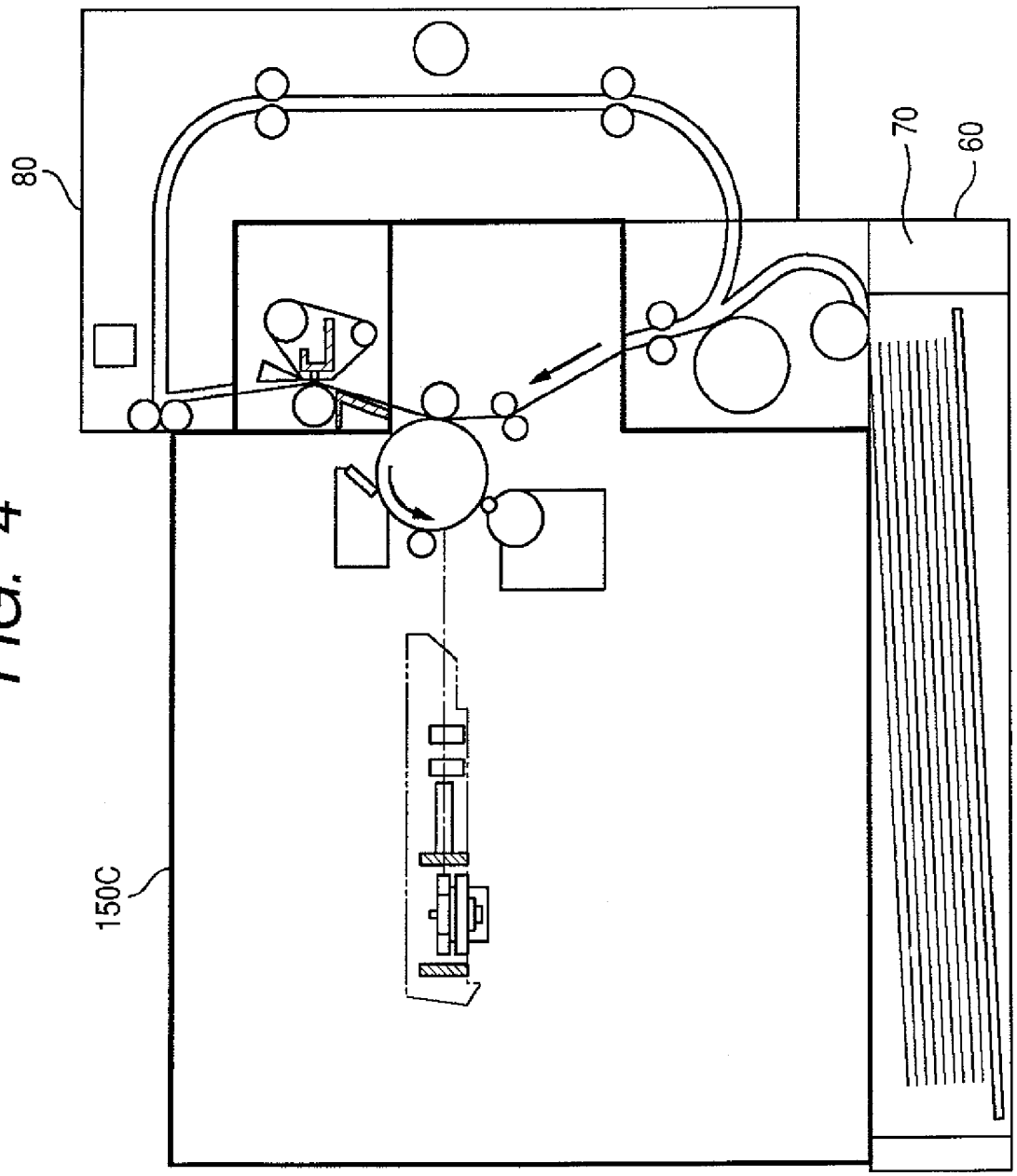
FIG. 4 is a cross-sectional view showing a third example of the interchange configuration of the image forming sub-system.

FIG. 4 is a structural example of a monochrome printer engine 100 into which a monochrome image forming subsystem 150C of the one-drum system having one photosensitive drum is incorporated, as the image forming subsystem 150. The color image forming subsystem 150C includes one photosensitive drum, exposure means, charging means, and developing means which constitute image bearing members. The above-mentioned configuration may be particularly intended for an office or intended for light printing. The image forming subsystem 150C may be designed in such a manner that diverse image forming subsystems 150 having the productivity of 20 sheets per minute on the basis of monochrome printing of A4 size, or having the productivity of 7,100 sheets per minute on the basis of monochrome printing can be incorporated into the printer engine 100 according to the user's demand.

The sheet transport platform 60 that conducts the sheet transport function is so configured as to be interchangeable with the diverse sheet transport platforms, thereby making it possible to provide a larger number of production lineups.

<Interchange Structural Example of Sheet Transport Platform 60>

FIGS. 5A and 5B are cross-sectional views showing a configuration in which sheet feed units 70-A and 70-B and transport units 80-A and 80-B are incorporated into the sheet transport platforms 60. The sheet transport platform 60 is loaded in the printer engine 100. FIGS. 5A and 5B show one sheet transport platform 60 into which a sheet feed unit 70-A and a transport unit 80-A are incorporated, and another sheet transport platform 60 into which a sheet feed unit 70-B and a transport unit 80-B are incorporated, which are different in the specifications from each other. However, the combination of the units is not limited to the above-mentioned structure, and the sheet feed unit 70 and the transport unit 80 are appropriately combined together and incorporated into the sheet transport platform 60 according to the intended purpose and the specification which are required for the product. A platform controller 65 recognizes the incorporated unit or communicates with the unit to collect control information according to the incorporated unit. The platform controller 65 then transfers the control information based on the incorporated unit with respect to a printer engine controller 105, and entirely controls the sheet transport platform 60 on the basis of the control specification that is decided by the printer engine controller 105 which constitutes a controller.

A structural example of two kinds of printer engines 100 will be described as the interchange structural example of the sheet transport platform 60 with reference to FIGS. 5A and 5B. In other words, a description will be given of the structural examples of two kinds of printer engines 100 in the case where the image forming subsystem 150 is identical, but the transport unit 80 and the sheet feed unit 70 which are installed in the sheet transport platform 60 installed within the printer engine 100 are interchanged.

As shown in FIG. 5A, a type having a sheet feed unit 70-A and a transport unit 80-A within a sheet transport platform 60-A as shown in FIG. 5A, and a type having a sheet feed unit 70-B and a transport unit 80-B within a sheet transport platform 60-B, as a high speed type, as shown in FIG. 5B are combined with the image forming subsystem 150, respectively.

The sheet feed units and the transport units in the sheet transport plat forms 60 are positioned as the sheet transport platform 60-A of the low speed type or the sheet transport platform 60-B of the high speed type.

When any one of the sheet transport platforms 60-A and 60-B shown in FIGS. 5A and 5B is selected as the sheet transport platform 60 related to the sheet transport, the sheet transport platform is selected according to the user's use which is a factor other than the image formation such as the transform performance, the productivity, or the durability. Also, the sheet transport platform is combined with the image forming subsystem 150 that meets the image quality or the specification which is demanded by the user while being compared with the features related to the image formation of the image forming subsystem 150, to thereby make it possible to selectively constitute the printer engine 100.

<Hardware Configuration of Sheet Feed Unit 70 and Transport Unit 80>

Subsequently, a description will be given of the sheet feed unit 70 and the transport unit 80 within the sheet transport platform 60.

Figure 6A:
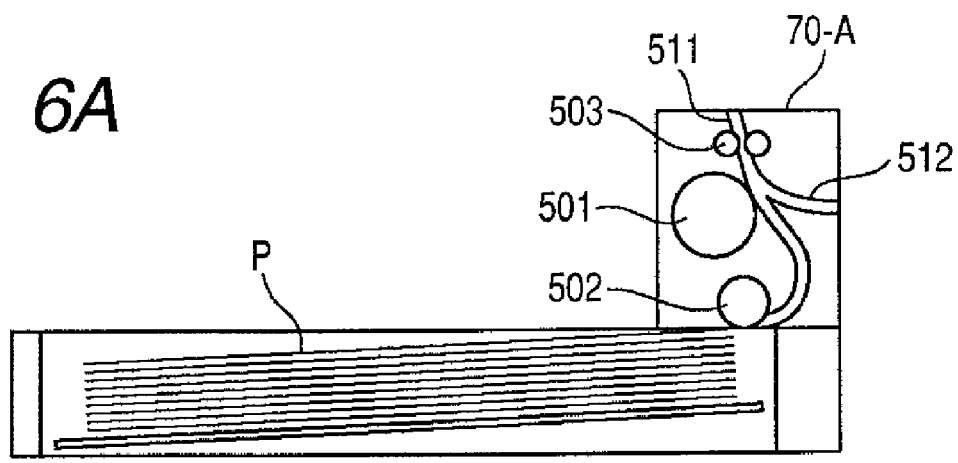
FIGS. 6A and 6B are cross-sectional views showing a general configuration of a sheet feed unit, respectively.
Figure 6B:
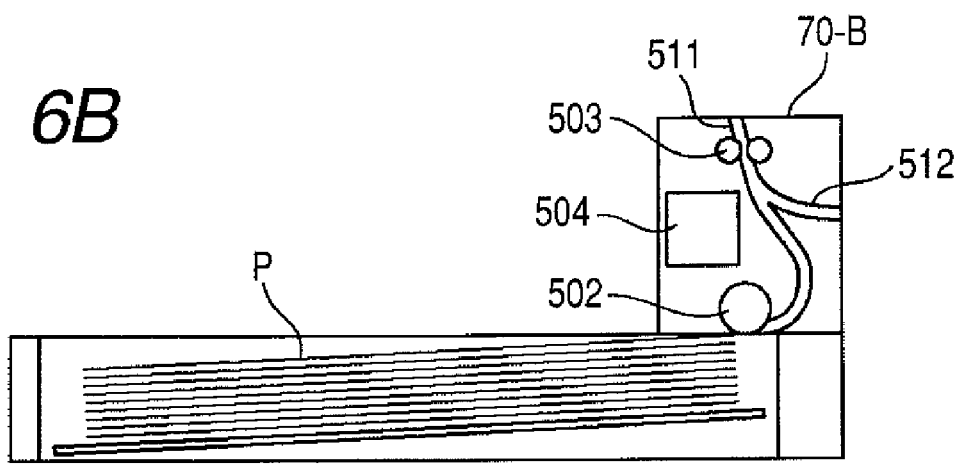

FIGS. 6A and 6B are cross-sectional views showing the general structure of the sheet feed unit 70, respectively.

Plural kinds of sheet feed units 70 which are different in the performance from each other are interchangeably connected to the sheet transport platform 60. The sheet feed units different in the plural kinds of performances will be described with reference to a sheet feed unit 70-A intended for a low speed sheet feed and a sheet feed unit 70-B intended for a high speed sheet feed.

In the sheet feed unit 70-A intended for the low speed sheet feed shown in FIG. 6A, reference symbol P denotes a transfer material, 501 a DC brushless motor, 502 a pickup roller that is rotationally driven by the DC brushless motor 501, 503 a transport roller that is rotationally driven by the DC brushless motor 501, 511 a sheet feed path, and 512 a sheet refeed path.

The sheet feed unit 70-A is controlled by the platform controller 65 or a sheet feed unit controller (not shown) within the sheet feed unit. The DC brushless motor 501 rotates at a given speed. In the sheet feed operation, the pickup roller 502 is abutted against or apart from the transfer material P by means of a solenoid (not shown) at a given timing under the control.

The transfer material P is stored in the sheet feed cassette 505, and abutted against the pickup roller 502 that is driven by the DC brushless motor 501 so as to be picked up. The transfer material P is then transported to the sheet feed path 511, and transported by the transport roller 503 in the sheet feed path 511 so as to be transported to the image forming subsystem 150 at a given speed. The transfer sheet P that has been again fed from the transport unit 80 passes through the sheet refeed path 512, and is transported by the transport roller 503 in the sheet feed path 511 so as to be transported to the image forming subsystem 150.

In the sheet feed unit 70-B intended for the high speed sheet feed shown in FIG. 6B, reference numeral 504 denotes a stepping motor that drives the pickup roller 502 and the transport roller 503. The sheet feed unit 70-B is controlled by the platform controller 65 or a sheet feed unit controller (not shown) within the sheet feed unit. The stepping motor 504 rotates at a given speed that is variably controlled. In the sheet feed operation, the pickup roller 502 is abutted against or apart from the transfer material P by means of a solenoid (not shown) at a given timing under the control.

The transfer material P is stored in the sheet feed cassette 505, and abutted against the pickup roller that is driven by the stepping motor 504 so as to be picked up. The transfer material P is then transported to the sheet feed path 511, and transported by the transport roller 503 in the sheet feed path 511 so as to be transported to the image forming subsystem 150 at a given speed.

The transfer sheet P that has been again fed from the transport unit 80 passes through the sheet refeed path 512, and is transported by the transport roller 503 in the sheet feed path 511 so as to be transported to the image forming subsystem 150. In this case, the transport speed of the transfer material P is variable according to the rotating speed of the stepping motor 504 which is variably controlled, with the result that the transport speed of the transfer material and intervals between the plural transfer materials which are continuously fed can be controlled at a multiple stage over a wide range.

In this example, the configuration of one sheet feed stage is described as the sheet feed unit 70. However, the configuration is not limited to the above-mentioned configuration, but plural sheet feed stages are coupled or connected at multiple stages, thereby making it possible to feed plural kinds of transfer materials or plural sizes of transfer materials as known up to now.

Figure 7A:
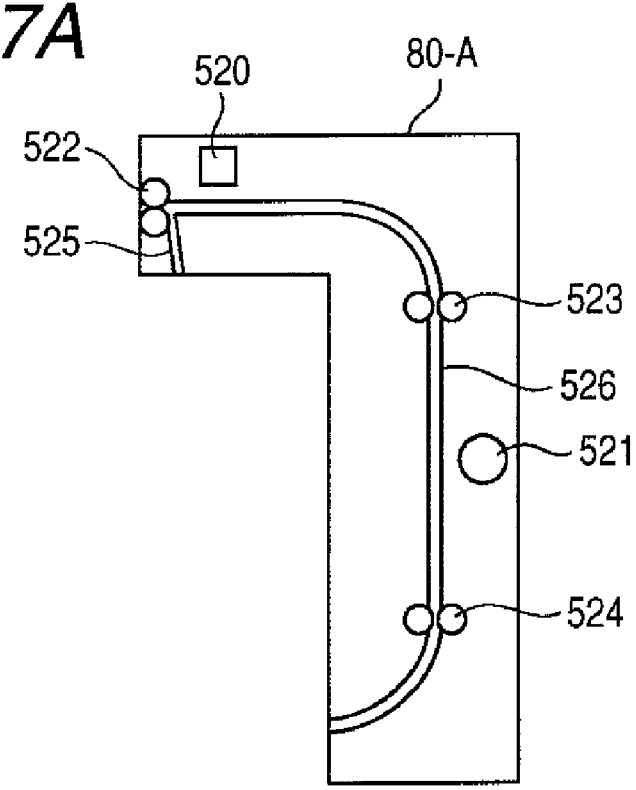
FIGS. 7A and 7B are cross-sectional views showing a general configuration of a sheet transport unit, respectively.
Figure 7B:
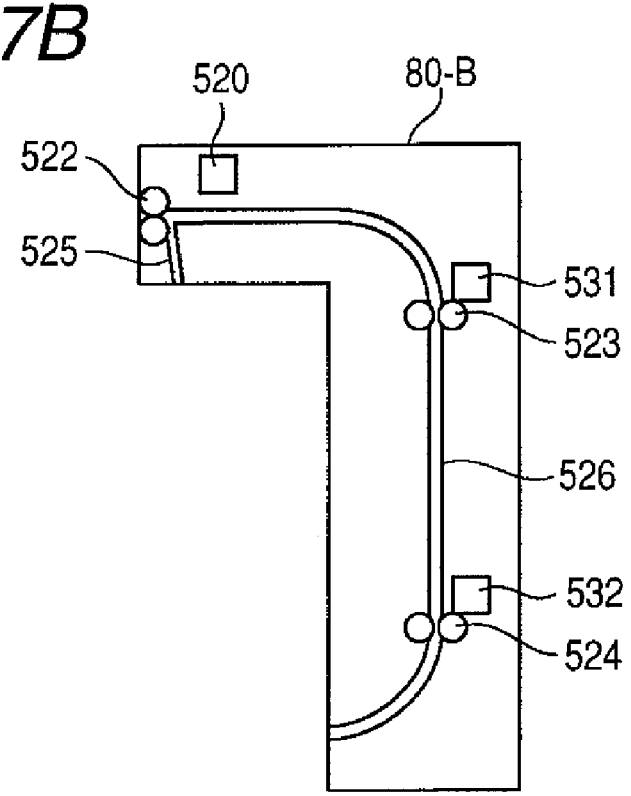

FIGS. 7A and 7B are cross-sectional views showing the general configuration of the transport unit 80, respectively.

The plural transport units that are different in the performance from each other are interchangeably connected to the sheet transport platform 60. A description will be given of the transport unit 80-A intended for the low speed transport and the transport unit 80-B intended for the high speed transport as the transport units that are different in the performance from each other.

In the transport unit 80-A intended for the low speed transport shown in FIG. 7A, reference numeral 520 denotes a stepping motor, 521 a DC brushless motor, 522 a discharge roller that is normally or reversely rotated by the stepping motor 520, 523 and 524 transport rollers that are driven by the DC brushless motor 521, 525 a discharge path, and 526 a transport path. The transport unit 80 is controlled by the platform controller 65 or a transport unit controller (not shown) within the transport unit.

The stepping motor 520 normally or reversely rotates according to the operation mode under the control. The DC brushless motor 521 rotates at a given speed. In the transport operation, the transfer material P that is transported from the fixing unit 180 of the image forming subsystem 150 is transported to the discharge path 525.

In the discharge operation, the discharge rollers 522 rotate in directions of discharging the transfer material to the external of the device to discharge the transfer material P to the external of the device. In the reverse rotation for duplex printing, the discharge rollers 522 rotate in directions of discharging the transfer material P, and the stepping motor 520 stops and reversely rotates in a state where the rear end of the transfer material P is nipped by the discharge rollers 522, to thereby stop and reversely rotate the discharge rollers 522, and transport the transfer material P to the transport path 526.

The transfer material P is transported in the transport path 526 by means of the transport rollers 523 and 524 that are rotationally driven by the DC brushless motor 521 at a given speed, and then sent to the sheet reefed path 512 of the sheet feed unit 70.

In the transport unit 80-B intended for the high speed transport shown in FIG. 7B, reference numerals 531 and 532 denote stepping motors. The stepping motor 531 rotationally drives the transport rollers 523, and the stepping motor 532 rotationally drives the transport rollers 524. The transport unit 80-B is controlled by the platform controller 65 or a transport unit controller (not shown) within the transport unit. The stepping motors 520, 531, and 532 rotate at given speeds and given directions which are variably controlled.

In the transport operation, the transfer material P that is transported from the fixing unit 180 of the image forming subsystem 150 is transported to the discharge path 525. In the discharge operation, the discharge rollers 522 rotate in directions of discharge the transfer material to the external of the device to discharge the transfer material P to the external of the device. In the reverse rotation for duplex printing, the discharge rollers 522 rotate in directions of discharging the transfer material P. The stepping motor 520 stops and reversely rotates in a state where the rear end of the transfer material P is nipped by the discharge rollers 522, to thereby stop and reversely rotate the discharge rollers 522, and transport the transfer material P to the transport path 526.

The transfer material P is transported in the transport path 526 by means of the transport rollers 523 that are rotationally driven by the stepping motor 531 which is controlled in a variable speed fashion, and the transport rollers 524 that are rotationally driven by the stepping motor 532 that is controlled in a variable speed fashion, and then sent to the sheet refeed path 512 of the sheet feed unit 70. In this case, the transport speed of the transfer material P is variable according to the rotating speed of the stepping motors 531 and 532 that are variably controlled, with the result that the transport speed of the transfer material and intervals between the plural transfer materials which are continuously fed can be controlled at a multiple stage over a wide range.

<Interchanging Method of Image Forming Subsystem and Unit>

Figure 8:
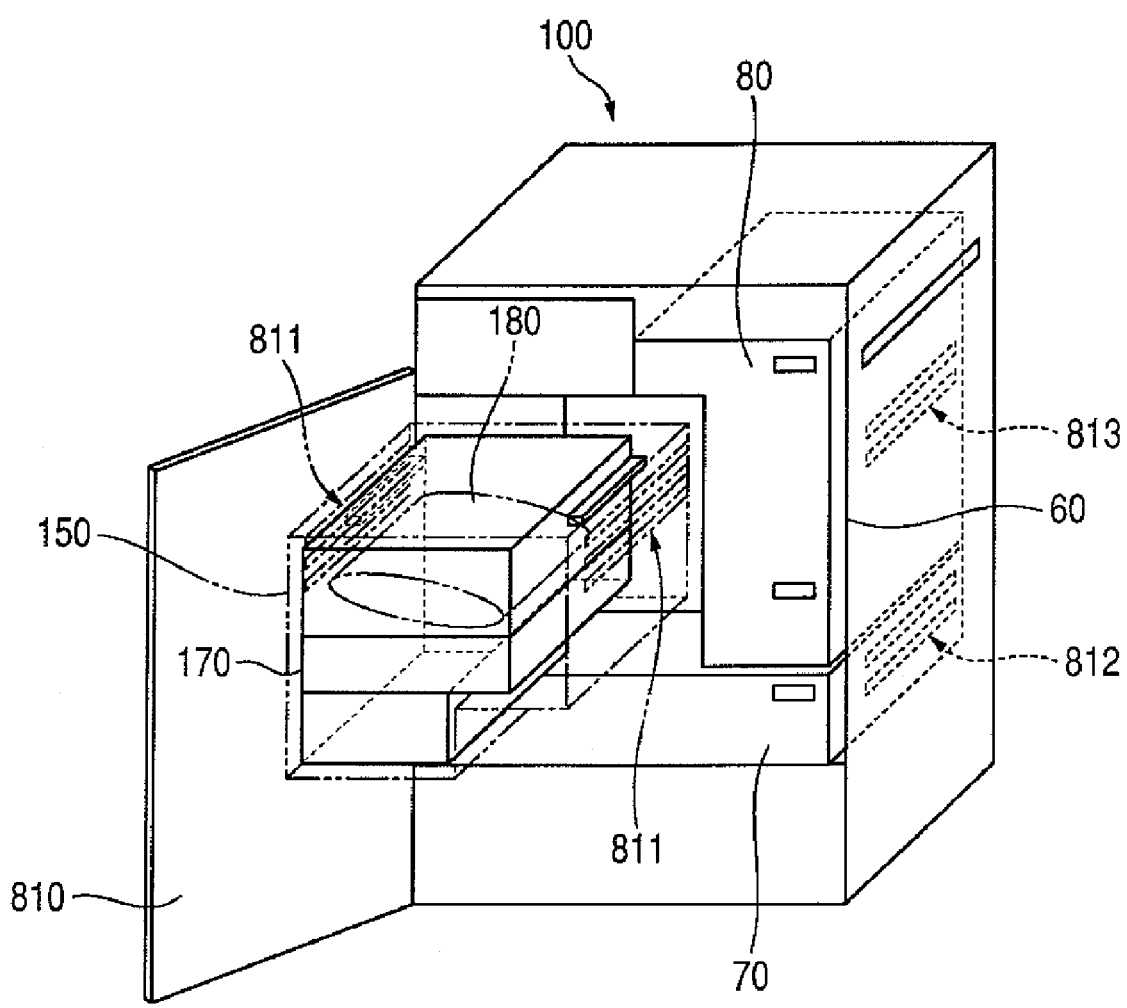
FIG. 8 is a perspective view showing a printer engine in a state where the image forming sub-system is pulled out of the sheet transport platform.

FIG. 8 is a perspective view of the printer engine 100 in a state where the image forming subsystem 150 is pulled out of the sheet transport platform 60. In the printer engine 100, when the image forming subsystem 150 is pulled out of the engine platform 101, a front cover 810 is opened.

The image forming subsystem 150 is coupled with the sheet transport platform 60 by two right and left slide rails 811 so as to enable pullout and removal. When the image forming subsystem 150 is pulled out, an image forming unit 170 and the fixing unit 180 which are equipped in the image forming subsystem 150 are pulled out together.

Subsequently, a description will be given of the sheet feed unit 70 and the transport unit 80 within the sheet transport platform 60.

As with the image forming subsystem 150, the sheet feed unit 70 is coupled with the sheet transport platform 60 by two right and left slide rails 812 so as to enable pullout and removal. Also, as with the sheet feed unit 70, the transport unit 80 is coupled with the sheet transport platform 60 by two right and left slide rails 813 so as to enable pullout and removal.

In the case where the image forming subsystem 150 and the various units are relatively lightweight, or in the case where a required positioning precision is relieved, the inexpensive slide rails may be used. Also, in the case where the relatively high precision is required, diverse linear sliding guide (e.g., linear sliding guide, guide rail) systems such that roller bearings (i.e., rotary guide) is used are applied to the linear guide rails. As a result, operability, precision, reliability, and durability can be effectively improved.

In the structure having the movement of the members such as coupling or insertion/removal within the device as described above, the positioning structure as well as a structure taking the maintenance property into consideration are applied. Also, assuming how to use the device on the market such as the merchantability or the service form, the user is capable of detachably attaching or moving the members within the device. In the above-mentioned user's intended form, a structure particularly taking the safety of the heavy-load operation into consideration is applied. Also, assuming that the operator roughly operates the device, it is effectively to provide a structure having a sufficiently strength or rigidity so as to prevent the device from being damaged.

For example, a lock mechanism that will be described later is provided in each of covers, and the lock mechanism is unlocked so that the cover can be opened and closed in the case where the maintenance is enabled. In the case where the maintenance is disabled, the lock mechanism is locked so that the cover is not opened. Only in the case where the serviceman unlocks the lock mechanism, the image forming subsystem 150 within the device can be pulled out.

The above-mentioned structure makes it possible to prevent the risk that the user carelessly touches the members within the device and ensure the safety. Also, because the serviceman acts to pull out the members within the device after carrying out a predetermined procedure, the serviceman is capable of manipulating the device more safely.

<Positioning Structure of Image Forming Subsystem>

Figure 9A:
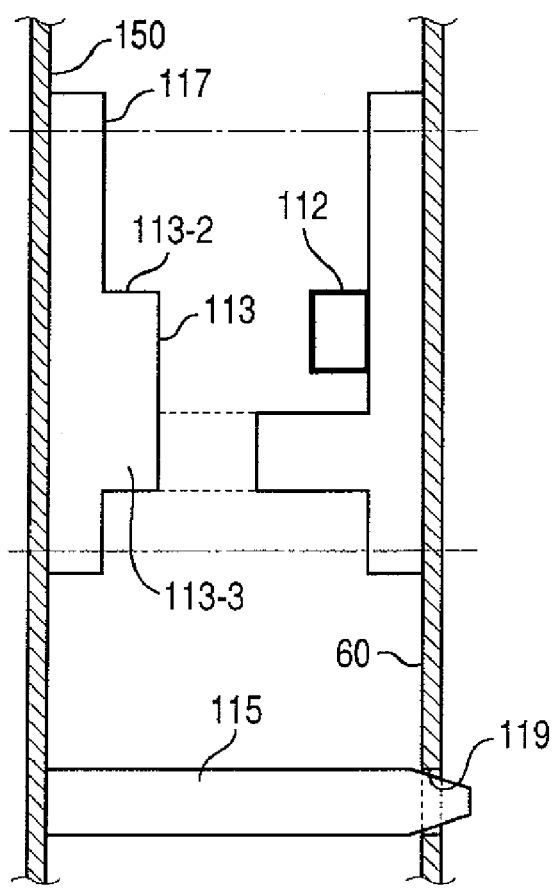
FIGS. 9A and 9B are partially enlarged diagrams showing a positioning mechanism of the image forming sub-system, respectively.
Figure 9B:
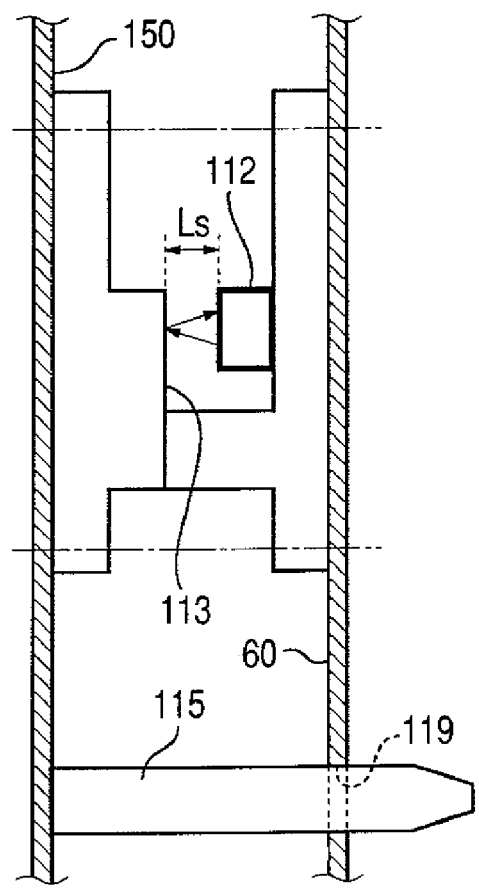

FIGS. 9A and 9B are partially enlarged diagrams showing a positioning mechanism of the image forming subsystem. FIG. 9A shows a state before the image forming subsystem 150 and the sheet transport platform 60 are fitted into each other, and FIG. 9B shows a state after the image forming subsystem 150 and the sheet transport platform 60 are fitted into each other.

The positioning mechanism has a structure in which assuming that the user removes and inserts the image forming subsystem 150, not only the required precision and the required costs are taken into consideration, but also the detachably attaching operation excellent in the operability is enabled. To attain this structure, for example, the configuration of the detachably attaching mechanism and the system or configuration of the positioning mechanism become important.

A description will be given of an example of the configuration that satisfies the required precision of positioning while improving the user's operability, for example, by means of a positioning pin 115, the hole configuration of a positioning hole 119, and a detachably attaching knob. It is needless to say that the present invention can be applied to embodiments with diverse structures other than this embodiment within a scope of the major point of this embodiment. In this embodiment, a positioning pin system will be described as one example.

First, in order to smoothly conduct the positioning work, the configurations of the positioning pin 115 and the hole 119 are so designed as to be optimum according to the dimensional relationship (i.e., fitting system) of the axis and the hole. The positioning pin 115 is used for a purpose that requires the positioning precision. The positioning pin configuration is decided taking the required precision, an improvement in the reliability, and the operability of the user into consideration. A precision in the configuration and a precision in the parts attachment are decided according to the levels of the required positioning precision and the precision in the respective parts that constitute the positioning pin 115 and the positioning hole 119 (e.g., a case in which each of the parts has a high precision or a case in which the precision variation between the high precision parts is large).

Also, the length of a contact area of the positioning pin 115 on the image forming subsystem 150 (150A, 150B, 150C, or the like) with the positioning hole 119 in the sheet transport platform 60 is decided taking the degrees of the operability and the workability into consideration.

The diameter and position of the positioning hole 119 are decided with a sufficient precision required taking a tolerance of the required positioning precision with the image forming subsystem 150 into consideration. It is useful to improve a precision in the squareness of the positioning hole 119 with respect to the positioning pin 115. The positioning pin 115 that is inserted into the positioning hole decides a contour reference surface of the positioning pin 115 so that a relative position of the hole and the pin surface is positioned with high precision.

The fitting of the positioning pin 115 and the positioning hole 119 is designed to an appropriate condition as described above, thereby making it possible that the relative position between the sheet transport platform 60 and the image forming subsystem 150 falls within the required precision.

Also, taking the operability into consideration, it is preferable that a fitting inlet of the positioning pin 115 be largely tapered so that the positioning pin 115 is liable to be slid into the positioning hole 119, and also configured so that the positioning pin 115 is liable to be removed from the positioning hole 119. To achieve the above-mentioned configuration, the axial diameter and the leading configuration of the positioning pin 115 are decided taking into consideration the length of the tapered portion of the positioning pin 115 and the degree of eccentricity of the positioning pin 115 and the positioning hole 119 when the positioning pin 115 is positioned and inserted into the positioning hole 119.

It is preferable that the length of the positioning guide be determined according to the relationship between the operability and the improvement in the reliability. In FIGS. 9A and 9B, the leading configuration of the positioning pin 115 is slightly thinned and realizes the guiding facilitation at the time of inserting the positioning pin 115 into the positioning hole 119.

In particular, it is assumed that the image forming subsystem 150 is of the structure that includes diverse parts required to realize the image forming function therein, and is relatively large in weight. For example, in the image forming subsystems 150A and 150B that conducts the color image formation, it is desirable to realize the higher operability. Also, in the image forming subsystem 150C that conducts the monochrome image formation as compared with the image forming subsystems 150A and 150B that conduct the color image formation, it is assumed that, for example, the weight is to the same degree as that intended for the color in the case of the configuration intended for the high speed monochrome image having the high productivity, and the weight is to the same degree as or lightweight more than that for the color in the configuration of the middle speed class.

As described above, it is desirable to provide the configuration that is excellent in the user's operability while realizing the desired safety, durability, reliability, and high precision even if any one of the diverse image forming subsystems 150 is connected to the image forming apparatus.

On the other hand, in the case where the lineups of the image forming subsystems 150 are relatively light, or the required positioning precision can be relatively eased, the detachably attaching mechanism and the positioning mechanism can be changed to the configuration that is relatively low in the costs. As a result, the cost reduction effect can be expected. In the image forming apparatus according to this embodiment, as shown in FIG. 8, the detachably attaching mechanism using the slide mechanisms 811, 812, and 813 are disposed within the printer engine 100 and so configured as to pull out the image forming subsystem 150. In the above-mentioned configuration in which the image forming subsystem 150 is detachably attached to the image forming apparatus, the positioning of the toner image to be transferred onto the transfer material and the transfer material becomes more important.

Under the circumstances, in this embodiment, there is provided a position detecting unit 112 that detects a position between the image forming subsystem 150 and the sheet transport platform 60 in a state where the image forming subsystem 150 is received in the printer engine 100. An optical displacement sensor is put into practice as a position detection sensor used in the position detecting unit 112 because the optical displacement sensor is small in the size and inexpensive. For example, a micro displacement sensor made by OMRON Corporation is applied as an example of the intended purpose of this embodiment. It is needless to say that sensors other than the optical sensor can be used.

The micro displacement sensor made by OMRON Corporation will be exemplified. In the micro displacement sensor of a model Z4D-B02, a detectable distance is 9.5 mm ±3 mm, the detection resolution is equal to or lower than ±50 µm. In the image forming subsystem that is exactly 400 Dpi in the resolution, since one dot (i.e., 1 pixel) is 25.4 mm/400 dots = 63.5 µm, the detection resolution of the micro displacement sensor is capable of detecting the position with the resolution lower than one dot (i.e., 1 pixel). In the resolution of 600 Dpi, 25.4 mm/600 dots=42.3 µm is satisfied, and the detection resolution is about 1.18 dots. In the resolution of 1200 Dpi, 25.4 mm/1200 dots=21.2 µm is satisfied, and the detection resolution is about 2.36 dots.

However, the detected relative position of the image forming subsystem 150 and the sheet transport platform 60 is related to the relative position of an image to be printed and the transfer material (e.g., transfer sheet) on which the image is to be printed, and the resolution of about 50 µm is sufficient. For example, when it is assumed that the size of a margin is 2.5 mm, the resolution ±50 µm of the micro displacement sensor of the position detecting unit with respect to the margin corresponds to 1/50, and the sufficient detection precision is provided with respect to the normal printing operation. When the resolution of the position detection of the position detecting unit 112 is further improved, the detection resolution is improved to ±10 µm or lower from the above-mentioned resolution of ±50 µm with the use of the micro displacement sensor of the model Z4D-B01 made by OMRON Corporation. As a result, the resolution of the position detecting unit is improved to 5 times.

In the case where the micro displacement sensor is used for the position detecting unit 112, the detection result that has been detected by the micro displacement sensor is an analog output that has the output voltage from the micro displacement sensor linearly decreased as a distance between an object to be detected and the micro displacement sensor is longer. The positional information from the sensor of the position detecting unit 112 is used to control the image formation position so as to print the image at an appropriate position on the transfer material.

The detachably attaching knob is manipulated in such a manner that the image forming subsystem 150 is horizontally moved in a slide fashion so as to be pushed into the printer engine 100. In this case, when the image forming subsystem 150 is received in the printer engine 100, a subsystem reference surface 113 defined on a striking member 117 which forms a positional reference of the image forming subsystem 150 comes in contact with a striking member 118 at the sheet transport platform 60 side which is located opposite to the reference surface 113 to position the positioning pin 115 in the axial direction thereof.

The position detecting unit 112 is disposed on the striking member 118.

The positioning pin 115 at the side of the image forming subsystem 150 is inserted into the positioning pin hole 119 at the side of the printer engine 100, and the image forming subsystem 150 is received within the printer engine 100 with a desired positioning precision. The mechanical position between the sheet transport platform 60 and the image forming subsystem 150 is detected in such a manner that the subsystem reference surface 113 is irradiated with a position detecting sensor light from the position detecting unit 112, and a reflected light from the subsystem reference surface 113 is received by the position detecting unit 112 to detect a position of the image forming subsystem 150. The position detecting information that has been detected as the distance Ls by the sensor 112 is transmitted to the platform controller 65 of the sheet transport platform 60. The position control information is transmitted to an image forming controller 160 from the platform controller 65 so that the image formation position is controlled to an optimum position on the basis of the position detecting information.

Alternatively, it is possible that a reference surface is defined at the side of the sheet transport platform 60, and the detecting unit 112 is disposed in the image forming subsystem 150, to thereby transmit the position detecting information to the image forming controller 160.

Also, the reference surface 113 is exemplified as an example of the reference surface of the striking member of the image forming subsystem 150. However, it is needless to say that another method or another unit is added or changed to the detecting unit. For example, it is possible that the number of micro displacement sensors in the detecting unit 112 is added, or the a location where the sensor is disposed is changed so as to detect the location of a reference surface 113-2 or a reference surface 113-3 on the basis of another reference surface of the striking member 117. Also, it is possible that the positional displacements of the reference surfaces 113, 113-2, and 113-3 in three directions are detected so that three-dimensional positional displacement of the image forming subsystem 150 is detected and used for correction control of the image position.

Also, it is effective that the positioning mechanism is disposed in the vicinity of the mechanism that transfers the toner image onto the transfer material. It is possible that a precision in the position of the transfer roller and the position of the entered transfer material can be further effectively improved.

<Details of Image Forming Subsystem 150>

Subsequently, the image forming subsystem 150 will be described.

Figure 10:
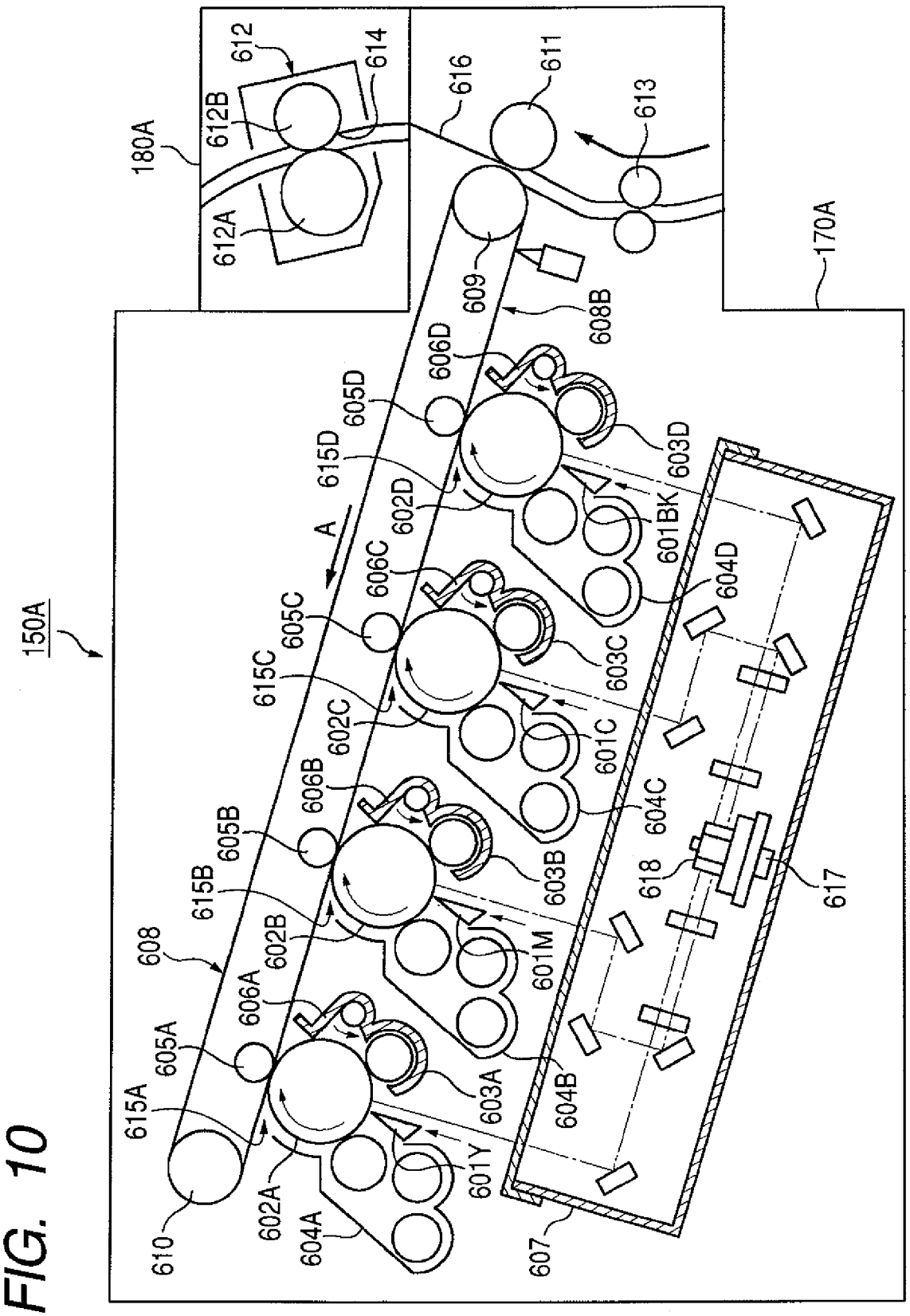
FIG. 10 is a cross-sectional view of the image forming sub-system for a 4D system full color printer.

(A) Hardware Configuration of Image Forming Subsystem for 4D System Full Color Printer FIG. 10 is a cross-sectional view showing the image forming subsystems 150A for the 4D system full color printer.

In the figure, reference 170A denotes an image forming unit, and 180A a fixing unit. Those units 170A and 180A can be interchanged with other units of the same function, and are physically separably configured.

First of all, the details of the image forming unit 170A will be described.

The image forming unit 170A includes four image forming units composed of an image forming unit 601Y for creating a yellow image, an image forming unit 601M for creating a magenta image, an image forming unit 601C for creating a cyan image, and an image forming unit 601BK for creating a black image. Those four image forming units 601Y, 601M, 601C, and 601BK are aligned at given intervals.

The respective image forming units 601Y, 601M, 601C, and 601BK are equipped with drum like electrophotographic photosensitive bodies (hereinafter referred to as "photosensitive drums") 602A, 602B, 602C, and 602D serving as image bearing members, respectively. Around the respective photosensitive drums 602A to 602D are disposed primary chargers 603A, 603B, 603C, and 603D, developing devices 604A, 604B, 604C, and 604D, transfer rollers 605A, 605B, 605C, and 605D serving as transfer means, and drum cleaner devices 606A, 606B, 606C, and 606D, respectively. A laser exposure device 607 is disposed below between the respective primary chargers 603A to 603D and the respective developing devices 604A to 604D.

Yellow toner, cyan toner, magenta toner, and black toner are received in the developing devices 604A to 604D, respectively. Each of the photosensitive drums 602A to 602D is formed of a negatively charged OPC photosensitive body that has a photoconductive layer on a drum base made of aluminum, and is rotationally driven by a driving device (not shown) at a given process speed clockwise in FIG. 11.

The primary chargers 603A to 603D serving as the primary charging means uniformly charge the surfaces of the respective photosensitive drums 602A to 602D to a given negative potential by means of a charge bias applied from a charge bias source (not shown). The developing devices 604A to 604D receive toner therein, stick the respective color toners to the respective electrostatic latent images created on the respective photosensitive drums 602A to 602D, and develop (i.e., visualize) the electrostatic latent images as toner images.

The transfer rollers 605A to 605D serving as the primary transfer means are so disposed as to be abuttable against the respective photosensitive drums 602A to 602D through an intermediate transfer belt 608 in respective primary transfer units 615A to 615D, respectively. Each of the drum cleaner devices 606A to 606D has a cleaning blade and the like for removing the non-transferred toner that remains on the photosensitive drum 2 at the time of primary transfer from the photosensitive drum 2.

The intermediate transfer belt 608 is disposed on the upper surface sides of the respective photosensitive drums 602A to 602D, and is extended between a primary transfer opposed roller 609 and a tension roller 610. The secondary transfer opposed roller 609 is so disposed as to be abuttable against a secondary transfer roller 611 through the intermediate transfer belt 608 in a secondary transfer unit 616. The intermediate transfer belt 608 is made of a dielectric resin such as polycarbonate, a polyethylene terephthalate resin film, or a polyvinylidene fluoride resin film. Also, the intermediate transfer belt 608 inclines a primary transfer surface 608B formed on an opposed surface side of the photosensitive drums 602A to 602D toward the second transfer roller 611 side as a lower side.

A laser exposure device 607 includes laser emitting means (not shown) for emitting a laser beam according to a time series electric digital pixel signal of given image information, a polygon mirror 618, a scanner monitor 617, a reflector, and the like. The respective photosensitive drums 602A to 602D are exposed, to thereby create the electrostatic latent images of the respective colors corresponding to the image information on the surfaces of the respective photosensitive drums 602A to 602D that have been charged by the respective primary chargers 603A to 603D. At the same time, a beam detection signal (BD) generate circuit (not shown) which is disposed in the laser exposure device 607 detects a laser beam in a horizontal direction which is deflected by the polygon mirror.

In addition, image forming unit control means (not shown) for controlling the operation of the respective elements is disposed and further controls the process speed of the image forming units, or the adjustment of colors and density.

Subsequently, the fixing unit 180A will be described.

The fixing unit 180A is disposed downstream of a secondary transfer unit 616 of the image forming unit 170A in the recording sheet transport direction. A fixing device 612 having a fixing roller 612A including a heat source such as halogen heater therein and a pressure roller 612B is located in a longitudinal path configuration in the interior of the fixing unit 180A. Also, the fixing roller 612A and the pressure roller 612B are rotationally driven by a driving device (not shown), and an electric power of the halogen heater within the fixing roller 612A is controlled, to thereby control the surface temperature of the fixing roller. Further, fixing unit control means (not shown) for controlling those elements are disposed to control the rotating speeds of the respective rollers, a temperature of the fixing roller, and processing in an abnormal state.

Also, the image forming subsystem 150A for the 4D system full color printer is equipped with the image forming controller 160. The image forming controller communicates with the image forming unit control means and the fixing unit control means. The image forming controller also draws the unit information from the respective control means, and transmits the unit control information to the respective control means. Further, the image forming controller transfers the respective image signals from the controller 250, or transfers the control information with respect to the printer engine controller 105 and the platform controller 65.

In the above description, each of the image forming unit and the fixing unit has the controller. However, even if those controllers are not provided, those units can operate because the image forming controller (not shown) controls the image forming unit and the respective elements within the fixing unit.

Figure 11:
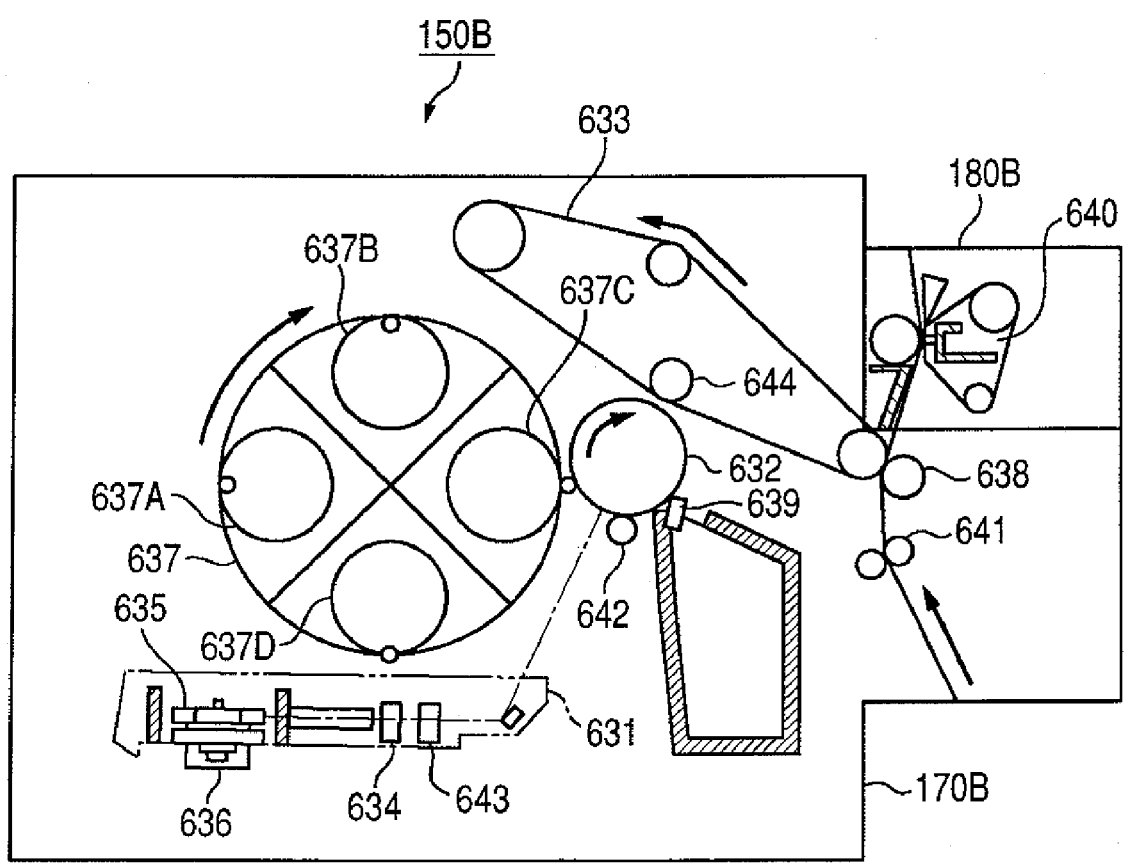
FIG. 11 is a cross-sectional view of the image forming sub-system for a 1D system full color printer.

(B) Hardware Configuration of Image Forming Subsystem 150B for 1D System Full Color Printer FIG. 11 is a cross-sectional view of an image forming subsystem 150B for the 1D system full color printer. Referring to FIG. 11, reference symbol 170B denotes an image forming unit, and 180B a fixing unit. Those units are interchangeable with other units having the same functions and physically separable as in the above-mentioned longitudinal path 4D color image forming subsystem 150A.

First of all, the details of the image forming unit 170B will be described.

The image forming unit 170B includes a scanner unit 631 having a laser unit 634, a polygon mirror 635, a scanner motor 636, and a beam detection signal (BD signal) generate circuit 634, a photosensitive drum 632, an intermediate transfer belt 633, a developer unit 637 having respective color developer units 637A to 637D, primary transfer rollers 644, secondary transfer rollers 638, and a cleaning blade 639.

Figure 12:
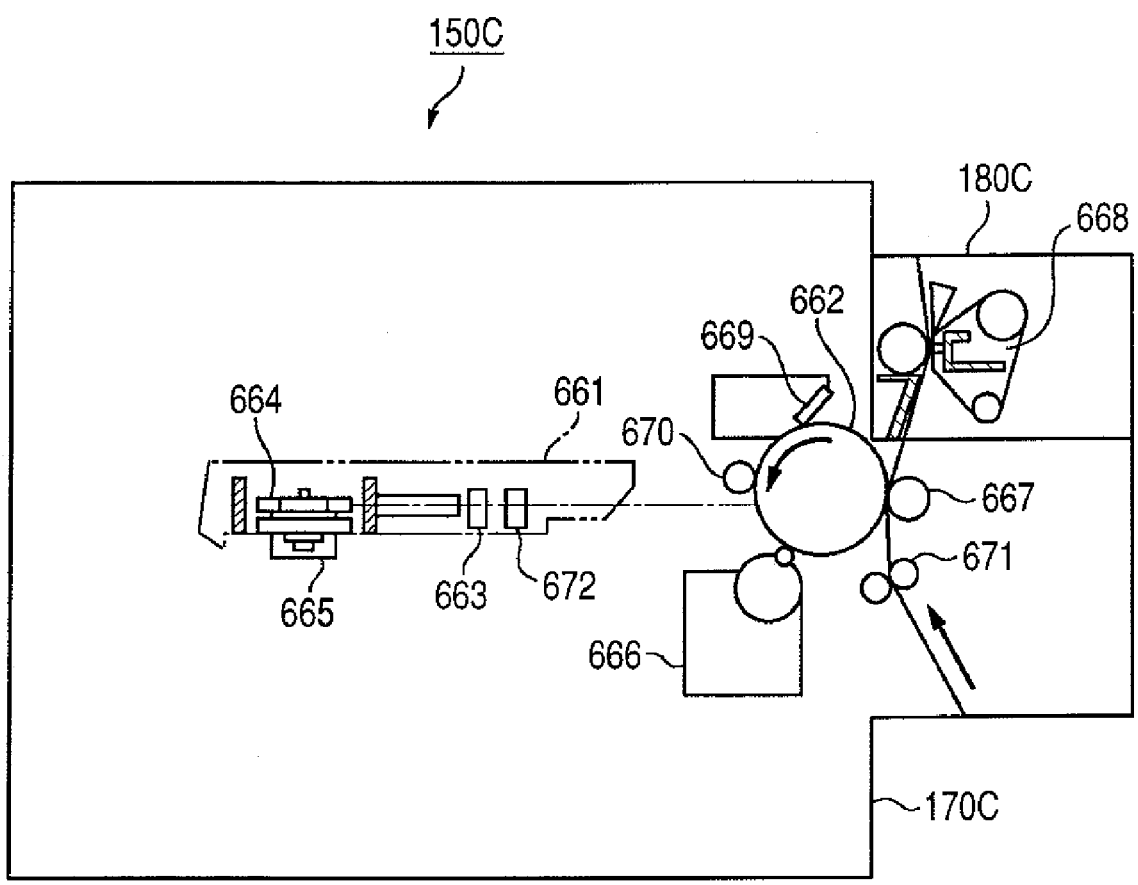
FIG. 12 is a cross-sectional view showing the image forming sub-system for a 1D system monochrome printer.

The configurations of the respective units in the image forming unit 170B will be described. The photosensitive drum 632 is formed of an OPC photosensitive body that has a photoconductive layer on a drum base made of aluminum, and is rotationally driven by a driving device (not shown) at a given process speed clockwise as shown in FIG. 12. The primary charger 642 serving as the primary charging means uniformly charges the surface of the photosensitive drum 632 to a given potential by means of a charge bias applied from a charge bias source (not shown).

In the scanner unit 631, the laser unit (hereinafter referred to simply as "laser") 634 emits a laser beam that has been modulated on the basis of a time series electric digital pixel signal of the given image information. The polygon mirror 635 is a rotating polygon mirror that deflects the laser beam that has been emitted from the laser 634 to scan the photosensitive drum 632 with the laser beam, and forms an electrostatic latent image on the photosensitive drum 632. The scanner motor 636 rotationally drives the polygon mirror 635. The beam detection signal (BD signal) generate circuit 643 detects a laser beam that is deflected by the polygon mirror 635 in the main scanning direction.

The developer unit 637 develops the electrostatic latent image that has been formed on the photosensitive drum 632 by means of the developer units 637A, 637B, 637C, and 637D of the respective colors composed of yellow (Y), magenta (M), cyan (C), and black (BK). The photosensitive drum 632 primarily transfers the developer on the photosensitive drum 632 which has been developed by the developer unit 637 to the intermediate transfer belt 633 by applying the primary transfer bias to the primary transfer roller 644, as in the above-mentioned longitudinal path 4D color image forming unit. The secondary transfer roller 638 is abutted against the intermediate transfer belt 633 to transfer the developer on the intermediate transfer belt 633 to a recording medium such as a recording sheet.

The cleaning blade 639 is always abutted against the photosensitive drum 632, and scrapes off the residual toner on the surface of the photosensitive drum 632 to clean the surface of the photosensitive drum 632. In addition, the image forming unit control means (not shown) for controlling the operation of the respective elements is disposed and further controls the process speed of the image forming units, or the adjustment of colors and density, as in the above-mentioned longitudinal path 4D color image forming unit.

Subsequently, the fixing unit 180B will be described.

The fixing unit 180B is disposed downstream of a secondary transfer roller 638 of the image forming unit 170B in the recording sheet transport direction. A fixing unit 640 conducts the fixing operation for fixing the toner image that has been transferred onto the recording sheet by heating and pressurization as in the above-mentioned longitudinal path 4D color image forming unit.

Also, the image forming subsystem 150B for the 1D system full color printer is equipped with the image forming controller 160. The image forming controller 160 communicates with the image forming unit control means and the fixing unit control means. The image forming controller 160 also draws the unit information from the respective control means, and transmits the unit control information to the respective control means. Further, the image forming controller 160 transfers the respective image signals from the controller 250, or transfers the control information with respect to the printer engine controller 105 and the platform controller 65.

In the above description, each of the image forming unit and the fixing unit has the controller. However, even if those controllers are not provided, those units can operate because the image forming controller (not shown) controls the image forming unit and the respective elements within the fixing unit.

(C) Hardware Configuration of Image Forming Subsystem for 1D System Monochrome Printer FIG. 12 is a cross-sectional view of an image forming subsystem 150C for the 1D system monochrome printer. Referring to FIG. 12, reference symbol 170C denotes an image forming unit, and 180C a fixing unit. Those units are interchangeable with other units having the same functions and physically separable as in the above-mentioned longitudinal path 4D color image forming subsystem 150A.

The details of the image forming unit 170C will be described.

The image forming unit 170C includes a scanner unit 661 having a laser unit 663, a polygon mirror 664, a scanner motor 665, and a beam detection signal (BD signal) generate circuit 672, a photosensitive drum 662, a developing unit 666, and transfer rollers 667.

The configurations and operation of the respective elements in the image forming unit 170C will be described. The photosensitive drum 662, the primary charger 670, the scanner unit 661, the laser unit 663, the polygon mirror 664, the scanner motor 665, and the beam detection signal (BD signal) generate circuit 672 operate in the same manner as that of the above-mentioned image forming unit 170B.

The developing unit 666 develops the electrostatic latent image that has been formed on the photosensitive drum 662 with a developer of black (BK). The transfer roller 667 is abutted against the photosensitive drum 662, and transfers the developer on the photosensitive drum 662 to the recording medium such as a recording sheet.

The cleaning blade 669 is always abutted against the photosensitive drum 662, and scrapes off the residual toner on the surface of the photosensitive drum 662 to clean the surface of the photosensitive drum 662. In addition, the image forming unit control means (not shown) for controlling the operation of the respective elements is disposed and controls the process speed of the image forming units, or the adjustment of density, as in the above-mentioned 1D system color fixing system.

Subsequently, the fixing unit 180C will be described.

The fixing unit 180C is disposed downstream of the transfer roller 667 of the image forming unit 180C in the transfer material transport direction. A fixing unit 668 conducts the fixing operation for fixing the toner image that has been transferred onto the recording sheet by heating and pressurization as in the above-mentioned 1D system color fixing system.

Also, the image forming subsystem 150C for the 1D system monochrome printer is equipped with the image forming controller (not shown), and conducts the same operation as that of the above-mentioned image forming subsystem 150B for the 1D system full color printer.

Electric Connection Configuration According to First Embodiment

<Overall Configuration>

Hereinafter, an electric connection configuration of an image forming apparatus according to this embodiment will be described.

Figure 13:
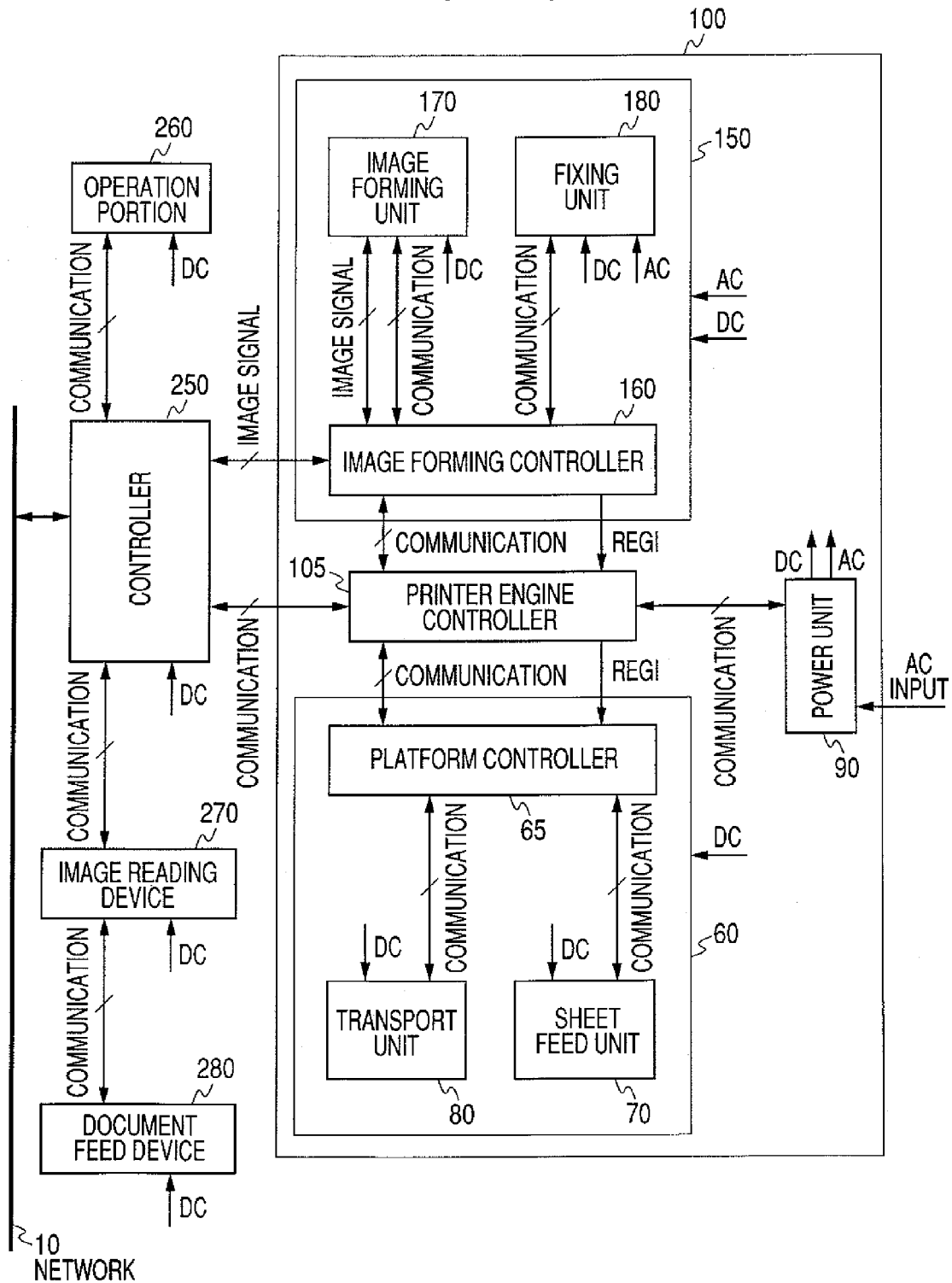
FIG. 13 is a block diagram showing an overall electric connection configuration of an image forming apparatus according to the first embodiment.

FIG. 13 is a block diagram showing the overall electric connection configuration of an image forming apparatus according to this embodiment.

In the figure, reference numeral 105 denotes a printer engine controller that controls the printer engine 100. Reference numeral 65 denotes a platform controller that controls the sheet transport platform 60. The sheet unit 70 is a unit that does not include the CPU therein, and the transport unit 80 is a unit having a controller including the CPU therein.

The sheet feed unit 70 controls the respective control loads under the control of the platform controller 65, and also conducts the load control related to the transfer material feed operation. The transport unit 80 communicates with the platform controller 65, transfers the control information, and controls the respective control loads. Also, the transport unit 80 conducts the load control related to the discharge, reversal, and the duplex transport operation of the transfer material. Under the above-mentioned controls, the sheet transport platform 60 realizes the transport operation of the transfer material related to the image formation.

Reference numeral 160 denotes an image forming controller that controls the image forming subsystem 150. In the following description, the image forming unit 170 is a unit having a controller which includes a CPU therein, and the fixing unit 180 is a unit which includes no CPU therein. The image forming unit 170 communicates with the image forming controller 160, transfers the control information, and controls the respective control loads. The fixing unit 180 conducts the respective control loads under the control of the image forming controller 160. The image forming unit 170 conducts the operation of forming an image on the transfer material on the basis of the image signal that is transferred with respect to the controller 250, and conducts the operation of heating and fixing the image formed on the transfer material. In this example, the image signal to be transferred is a signal including video data (VIDEO), an image synchronous CLK (VCLK), a main scanning synchronization signal (BD), and a sub scanning synchronization signal (ITOP).

In order that the transfer material that is transported by the sheet transport platform 60 is received by the image forming subsystem 150, and the image formed by the image forming subsystem 150 is transferred to a correct position on the transfer material, a sheet transport synchronization signal (REGI) that is produced on the basis of the sub scanning synchronization signal (ITOP) which is managed by the image forming controller 160 is transmitted to the platform controller 65 through the printer engine controller 105. The platform controller 65 controls the sheet feed and transport operation on the basis of the sheet transport synchronization signal (REGI), and delivers the transported transfer material to the image forming subsystem 150 at a given timing. With the above-mentioned associated operation, the image forming subsystem 150 realizes the operation of forming the image on the transported transfer material.

Reference numeral 90 denotes a power unit that outputs a DC output and a rectified AC output from an AC input. Then, plural voltage outputs are supplied to the respective structural elements of the image forming apparatus. The AC output is supplied to the respective units as the occasion demands, and in this example, a system in which the AC output is supplied to the fixing unit will be described.

The printer engine controller 105 controls the control information on the sheet transport platform 60 which is obtained by communication with the platform controller 65, the control information on the image forming subsystem 150 which is obtained by communication with the image forming controller 160, and the control information on the power unit 90 which is obtained from the power unit 90. The printer engine controller 105 transmits the control information to the platform controller 65, the image forming controller 160, and the power unit 90 in order to conduct the image forming operation as the printer engine on the basis of the controlled control information.

The platform controller 65 communicates with the transport unit 80 and transfers the control information on the basis of the control information that has been decided by the printer engine controller 105. The platform controller 65 controls the respective control loads of the sheet feed unit 70 on the basis of the control information that has been decided by the printer engine controller 105. The transport unit 80 controls the respective control loads on the basis of the transferred control information.

The image forming controller 160 communicates with the image forming unit 170 and transfers the control information on the basis of the control information that has been decided by the printer engine controller 105. The image forming controller 160 controls the respective control loads of the fixing unit 180 on the basis of the control information that has been decided by the printer engine controller 105. The image forming unit 170 controls the respective control loads on the basis of the transferred control information. Then, the power unit 90 controls the output voltage on the basis of the control information that has been decided by the printer engine controller 105.

Reference numeral 250 denotes a controller that transfers the image data and the control information, and transfers the control information with respect to the printer engine controller 105 in the printer engine 100 and transfers the image signal with respect to the image forming controller 160 in the printer engine 100. The controller 250 is connected with an image reading device 270 that conducts the image read operation, and inputs the image information therefrom. The image reading device 270 is connected with a document feed device 280, and conducts the sheet feed operation of the read document. The controller 250 is connected with an operation portion 260 that conducts operation input and display, and transfers the control information with respect to the operation portion 260. The controller 250 is connected to the network 10 and is capable of transferring the image signal and the control information with respect to another computer (not shown) on the network.

<Electric Configuration of Image Forming Subsystem>

Subsequently, a description will be given of the elements within the image forming apparatus, particularly, the image forming subsystem 150 and the image forming controller 160 provided in the image forming subsystem 150.

(A) 4D System Full Color Image Forming Subsystem 150A

Figure 14:
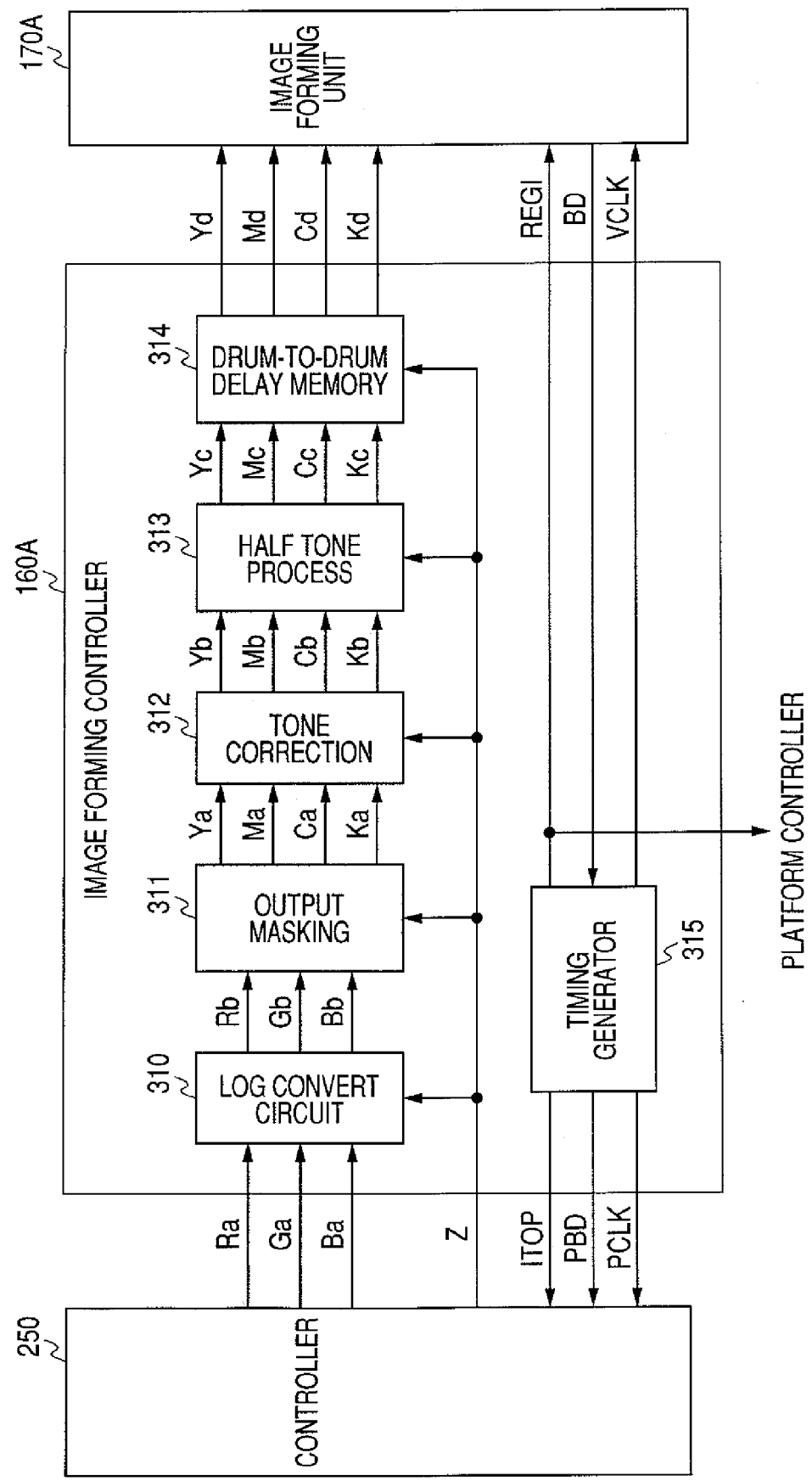
FIG. 14 is a block diagram showing a configuration of a 4D system full color image forming sub-system.

FIG. 14 is a block diagram showing the configuration of the 4D system full color image forming subsystem 150A.

The 4D system full color image forming subsystem 150A includes the image forming controller 160A including an image processor, the image forming unit 170A, and the fixing unit 180A. The image signal is inputted to the image forming controller 160A from the controller 250 in an RGB color format, and is then subjected to the following processing.

First, the image signal is converted into the density by a LOG convert circuit 310, and is then converted into YMCK data by an output masking circuit 311. The output masking circuit 311 conducts the conversion so that the mean color difference in the LAB space becomes minimum, and its coefficient depends on the hardware characteristic of the image forming unit 170A.

The YMCK data is inputted to a tone correction circuit 312, and is then subjected to a tone correction by means of a lookup table (hereinafter referred to as "LUT"). The LUT combines a table that corrects the hardware characteristics such as an individual variability or a deterioration with time in the image forming unit 170A, a density adjustment table that is changed according to the user's setting, and an image mode table including a character mode and a print sheet mode together.

The LUT is also changed by the post-stage halftone processing. Because a halftone process circuit 313 conducts plural halftone processing in parallel, the tone correction circuit 312 has the LUTs of the same number as that of the processing structural elements of the halftone process circuit 313, and processes all of the processing structural elements at the same time to output the processed results. The signal that has been subjected to the tone correction is inputted to the halftone process circuit 313 to produce print data. The halftone process circuit 313 conducts error diffusion and plural screen processing in parallel at the same time, and the processing results are selected according to a Z signal that will be described below and outputted. Then, the print data is subjected to a delay processing in a drum-to-drum delay memory 314 according to a drum arrangement, and is then outputted to the image forming unit 170A.

The Z signal that is representative of the image feature is also inputted from the controller 250 at the same time. The Z signal is synchronous with the RGB signal, and is inputted to the LOG convert circuit 310, the output masking circuit 311, the tone correction circuit 312, and the halftone process circuit 313, respectively. The Z signal includes data representative of the feature of a page unit, and data representative of the feature of a pixel unit. More specifically, the former is data indicative of a copy image/PDL image, and the latter is data indicative of a character/photograph or a BMP/object.

The image output timing of the controller 250 is controlled according to the image synchronization signals ITOP and PBD that are outputted from the timing generator 315. The ITOP signal is indicative of a synchronization signal in a sub scanning direction, and the PBD signal is indicative of a synchronization signal in a main scanning direction.

Also, an image clock PCLK is inputted to the controller 250, and the controller 250 outputs the image data in synchronization with the PCLK. The PBD signal is produced on the basis of the BD signal that is outputted from the image forming unit 170A. An REGI signal that controls the driving timing of a registration roller is also generated in the timing generator 315, and the REGI signal is supplied to the image forming unit 170A including the registration roller.

The REGI signal is produced on the basis of the ITOP signal, and determined according to a relationship among the image forming position, the transfer position, and the registration roller. The REGI signal is a value inherent to the image forming subsystem. The REGI signal is also supplied to the platform controller at the same time because of synchronization with the registration roller.

(B) Image Forming Timing of 4D System Full Color Image Forming Subsystem

Figure 15:
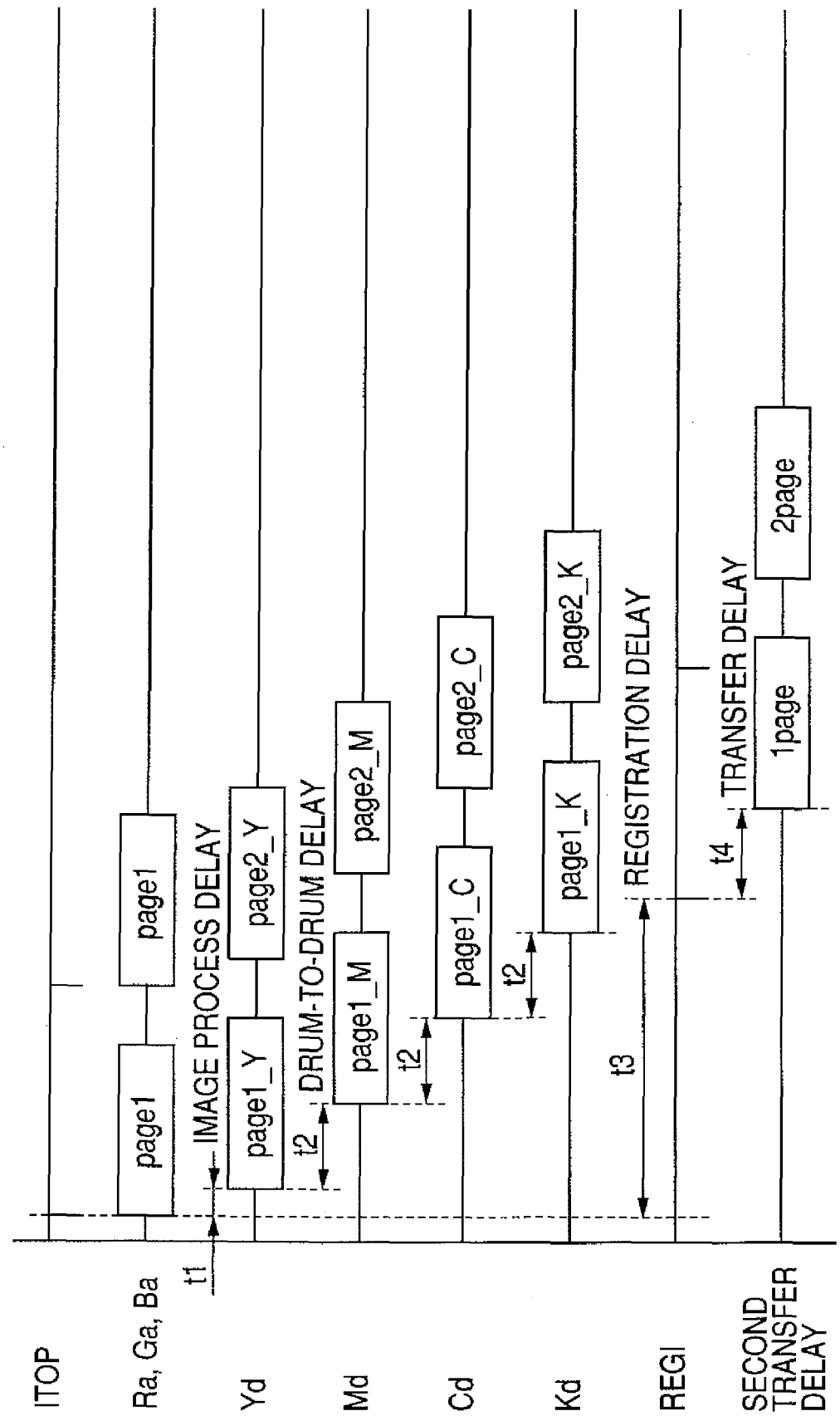
FIG. 15 is a timing chart showing the image formation timing of the 4D system full color image forming sub-system.
Figure 16:
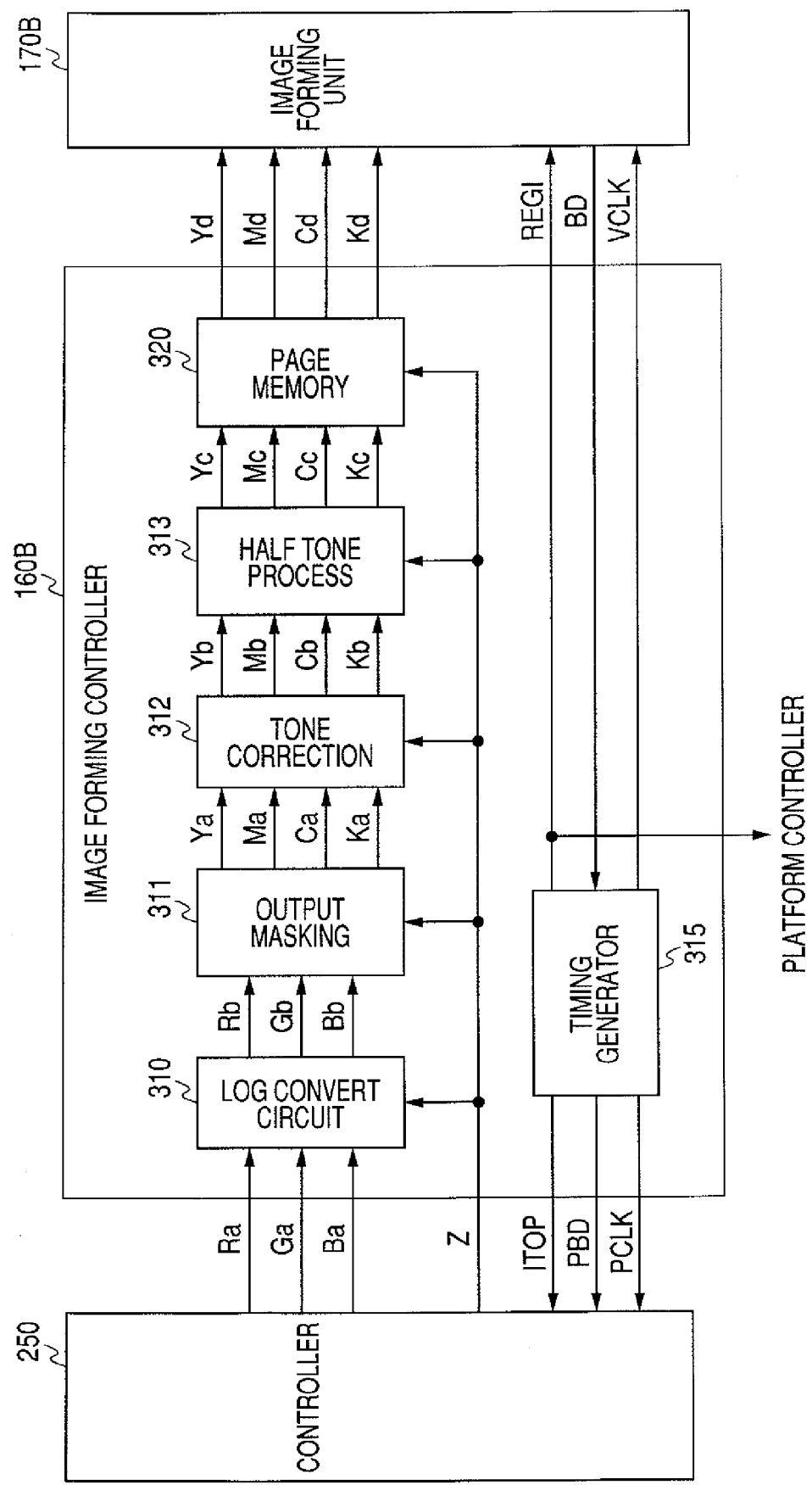
FIG. 16 is a block diagram showing a configuration of a 1D system full color image forming sub-system.

FIG. 15 is a timing chart showing an image forming timing of the 4D system full color image forming subsystem 150A.

FIG. 15 shows a case in which two images are continuously formed. In this case, the RGB image is outputted from the controller 250 according to the ITOP timing, and the YMCK data that is supplied to the image forming unit 170A is subsequently outputted after an image process delay t1 has been elapsed. A phase difference of the drum-to-drum delay t2 is generated between the respective YMCK data, and the delay process is conducted in a drum-to-drum delay memory 314.

The REGI signal is produced in the timing generator 315, after the delay process of a registration delay t3 from the generation of the ITOP signal has been conducted, and the registration roller is driven at this timing, and a sheet is transported to the secondary transfer unit. The secondary transfer starts transfer at a timing delayed from the REGI signal by a transfer delay t4. The processing of a second page starts during the transfer operation of the first page, and the same process is repeated in the case of a large number of sheets.

(C) Electric Configuration of 1D system Full Color Image Forming Subsystem

Figure 17:
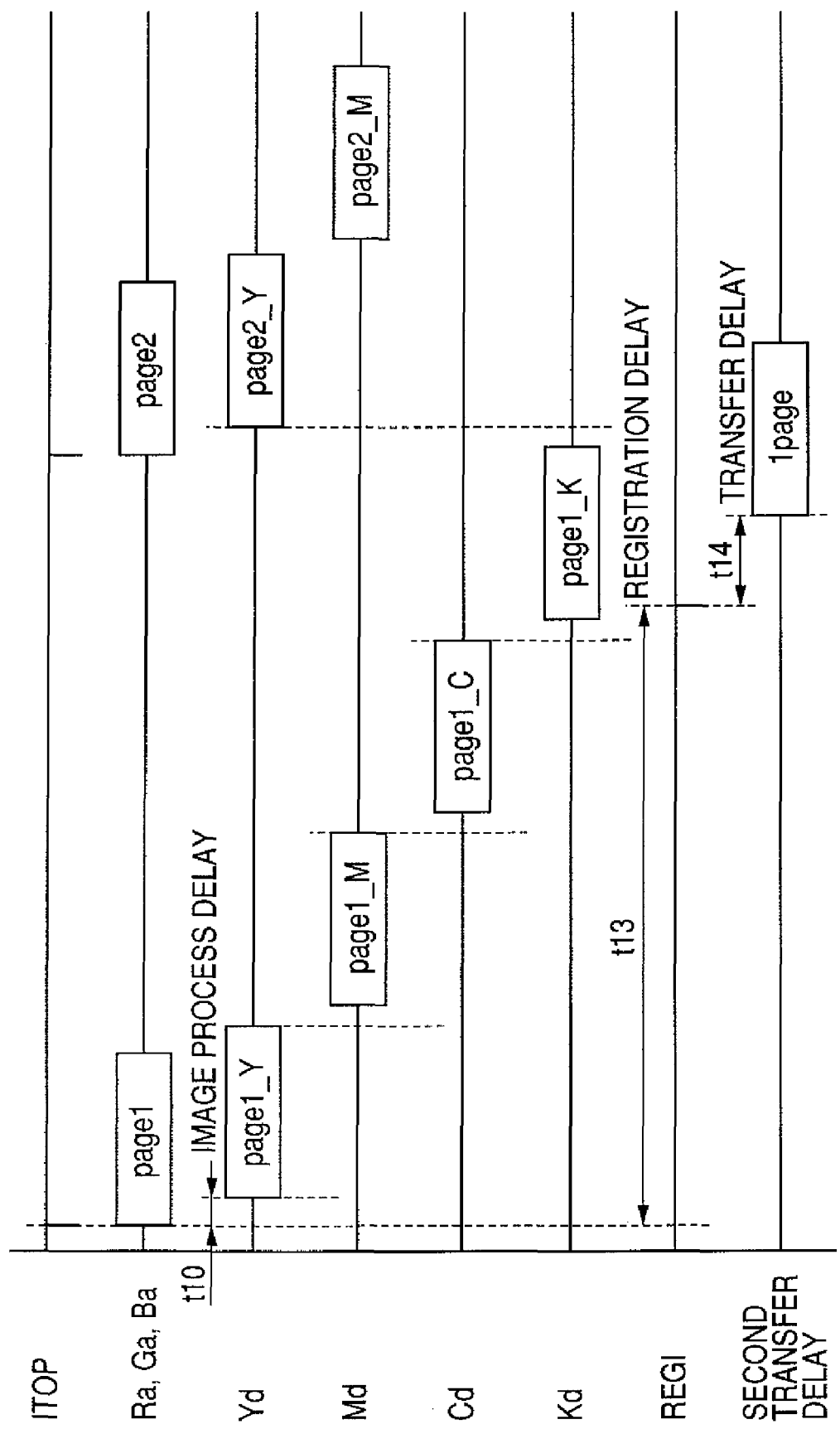
FIG. 17 is a timing chart showing the image formation timing of the 1D system full color image forming sub-system.

FIG. 17 is a block diagram showing the configuration of the 1D system full color image forming subsystem 150B.

The 1D system full color image forming subsystem 150B includes the image forming controller 160B including an image processor, the image forming unit 170A, and the fixing unit 180B. The image signal is inputted to the image forming controller 160B from the controller 250 in an RGB color format, and is then subjected to the following processing.

The image processing of the 1D system full color image forming subsystem 150B is different from the image processing of the 4D system full color image forming subsystem 150A only in that the drum-to-drum delay memory 314 is changed to a page memory 320. Other blocks are identical with those of the 4D system full color image forming subsystem 150A, and therefore their description will be omitted.

(D) Image Forming Timing of 1D System Full Color Image Forming Subsystem

FIG. 17 is a timing chart showing an image forming timing of the 1D system full color image forming subsystem 150B.

FIG. 17 shows a case in which two images are continuously formed. In this case, the RGB image is outputted from the controller 250 according to the ITOP timing, and the YMCK data is saved in the page memory 320 after an image process delay t1 has been elapsed. The YMCK data is sequentially supplied to the image forming unit 170A. Because the image is formed color by color from the structural viewpoint, subsequent print data is supplied after the image formation in each of the colors has been completed.

The REGI signal is produced in the timing generator 315 after the delay process of the registration delay t3 from the generation of the ITOP signal has been conducted, the registration roller is driven at this timing, and a sheet is transported to the secondary transfer unit. The secondary transfer starts transfer at a timing delayed from the REGI signal by the transfer delay t4.

The processing of the second page starts at such a timing that the image forming process of a fourth color of the first page is not overlapped with the image forming process of a first color of the second page, and the same process is repeated in the case where a large number of sheets are printed.

(E) Electric Configuration of 1D System Monochrome Image Forming Subsystem

Figure 18:
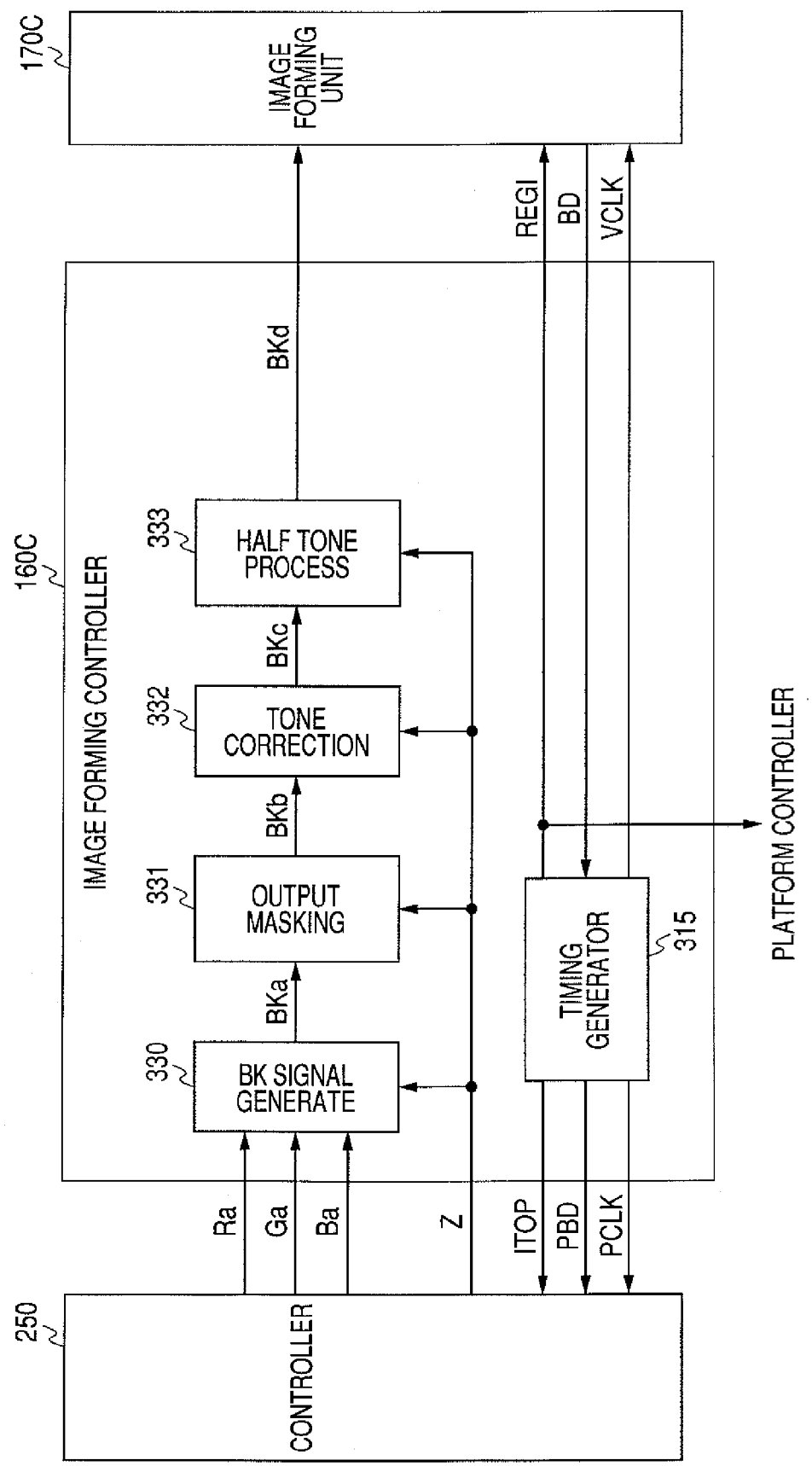
FIG. 18 is a block diagram showing a configuration of a 1D system monochrome image forming sub-system.

FIG. 18 is a block diagram showing the configuration of the 1D system monochrome image forming subsystem 150C.

The 1D system full color image forming subsystem 150C includes the image forming controller 160C including an image processor, the image forming unit 170A, and the fixing unit 180C. The image signal that is supplied from the controller 250 allows a BK signal to be generated by the image forming controller 160C in the RGB format as with the full color.

First, the RGB signal is converted into the BK signal by the BK generate circuit 330. Then, the BK signal is subjected to a density conversion by a LOG convert circuit 321, and is subjected to the tone correction by a tone correction circuit 322, thereby producing the print data by a halftone process circuit 323. The LOG convert circuit 321, the tone correction circuit 322, and the halftone process circuit 323 are perfectly identical in the functions with those in the full color system, and only one difference therebetween resides in that the number of channels is a BK single color, that is, one channel.

(F) Image Forming Timing of 1D System Full Monochrome Image Forming Subsystem

Figure 19:
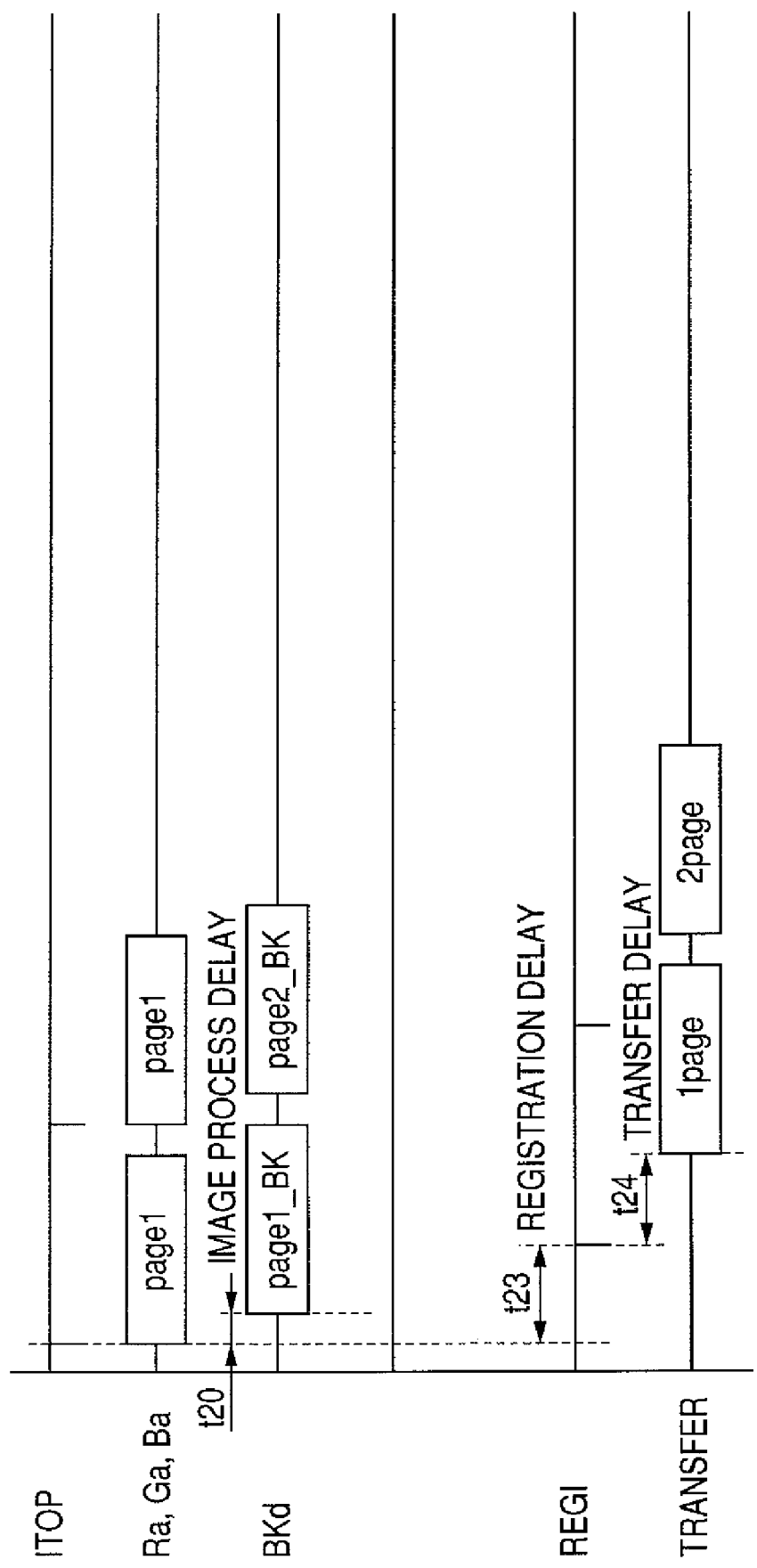
FIG. 19 is a timing chart showing the image formation timing of the 1D system monochrome image forming sub-system.

FIG. 19 is a timing chart showing an image forming timing of the 1D system monochrome image forming subsystem 150C.

FIG. 19 shows a case in which two images are continuously formed. In this case, the RGB image is outputted from the controller 250 according to the ITOP timing, and the BK data that is supplied to the image forming unit 170C is outputted after the image processing delay t20. The REGI signal is produced in the timing generator 315 after the delay process of the registration delay t23 from the generation of the ITOP signal has been conducted, the registration roller is driven at this timing, and a sheet is transported to the transfer unit. The transfer starts at a timing delayed from the REGI signal by the transfer delay t24.

The processing of the second page starts during the transfer operation of the first page, and the same process is repeated in the case where a large number of sheets are printed.

Operation According to First Embodiment

<One-Side Image Forming Operation Corresponding to High Speed Color Throughput>

Subsequently, a description will be given of the one-side image forming operation by means of the printer engine 100 when the image forming subsystem 150A corresponding to the above-mentioned high speed color throughput is equipped in the sheet transport platform 60.

After the printer engine controller 105 has received an instruction for starting an image forming job through the operation portion 260, the printer engine controller 105 transmits a sheet feed request command to the platform controller 65, and the transport unit 80 and the sheet feed unit 70 start to operate. Also, when the printer engine controller 105 transmits the image forming request command to the image forming controller 160, the image forming unit 170A and the fixing unit 180A start the image forming operation.

The respective photosensitive drums 602A to 602D of the respective image forming units 601Y, 601M, 601C, and 601BK which are rotationally driven at an arbitrary process speed are uniformly negatively charged by the primary chargers 603A to 603D, respectively. Then, the exposure device 607 irradiates the color separated image signal which is inputted from the external to the polygon mirror 618 which is rotationally driven by the scanner motor 617 from a laser emitting element. The image signals allow the electrostatic latent images of the respective colors to be formed on the respective photosensitive drums 602A to 602D via the reflector.

Then, yellow toner is stuck onto the electrostatic latent images that have been formed on the photosensitive drum 602A by means of the developing device 604A to which the development bias of the same polarity as the charge polarity (i.e., negative) of the photosensitive drum 602A is applied, to thereby visualize the electrostatic latent image as a toner image. The yellow toner image is primarily transferred onto the intermediate transfer belt 608 that is being driven by means of the transfer roller 605A to which the primary transfer bias (having polarity opposite to that of the toner (i.e., positive)) is applied in the primary transfer unit 615A that is disposed between the photosensitive drum 602A and the transfer roller 605A.

The intermediate transfer belt 608 to which the yellow toner image has been transferred is moved to the image forming unit 601M side. Likewise, in the image forming unit 601M, a magenta toner image that has been formed on the photosensitive drum 602B is superimposed on the yellow toner image on the intermediate transfer belt 608, and is then transferred by means of the primary transfer unit 615B. In this case, the non-transferred toner remaining on the respective photosensitive drums 602A to 602D is scraped off by the cleaner blades or the like that are disposed in the drum cleaner devices 606A to 606D, and is recovered.

In the following process, likewise, the cyan and block toner images that have been formed by the photosensitive drums 602C and 602D of the image forming units 601C and 601BK are sequentially superimposed on the toner images of yellow and magenta which have been superimposed and transferred onto the intermediate transfer belt 608 by the respective primary transfer units 615A to 615D, to thereby form the full color toner image on the intermediate transfer belt 608.

Then, a sheet is selected from the sheet feed cassette of a sheet feed unit 60-A at a timing when the toner image leading edge of the full color on the intermediate transfer belt 608 is moved to the secondary transfer unit 616 provided between the secondary transfer opposed roller 609 and the secondary transfer roller 611. Further, the pickup roller 502 is driven, the uppermost sheet of the transfer materials (i.e., sheets) P which are stacked in the sheet feed cassette is picked up, and is then transported to the sheet feed path 511.

Also, the transport roller 503 transports the transported transfer material P to the registration roller 613 of the image forming unit 170A. Then, the transfer material P is transported to the secondary transfer unit 616 by means of the registration roller 613 of the image forming unit 170A. The transfer material P is transported to the secondary transfer unit 616. Then, the toner images of the full color are secondarily-transferred onto the transfer material P by means of the secondary transfer roller 611 to which the secondary transfer bias (having a polarity opposite to that of the toner (i.e., positive)) is applied in a lump.

The transfer material P on which the toner image of the full color has been formed is transported to the fixing unit 180A. Then, the full color toner image is heated and pressurized by the fixing nip unit 614 between the fixing roller 612A and the pressure roller 612B, and is then thermally fixed on the surface of the transfer material P. After that, the transfer material P is transported to the transport unit 80-A, and is then discharged to the discharge tray on the top surface of the main body through the discharge path 525 of the transport unit 80-A by means of the discharge rollers 522 to thereby complete a series of image forming operation.

The above-mentioned operation is the image forming operation at the time of forming a one-side image.

<Duplex Image Forming Operation in Image Forming Apparatus Accepting High Speed Color Throughput>

Subsequently, a description will be given the duplex image forming operation in the image forming apparatus accepting the high-speed color throughput.

The duplex image forming operation is identical with the one-side image forming operation until the transfer material P is transported to the fixing unit 180A. The full color toner image is heated and pressurized by the fixing nip unit 614 between the fixing roller 612A and the pressure roller 612B, and is then thermally fixed on the surface of the transfer material P. After that, the rotation of the discharge rollers 522 stops in a state where most of the transfer material P is discharged onto the discharge tray on the top surface of the main body by the discharge rollers 522 through the discharge path 525 of the transport unit 80-A. In this case, the rotation of the discharge rollers 522 stops so that the rear end position of the transfer material P comes to a reversible position, that is, the rear end position of the transfer material P comes to the downstream side of a branch point of the discharge path 525 and the transport path 526.

Sequentially, the discharge rollers 522 are allowed to rotate in opposite directions of the rotation at the time of the one-side image forming operation, so that the transfer material P that stops being transported by stopping the rotation of the discharge rollers 522 is transported to the transport path 526 having the transport rollers 523 and 524. When the discharge rollers 522 are reversely rotated, the rear end side of the transfer material P that has been positioned at the reversible position reaches the transport rollers 523 as the front end side thereof.

After that, the transfer material P is transported to the transport rollers 524 by means of the transport rollers 523. Then, the transfer material P is transported to the sheet feed path 511 of the sheet feed unit 60-A. Also, the transport roller 503 transports the transported transfer material P to the registration roller 613 of the image forming unit 170A. Also, during the above-mentioned operation, an image forming request command is transmitted to the image forming controller 160 from the printer engine controller 105. As a result, as in the above-mentioned one-side image forming operation, the transfer material P is moved to the secondary transfer unit 616 by means of the registration roller 613 at a timing when the toner image leading edge of the full color on the intermediate transfer belt 608 is moved to the secondary transfer unit 616 provided between the secondary transfer opposed roller 609 and the secondary transfer roller 611.

After the leading edge of the toner image is made to coincide with the leading edge of the transfer material P by means of the secondary transfer unit 616 to transfer the toner image, the image formed on the transfer material P is fixed by the fixing unit 180A as in the one-side image forming operation. Again, the transfer material P is transported by the discharge rollers 522 of the transport unit 80-A, and is finally discharged onto the discharge tray, to thereby complete a series of image forming operation.

<One-Side Image Forming Operation Accepting Middle Speed Color Throughput>

Subsequently, a description will be given of the one-side image forming operation by the printer engine 100 when the image forming subsystem 150B accepting the above-mentioned middle speed color throughput is equipped in the sheet transport platform 60.

As in the case of the above-mentioned image forming subsystem 150A accepting the high speed color throughput, the transport unit 80 and the sheet feed unit 70 start to operate according to an instruction from the user. Then, when the image forming request command is transmitted to the image forming controller 160 from the printer engine controller 105, the photosensitive drum 632 rotates at an arbitrary process speed by means of the driving mechanism of the image forming unit 170B. Also, the photosensitive drum 632 is uniformly negatively charged by the primary charger 642.

Then, the scanner unit 631 irradiates the color separated image signal which is inputted from the external to the polygon mirror that is rotationally driven by the scanner motor 636 from a laser emitting element to thereby form an electrostatic latent image of yellow (Y) on the photosensitive drum 632 through a reflector and the like. A latent image formed on the photosensitive drum 632 is visualized with a developer of yellow (Y) at a position where the photosensitive drum 632 comes in contact with the developer unit 637A of yellow (Y) within the developer unit 637.

In addition, the photosensitive drum 632 rotates by means of the driving mechanism, and the developer of yellow (Y) on the photosensitive drum 632 is primarily transferred onto the intermediate transfer belt 633 that is being driven, by means of the transfer roller to which the primary transfer bias (having polarity opposite to that of toner (i.e., positive)) is applied at a position where the photosensitive drum 632 comes in contact with the intermediate transfer belt 633. In this case, the non-transferred toner that remains on the photosensitive drum 632 is scraped off by the cleaner blade 639, and is recovered in a recovery container. In this case, the developer unit 637 is allowed to rotate by about 90 degrees by driving means (not shown), to prepare for the subsequent development of magenta (M). Then, in the image formation of data of magenta (M), the latent image of data of magenta (M) is written on the photosensitive drum 632 as in the image formation of data of yellow (Y).

Subsequently, the photosensitive drum 632 rotates by the driving mechanism. Also, the photosensitive drum 632 is uniformly negatively charged by the primary charger 642. Then, the exposure device 607 irradiates the color separated image signal which is inputted from the external to the polygon mirror 635 that is rotationally driven by the scanner motor 636 from a laser emitting element, to thereby form an electrostatic latent image of magenta (M) on the photosensitive drum 632 through a reflector and the like. A latent image formed on the photosensitive drum 632 is visualized with a developer of magenta (M) at the same rotating position of the intermediate transfer belt 633 as that of yellow (Y).

In addition, the photosensitive drum 632 rotates by means of the driving mechanism, and the developer of magenta (M) on the photosensitive drum 632 is primarily transferred onto the intermediate transfer belt 633 that is being driven, by means of the transfer roller to which the primary transfer bias (having polarity opposite to that of toner (i.e., positive)) is applied at a position where the photosensitive drum 632 comes in contact with the intermediate transfer belt 633. Sequentially, the same image forming process as described above is conducted on cyan (C) and black (BK) under the control.

When the developers of four colors composed of yellow (Y), magenta (M), cyan (C), and black (BK) are superimposed on the intermediate transfer belt 633, the pickup roller 502 is driven, the uppermost sheet of the transfer materials (i.e., sheets) P which are stacked in the sheet feed cassette 70-B is picked up, and is then transported to the sheet feed path 511.

Also, the transport roller 503 transports the transported transfer material P to a registration roller 641 of the image forming unit 170B. Then, the transfer material P is transported to the secondary transfer unit by means of the registration roller 641 of the image forming unit 170B. The transfer material P is transported to the secondary transfer unit. Then, the toner images of the full color are secondarily-transferred onto the transfer material P by means of the secondary transfer roller 638 to which the secondary transfer bias (having polarity opposite to that of the toner (i.e., positive)) is applied in a lump.

The transfer material P on which the toner image of the full color has been formed is transported to the fixing unit 180B. Then, the full color toner image is heated and pressurized by the fixing unit 640, and is then thermally fixed on the surface of the transfer material P. After that, the transfer material P is transported to the transport unit 80-B. Then, the transfer material P is discharged to the discharge tray on the top surface of the main body through the discharge path 525 of the transport unit 80-B by means of the discharge rollers 522, to thereby complete a series of image forming operation.

The above-mentioned operation is the image forming operation at the time of forming a one-side image.

<Duplex Image Forming Operation Accepting Middle Speed Color Throughput>

Subsequently, a description will be given the duplex image forming operation in the image forming apparatus accepting the middle-speed color throughput.

The operation is identical with the one-side image forming operation until the transfer material P is transported to the fixing unit 180B. The full color toner image is heated and pressurized by the fixing unit 640, and is then thermally fixed on the surface of the transfer material P. After that, the rotation of the discharge rollers 522 stops in a state where most of the transfer material P is discharged onto the discharge tray on the top surface of the main body by the discharge rollers 522 through the discharge path 525 of the transport unit 80-B. In this case, the rotation of the discharge rollers 522 stops so that the rear end position of the transfer material P comes to a reversible position, that is, the rear end position of the transfer material P comes to the downstream side of a branch point of the discharge path 525 and the transport path 526.

Sequentially, the discharge rollers 522 are allowed to rotate in opposite directions of the rotation at the time of the one-side image forming operation, so that the transfer material P that stops being transported by stopping the rotation of the discharge rollers 522 is transported to the transport path 526 having the transport rollers 523 and 524. When the discharge rollers 522 are reversely rotated, the rear end side of the transfer material P that has been positioned at the reversible position reaches the transport rollers 523 as the front end side thereof.

After that, the transfer material P is transported to the transport rollers 524 by means of the transport rollers 523. Then, the transfer material P is transported to the sheet feed path 511 of the sheet feed unit 60-B. Also, the transport roller 503 transports the transported transfer material P to the registration roller 613 of the image forming unit 170B. Also, during the above-mentioned operation, an image forming request command is transmitted to the image forming controller 160 from the printer engine controller 105. As a result, as in the above-mentioned one-side image forming operation, the transfer material P is moved to the secondary transfer unit 616 by means of the registration roller 613 at a timing when the toner image leading edge of the full color on the intermediate transfer belt 608 is moved to the secondary transfer unit 616 between the secondary transfer opposed roller 609 and the secondary transfer roller 611.

After the leading edge of the toner image is made to coincide with the leading edge of the transfer material P by means of the secondary transfer unit 616 and the toner image is transferred onto the transfer material P, the image on the transfer material P is fixed by the fixing unit 180B as in the one surface image forming operation. Then, the transfer material P is again transported by the discharge rollers 522 of the transport unit 80-B, and finally discharged onto the discharge tray, to thereby complete a series of image forming operation.

<One-Side Image Forming Operation Accepting High Speed Monochrome Throughput>

Subsequently, a description will be given of the one-side image forming operation by the printer engine 100 when the image forming subsystem 150C accepting the above-mentioned high speed monochrome throughput is equipped in the sheet transport platform 60.

As in the case of the above-mentioned image forming subsystem 150A accepting the high speed monochrome throughput, the transport unit 80 and the sheet feed unit 70 start to operate according to an instruction from the user.

Also, when the image forming request command is transmitted to the image forming controller 160 from the printer engine controller 105, the photosensitive drum 662 rotates at an arbitrary process speed by means of the driving mechanism of the image forming unit 170C. Also, the photosensitive drum 662 is uniformly negatively charged by the primary charger 670.

Then, the exposure device 661 irradiates the image signal which is inputted from the external to the polygon mirror 664 that is rotationally driven by the scanner motor 665, from a laser emitting element, to thereby form an electrostatic latent image on the photosensitive drum 662 through a reflector or the like. A latent image on the photosensitive drum 662 is visualized with a developer at a position where the photosensitive drum 662 comes in contact with the developer unit 666.

Also, the pickup roller 502 is driven, the uppermost sheet of the transfer materials (sheets) P which are stacked in the sheet feed cassette 70-A is picked up, and is then transported to the sheet feed path 511. Also, the transport roller 503 transports the transported transfer material P to the registration roller 671 of the image forming unit 170A. The toner image is transferred onto the transfer material P that has been transported to the transfer unit 34 by means of the transfer roller 667 to which the transfer bias (polarity opposite to that of the toner (positive)) is applied.

The transfer material P on which the toner image has been formed is transported to the fixing unit 180C. Then, the toner image is heated and pressurized by the fixing unit 668, and thermally fixed on the surface of the transfer material P. After that, the transfer material P is transported to the transport unit 80-A. Then, the transfer material P is discharged to the discharge tray on the top surface of the main body through the discharge path 525 of the transport unit 80-A by means of the discharge rollers 522, to thereby complete a series of image forming operation. In this case, non-transferred toner remaining on the photosensitive drum 667 is scraped off by the cleaner blade 669, and is recovered.

The above-mentioned operation is the image forming operation at the time of the one-side image formation.

<Duplex Image Forming Operation Accepting High Speed Monochrome Throughput>

Subsequently, a description will be given the duplex image forming operation in the image forming apparatus accepting the high-speed monochrome throughput.

The operation is identical with the one-side image forming operation until the transfer material P is transported to the fixing unit 180C. The toner image is heated and pressurized by the fixing unit 668, and thermally fixed on the surface of the transfer material P. After that, the transfer material P is discharged onto the discharge tray on the top surface of the main body by the discharge rollers 522 through the discharge path 525 of the transport unit 80-A. When most of the transfer material P is discharged, the rotation of the discharge rollers 522 stops. In this case, the rotation of the discharge rollers 522 stops so that the rear end position of the transfer material P comes to a reversible position, that is, the rear end position of the transfer material P comes to the downstream side of a branch point of the discharge path 525 and the transport path 526.

Sequentially, the discharge rollers 522 are allowed to rotate in a direction opposite to the rotation at the time of the one-side image forming operation, so as to transfer the transfer material P that has stopped being transported due to the stoppage of the rotation of the discharge rollers 522 to the transport path 526 having the transport rollers 523 and 524. When the discharge rollers 522 are reversely rotated, the transfer material P that has been positioned at the reversible position reaches the transport rollers 523 with the rear end side thereof being as the front end side.

After that, the transfer material P is transported to the transport rollers 524 by means of the transport rollers 523. Then, the transfer material P is transported to the sheet feed path 511 of the sheet feed unit 60-A. Also, the transport roller 503 transports the transported transfer material P to the registration roller 671 of the image forming unit 170C. Also, during the above-mentioned operation, an image forming request command is transmitted to the image forming controller 160 from the printer engine controller 105. As a result, as in the above-mentioned one-side image formation, the transfer material P is moved to the transfer unit by means of the registration roller 613.

After the leading edge of the toner image is made to coincide with the leading edge of the transfer material P by means of the transfer unit to transfer the toner image onto the transfer material P, the image on the transfer material P is fixed by the fixing unit 180C as in the one surface image forming operation. The transfer material P is again transported by the discharge rollers 522 of the transport unit 80-A, and is finally discharged onto the discharge tray, to thereby complete a series of image forming operation.

<Communication Data for Completing Image Forming Operation and its Timing>

Subsequently, a description will be given of communication data as well as its communication timing which are used when the printer engine controller 105 communicates with the image forming controller 160 within the image forming subsystem 150, the platform controller 65 within the sheet transport platform 60, and the power unit 90, respectively, in order to complete the image forming operation in the printer engine 100 with reference to FIGS. 20A, 20B, 20C, 21A, 21B, 22A, 22B, 23A, 23B, 23C, 23D, 23E, 23F, 24A and 24B.

First, a description will be given of the parameters of a configuration communication and a command sequence immediately after a power is supplied to the printer engine 100 from the power unit 90, that is, when the power is on, with reference to FIGS. 20A, 20B, 20C, 21A, 21B, 22A and 22B.

(A) Parameters of Configuration Communication when Power is on:

FIGS. 20A, 20B, 20C, 21A and 21B are diagrams showing the parameters of a configuration communication when a power is on, respectively.

Referring to FIG. 20A, a data structure indicated by reference numeral 701 is a common portion of the configuration information data in each of the units, which is to be transmitted to the printer engine controller 105 when the power is on.

When the printer engine controller 105, the platform controller 65, and the image forming controller 160 start the processing upon receiving a power from the power unit 90, the data is transmitted from the platform controller 65 to the printer engine controller 105, and likewise from the image forming controller 160 to the printer engine controller 105, respectively. In this case, the data contents to be transmitted are contents for notifying the printer engine controller 105 what performances the platform controller 65 and the image forming controller 160 have as the subsystem and the platform.

Examples of the contents are as follows:

For example, there is a unit ID for determining the unit from which the information is obtained. Also, there is proposed information on a process speed at which a unit is operable. In this case, as regards the process speed, the fixable speed may be different in the full color mode and the monochrome mode even if the same transfer material is used, depending on the fixing condition or the transfer condition, for example, in the case where the image forming subsystem 150 enables color print.

Therefore, in order to accurately notifying the performance of the image forming subsystem, it is necessary that the process speed in the full color mode and the process speed in the monochrome mode are set with the color mode to notify those values and the color modes, respectively. On the contrary, in the case of the sheet transport platform, there are many cases in which the transport performance of the transfer material does not change between the full color mode and the monochrome mode, so the process speed values as well as the conditions common to the full color mode and the monochrome mode are notified in that case.

On the other hand, in the case where the type of transfer material is different, for example, in the case where a thick paper and a plain paper are compared with each other, there are many cases in which a difference occurs in the fixing conditions or the transport conditions. Therefore, it is necessary that each type of the transfer materials, that is, the material condition and the process speed are notified as one set.

In addition, a difference occurs in the fixing heater temperature for ensuring the fixing property due to a difference in the color mode or the material condition. Therefore, it is necessary to notify data such as the color mode or the material condition as well as data of an electric energy that is consumed by the unit under those conditions.

Taking the above into consideration, there is provided the data structure for notifying the information on the process speed as well as the assumed color mode, electric energy consumption, and material condition as one set, as in the configuration data shown by an example of 701.

In FIG. 20A, reference numeral 701 shows a case in which three kinds of process speeds should be notified, as an example. In the case of a unit that suffices for the notification of one kind of process speed, it is necessary to notify only that information. In addition, there is the possibility that an interval between the transfer materials, that is, a distance between the sheets is different depending on the units according to the conditions such as a sensor response time or the fixing property as the transport conditions. Therefore, data to be notified is exemplified in the data structure indicated by reference numeral 701.

Reference numeral 702 in FIG. 20B is a data structure that is indicative of an available power data to be notified the printer engine controller 105 of from the power unit 90. In the image forming apparatus according to this embodiment, there is adopted a structure having the image forming subsystem 150 provided with an arbitrary performance and the sheet transport platform 60. For that reason, the total electric energy that can be supplied from the power unit 90 and the structure data of the power system are important in deciding whether the running of the device can be conducted or not. As a result, the above-mentioned structure data should be notified to the printer engine controller 105 when the power is on as with the data of reference numeral 701.

Reference numeral 703 in FIG. 20C describes data to be notified as the performance data of the image forming subsystem 150 by the image forming controller 160 other than data that is notified with the configuration structure indicated by reference numeral 701. More specifically, there is the configuration information, that is, information such as the 4D color system image forming subsystem indicated by reference 150A, or the 1D system color image forming subsystem indicated by reference 150B. Also, in the case of the color image forming subsystem indicated by reference 150A or 150B, it is necessary to generate the ITOP signals of four colors at appropriate time intervals so as to develop and transfer the image of four colors. To achieve this, there is data "ITOP interval".

Also, in the case of the color image forming subsystem, there is a case in which it is necessary to obtain a required time from a time point where the ITOP signal for controlling the color image data that is initially developed is generated among the image data for one page until the image of four colors is developed and transferred, and the head of the image data in the sub scanning reaches the secondary transfer units 16 (150A) and 34 (150B), in order to position the data with respect to the transfer material. The data for achieving the above-mentioned purpose needs to be included as one kind of data indicated by reference numeral 703 as the occasion demands.

Reference numeral 704 in FIG. 21A is the printer engine operating condition information that is decided by the printer engine controller 105, which operates the printer engine 100 as the image forming apparatus. For example, it is possible to derive the operating conditions under which all of the units can normally operate, and the printer engine 100 is capable of obtaining the stable performance as the image forming apparatus, from the process speed values and the electric energy consumption under the respective color modes and the respective material conditions, which are notified from the sheet transport platform 60 and the image forming subsystem due to the data structures of 701 and 703, and the available electric power that is notified by the data structure of 702. Also, it is possible that the printer engine controller 105 holds several operating conditions as specific values in advance, and selects the operating conditions that are consistent to the data collected from the respective units. In an example of 704, there is described a case of deciding three kinds of process speeds and PPMs (print per minute) under the respective color modes and the respective material conditions. Also, it is possible to notify the unacceptable combination of the color modes with the materials as the occasions demand.

Reference numeral 705 in FIG. 21B is a data structure when after the operating conditions have been notified from the printer engine controller 105, the image forming controller 160 and the platform controller 65 freshly decide the electric energy consumption under the notified conditions, and again notify the printer engine controller 105 of the decided electric energy consumption. The data is used when the available electric energy that has been received by the printer engine controller 105 from the power unit 90 in the data structure 702 is compared with the total of electric energies that are consumed by the respective units under the decided conditions, to correct the availability of operation and the conditions.

The above description is given of the parameters of the configuration communication when the power is on.

In the above description, it is assumed that the respective units that are associated with the sheet transport platform 60 and the image forming subsystem 150, for example, the image forming unit 170 and the fixing unit 180 which are associated with the image forming subsystem 150 without having unique control means, that is, the subsystem per se conducts the storage or control of the performance information of the units that are associated with the subsystem. However, in the case where the associated units have the inherent control means, it is possible that the platform controller 65 and the image forming controller 160 are notified of the configuration information of the data structure 701 from the respective associated units, compile those configuration information to communicate with the printer engine controller.

(B) Command Sequence of Configuration Information when Power is on:

FIGS. 22A and 22B are diagrams showing the details of a command sequence in the architecture information when power is on.

An example of FIG. 22A shows a sequence in the case where the sheet transport platform 60 and the image forming subsystem 150 execute the storage and control of the performance information of the respective units that are associated therewith.

After a power SW (not shown) turns on, and a power is supplied to the respective units from the power unit, the performance information based on the data structure of 701 is first transmitted to the printer engine controller 105 from the platform controller 65 and the image forming controller 160, as configuration data. In this case, data indicated by reference numeral 703 is also added to data indicated by reference numeral 701 from the image forming controller 160. The available electric energy data based on the data structure of 702 is transmitted to the engine controller 105 from the power unit 90 around the same time as the data communication.

The printer engine controller 105 decides the operating conditions (the process speeds and the PPM in the respective materials and the respective color modes) as the image forming apparatus on the basis of the received configuration data. Therefore, the printer engine controller 105 transmits the decided operating conditions to the platform controller 65 and the image forming controller 160 with the data structure of 704.

The platform controller 65 and the image forming controller 160 recognizes that the image forming apparatus operates on the basis of the operating condition data of 704, and prepares for the image forming operation such as the generation of the operation parameter, and simultaneously calculates the electric energy consumption under the given operating conditions again. The platform controller 65 and the image forming controller 160 transmit the calculated results to the printer engine controller on the basis of the data structure of 705.

Through the above-mentioned command sequence, a series of configuration communication at the time of power on is completed.

An example of FIG. 22B shows a sequence in the case where the units that are associated with the sheet transport platform 60 and the image forming subsystem 150 have the inherent control means.

After the power SW (not shown) turns on and a power is supplied to the respective units from the power unit, the sheet feed unit 70 and the transport unit 80 which are units associated with the platform controller 65 first transmit the performance information based on the data structure of 701 to the platform controller 65 as configuration data. Likewise, the fixing unit 180 that is a unit associated with the image forming controller 160 transmits the performance information based on the data structure of 701 to the image forming controller 160. The image forming unit 170 transmits the data indicated by reference numeral 703 to the image forming controller 160 in addition to the data indicated by reference numeral 701, likewise.

The platform controller 65 decides the performance information as the platform controller 65 on the basis of the performance information that has been transmitted from the sheet feed unit 70 and the transport unit 80. The image forming controller 160 also conducts the same work. After that, the platform controller 65 transmits the performance information based on the data structure of 701, and the image forming controller 160 transmits the performance information based on the data structure of 703 in addition to the data structure of 701, to the printer engine controller 105 as the configuration data, respectively. The available electric energy data based on the data structure of 702 is transmitted to the engine controller 105 from the power unit 90 around the same time as the data communication.

The printer engine controller 105 decides the operating conditions (the process speeds and the PPM in the respective materials and the respective color modes) as the image forming apparatus on the basis of the received configuration data.

After that, the printer engine controller 105 transmits the decided operating conditions to the platform controller 65 and the image forming controller 160 with the data structure of 704. The platform controller 65 and the image forming controller 160 recognizes that the image forming apparatus operates on the basis of the operating condition data of 704, and transmit the information to the sheet feed unit 70, the transport unit 80, the image forming unit 170, and the fixing unit 180, which are the respectively associated units.

The sheet feed unit 70, the transport unit 80, the image forming unit 170, and the fixing unit 180 recognize that the image forming apparatus operates on the basis of the operating conditions that are given, respectively, and prepare for the image forming operation such as the generation of the operation parameter, and calculates the electric energy consumption under the given operating conditions again, simultaneously. The sheet feed unit 70, the transport unit 80, the image forming unit 170, and the fixing unit 180 transmit the calculated results to the platform controller 65 and the image forming controller 160 on the basis of the data structure of 705, respectively.

The platform controller 65 and the image forming controller 160 calculate the total of electric power consumption data on the basis of the electric power consumption data which are transmitted from the respective associated units, respectively. Further, the platform controller 65 and the image forming controller 160 transmit the calculated results to the printer engine controller on the basis of the data structure of 705.

Through the above-mentioned command sequence, a series of configuration communication at the time of power on is completed.

(C) Communication Parameter and Communication Command Sequence in Conducting Image Forming Operation Subsequently, a description will be given of a communication parameter and a communication command sequence which are transferred between the respective units with reference to FIGS. 23A, 23B, 23C, 23D, 23E, 23F, 24A and 24B. FIGS. 23A, 23B, 23C, 23D, 23E and 23F are explanatory diagrams showing the communication parameter in conducting the image forming operation, and FIGS. 24A and 24B are explanatory diagrams showing the communication command sequence in conducting the image forming operation.

The data structure indicated by reference numeral 711 in FIG. 23A is a common portion of the sheet feed request command and parameter which are transmitted to the platform controller 65 and the image forming controller 160 from the printer engine controller 105 in order to start the transport of the transfer material in conducting the image forming operation.

Command data indicated by reference numeral 711 is a sheet feed request, so it is possible to transmit the command data only to the platform controller 65, and it is possible to transmit the command data to the image forming controller 160 in an image forming operation reserving manner. In this embodiment, a description will be given of a case in which the command data is also transmitted to the image forming controller 160 in the reserving manner.

As an example of data necessary for a sheet feed start request, reference numeral 711 is indicative of data such as command ID representative of a sheet feed start request command, page ID corresponding to required image data, color modes, sheet sizes, material information, or print surfaces (e.g., one-sided surface, duplex front surface, duplex rear surface).

Command data indicated by reference numeral 712 of FIG. 23B is data not described in the command data indicative of reference numeral 711, which is unnecessary to be notified the image forming controller 160 of as the reservation information of the image forming operation, but is necessary for the platform controller 65 to control the transport of the transfer material in fact. More specifically, the command data is representative of sheet feed stage information on the sheet feed start, and a discharge direction necessary when transporting the sheet by the transport unit.

Reference numeral 713 of FIG. 23C is sheet feed request ACK command data for notifying the printer engine controller 105 of the results of deciding that the platform controller 65 starts based on the command data 711 and 712. Specific examples of the parameter are page ID, the sheet feed stage information, sheet feed status information indicating whether the sheet feed normally started or will start, or not, and NG factor information in the case where the sheet feed status information does not start, that is, NG is given. Specific examples of the NG factors are no sheet state, an error state, and a jamming state. Also, in this embodiment, a fact that the platform controller 65 transmits the sheet feed request ACK command indicative of reference numeral 713 also means a timing at which the image forming operation can start.

Reference numeral 714 of FIG. 23D is image forming request command data which is transmitted to the image forming controller 160 from the printer engine controller 105 in the case where the platform controller 65 notifies the sheet feed start in the command data 713. The printer engine controller 105 issues the command at a stage where the controller 105 prepares for the image formation. Specific examples of the parameter are page ID and color modes.

Reference numeral 715 of FIG. 23E is image forming operation start notice command data for notifying the printer engine controller of the fact that the image forming controller 160 starts the image forming operation in fact upon issuing the image forming request with respect to the image forming controller 160 in the command data 714. The image forming controller 160 issues the command 715 simultaneously when generating an ITOP signal that is a trigger which starts the image forming operation. Upon receiving the command of 715, the printer engine controller 105 transmits the command of 715 to the platform controller 65 to control the transport of the transfer material. A specific example of the parameter is page ID.

Reference numeral 716 of FIG. 23F is data of an image forming/sheet transport end notice command for notifying the detection result that the platform controller 65 detects that the transfer material is discharged to the external from the transport unit 80 or the transfer material remains within the device because of the occurrence of jamming or the like, that is, all of the image forming operation and the transport operation have been completed. According to the command, the printer engine controller 105 recognizes whether the image forming operation of the subject image (i.e., page) has been normally completed, or not. As the specific examples of the parameter, there are proposed an end status that notifies whether the image forming operation has been normally completed, or not, and an NG factor indicative of a factor affecting that the image forming operation has not been normally completed. Examples of the NG factor are an error state and a jamming state.

The above description is given in detail of the parameter of the command data which is communicated by the printer engine controller 105 between the platform controller 65 and the image forming controller 160 with the image forming operation.

In the above description, it is assumed that the respective units that are associated with the sheet transport platform 60 and the image forming subsystem 150, for example, the image forming unit 170 and the fixing unit 180 which are associated with the image forming subsystem 150 have no unique control means such as CPU, that is, the subsystem per se controls the units that are associated with the subsystem. In the case where the associated units have the unique control means, it is possible that the platform controller 65 and the image forming controller 160 transmit the necessary command data to the respective associated units at an appropriate timing. With the above-mentioned configuration, the respective associated units control a part of the image forming operation, and the platform controller 65 and the image forming controller 160 get the control results to be transmitted from the respective associated units as the occasion demands, compile the results, and thereafter communicate with the printer engine controller.

The command sequence in the image forming operation will be described in more detail with reference to FIGS. 24A and 24B.

In this embodiment, a description will be given of a case in which a typical 1-page image forming operation normally starts and ends.

An example of FIG. 24A shows a sequence in a system in which the sheet transport platform 60 and the image forming subsystem 150 control the respective units that are associated therewith. In starting the image forming operation, the printer engine controller 105 first transmits the sheet feed command to the platform controller 65 and the image forming controller 160. The printer engine controller 105 transmits the data indicated by reference numeral 711 as well as the data indicated by reference numeral 712 to the platform controller 65. The printer engine controller 105 transmits the data indicated by reference numeral 711 to the image forming controller 160.

After receiving the sheet feed request command, the platform controller 65 determines whether the sheet feed can start, or not, and then transmits the determined results to the printer engine controller 105 with the sheet feed request ACK command of the data structure indicated by reference numeral 713. In this case, the conditions of the determination that the sheet feed can start include a state in which there is transfer material, and a state in which no jamming occurs due to another transfer material that has already started to be fed.

In the case where the printer engine controller 105 receives the sheet feed request ACK command 713, and recognizes that the platform controller 65 determines that the sheet feed can start, the printer engine controller 105 transmits the image forming start request with the data structure indicated by reference numeral 714 to the image forming controller 160.

The image forming controller 160 receives the image forming start request indicated by reference numeral 714, and determines, for example, whether a time has been elapsed from the previous image formation as much as the image formation interval that is obtained from the set value of the PPM, or not. In the case where the image forming controller 160 determines that the image can be formed, the image forming controller 160 generates the ITOP signal and starts the image forming operation while transmitting the image forming operation start notice with the data structure indicated by reference numeral 715 to the printer engine controller 105 at the same time.

The printer engine controller 105 receives the image forming operation start notice of the data 715, and recognizes that the image formation has normally started. At the same time, for the transfer material transport control, the printer engine controller 105 transmits data of reference numeral 715 to the platform controller 65. Upon receiving the data of reference numeral 715, the platform controller 65 recognizes that the transport control is conducted by the registration roller so that the transfer material is transferred by the secondary transfer units 16 and 34 under the control. On the other hand, the image forming controller 160 controls the timing of the registration roller so that the development image and the transfer material coincide with each other in the position after a given period of time from the generation of the ITOP signal. At the same time, the image forming controller 160 notifies the platform controller 65 that the transport operation of the transfer material has started actually. Upon receiving the notice, the platform controller 65 starts to drive the load of the transfer material upstream of the registration roller.

After the image forming control and the transport control have been conducted by the platform controller 65 and the image forming controller 160, the transfer material is delivered to the sheet transport platform from the interior of the image forming subsystem 150. After that, when the platform controller 65 recognizes that the transfer material is discharged to the external from the sheet transport platform 60, an image forming and transporting end notice command with the data structure indicated by reference numeral 716 is issued to the printer engine controller 105.

Upon receiving the image forming and transport end notice command of reference numeral 716, the printer engine controller 105 recognizes that a series of image forming operation on the transfer material corresponding to the subject image has been perfectly completed.

The above description is the details of the command sequence from the start of the 1-page image forming operation to the end thereof in the system where the sheet transport platform 60 and the image forming subsystem 150 manage the control of the respective units associated therewith.

An example of FIG. 24B shows a sequence in the case where the units associated with the sheet transport platform 60 and the image forming subsystem 150 have the inherent control means. When the image forming operation starts, the printer engine controller 105 first transmits a sheet feed request command to the platform controller 65 and the image forming controller 160. The printer engine controller 105 first transmits the data indicated by reference numeral 712 to the platform controller 65 in addition to the data indicated by reference numeral 711. The printer engine controller 105 transmits the data indicated by reference numeral 711 to the image forming controller 160.

Upon receiving the sheet request command, the platform controller 65 transmits the data indicated by reference numeral 712 to the sheet feed unit 70 in addition to the received sheet feed request command 711 as it is. Also, the image forming controller 160 transmits the received sheet feed request command 711 to command the image forming unit 170 and the fixing unit 180 as it is.

Upon receiving the sheet feed request command, the sheet feed unit 70 determines whether the sheet feed is capable of starting, or not. Then, the sheet feed unit 70 transmits the determined results to the platform controller 65 by the sheet feed request ACK command having the data structure indicated by reference numeral 713. In this case, the conditions of the determination that the sheet feed can start include a state in which there is transfer material, and a state in which no jamming occurs due to another transfer material that has already started to be fed.

The platform controller 65 transmits the sheet feed request ACK command having the data structure indicated by reference numeral 713 indicative of the same result to the printer engine controller 105 according to the sheet feed request ACK command that has been received from the sheet feed unit 70, likewise. In the case where the printer engine controller 105 receives the sheet feed request ACK command 713, and recognizes that the platform controller 65 determines that the sheet feed is capable of starting, the printer engine controller 105 transmits the image forming start request with the data structure indicated by reference numeral 714 to the image forming controller 160.

The image forming controller 160 transmits the received image forming start request command to the image forming unit 170 and the fixing unit 180 as it is. Upon receiving the image forming start request of the mage forming start request indicated by reference numeral 714, the image forming unit 170 determines, for example, whether a time has been elapsed since the time of the image formation as much as the image formation interval that is obtained from the set value of the PPM, or not. In the case where the image forming unit 170 determines that the image can be formed, the image forming unit 170 generates the ITOP signal and starts the image forming operation while transmitting the image forming operation start notice with the data structure indicated by reference numeral 715 to the image forming controller 160 at the same time.

The image forming controller 160 transmits the same contents as the image forming operation start notice 715 which has been transmitted from the image forming unit, to the printer engine controller 105. Also, because the image forming unit 170 starts the image forming operation, the image forming controller 160 transmits the image forming operation start notice 715 to the fixing unit 180 so as to notify the fixing unit 180 that the transfer material is transported to the fixing unit 180 later, likewise.

The printer engine controller 105 receives the image forming operation start notice indicated by reference numeral 715, and recognizes that the image formation has normally started. At the same time, the printer engine controller 105 also transmits data indicated by reference numeral 715 to the platform controller 65 in order to control the transfer material transport. After receiving the data of 715, the platform controller 65 transmits the same data as the image forming operation start notice of the received data 715 to the sheet feed unit 70 as it is.

Upon receiving the data of 715, the platform controller 65 and the sheet feed unit 70 recognize that the subject transfer material is transported by the registration roller under the control so that the subject transfer material is transferred by the secondary transfer units 16 and 34 under the control. On the other hand, the image forming unit 170 controls the timing of the registration roller so that the development image and the transfer material coincide with each other in the position after a given period of time from the generation of the ITOP signal. At the same time, the image forming unit 170 notifies the platform controller 65 that the transport operation of the transfer material has started actually through the image forming controller 160. Upon receiving the notice, the platform controller 65 transmits the notice to the sheet feed unit 70 without any delay at the same time, thereby starting to drive the load of the transfer material upstream of the registration roller.

The platform controller 65 notifies the transport unit 80 of the sheet feed start request command including the contents of 711 and 712 which have been previously received from a timing at which the platform controller 65 has received the image forming operation start notice of the data 715 to a timing at which the transfer material is delivered to the sheet transport platform 60 from the interior of the image forming subsystem 150. The platform controller 65 allows the transport unit to prepare for receiving the transfer material.

After that, when the transport unit 80 receives and transports the transfer material, and finally recognizes that the transfer material is discharged to the external, the image forming and transport end notice command with the data structure indicated by reference numeral 716 is issued to the platform controller 65.

Upon receiving the image forming and transport end notice 715 from the transport unit 80, the platform controller 65 transmits the notice of the same contents 715 to the printer engine controller 105. Upon receiving the image forming and transport end notice command of reference numeral 716, the printer engine controller 105 recognizes that a series of image forming operation on the transfer material corresponding to the subject image has been perfectly completed.

The above description is the details of the command sequence from the start of the 1-page image forming operation to the end thereof in the case where the units that are associated with the sheet transport platform 60 and the image forming subsystem 150 have the inherent control means.

<First Detailed Example of Processing in Determining Operation Specification>

Subsequently, a description will be given of a first detailed example of processing when the printer engine controller 105 determines the operation specification of the printer engine 100 at the time of the configuration communication, which is described above with reference to FIGS. 22A and 22B. That is, a description will be given of the details of the processing in determining the operation specification of the printer engine 100 in the case where the sheet transport platform 60 and the image forming subsystem 150 manage storage and control of the performance information of the respective units associated therewith. The description refers to FIGS. 25A, 25B, 25C, 26, 27, 28A, 28B, 28C, 29A, 29B and 29C.

Reference numeral 1750 in FIG. 25A is indicative of data based on the data structure represented by reference numeral 701 which is transmitted from the image forming controller 160 to the printer engine controller 105. In the example indicated by reference numeral 1750, the image forming subsystem 150 is a subsystem of the 4D color system.

Three kinds of process speeds are defined, and a first set is "color, material: normal/recycle paper, a process speed (hereinafter referred to as "PS"): 180 mm/sec, power consumption 800 W". A second set is "color, material: a thick paper/OHT, PS: 90 mm/sec, power consumption 600 W". A third set is "monochrome, material: all, PS: 250 mm/sec, power consumption 800 W".

A case in which the designation of the material is "all" indicates that other conditions are met with respect to all of the compliant materials. Then, the shortest sheet-to-sheet distance is 30 mm, and the lowest transport speed is 60 mm/sec. Those inherent performance information is transmitted to the printer engine controller 105 from the image forming controller 160 at a timing shown in FIG. 22A.

Reference numeral 1751 shown in FIG. 25B is indicative of data based on the data structure represented by reference numeral 701 which is transmitted from the platform controller 65 to the printer engine controller 105.

In the example indicated by reference numeral 1751, the sheet transport platform 60 enables 350 mm/sec as the upper limit and enables 70 mm/sec as the lower limit value as the performance of the transport speed. The sheet transport platform shown in this example can be transported at an arbitrary speed if the speed is between the above-mentioned upper and lower limit values in any materials. Then, the power consumption allows the inherent performance information to be transmitted at a timing shown in FIG. 22A to the printer engine controller 105 from the platform controller 65.

Reference numeral 1752 shown in FIG. 25C is an available electric energy that is transmitted from the power unit 90. The example of 1752 shows "total available power: 1200 W, power system: three systems of 3.3 V, 5 V, and 24 V". The inherent performance information is transmitted to the printer engine controller 105 from the power unit 90 at a timing shown in FIG. 22A.

Figure 26:
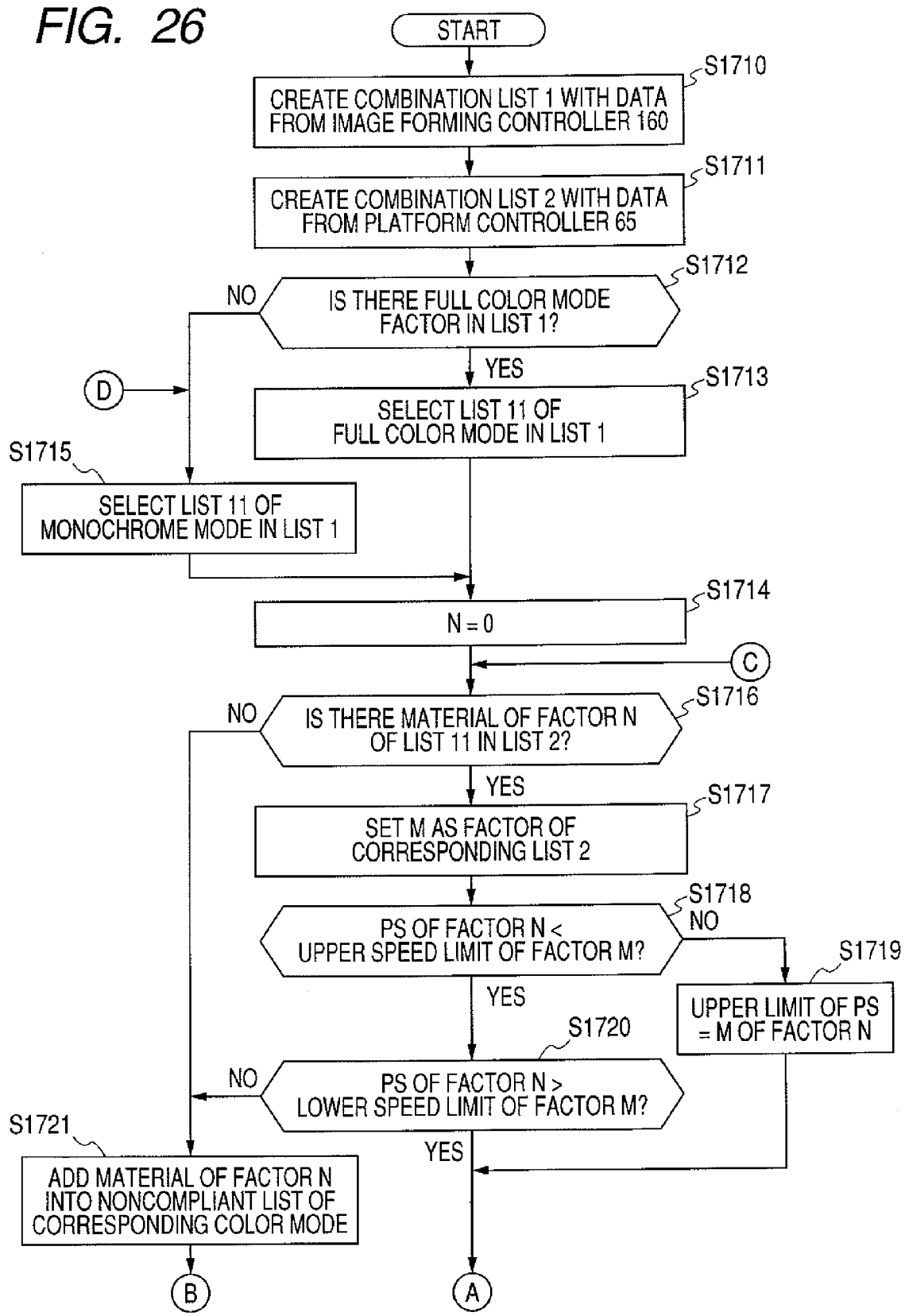
FIG. 26 is a flowchart showing a deciding process for deciding an operation specification of a printer engine.
Figure 27:
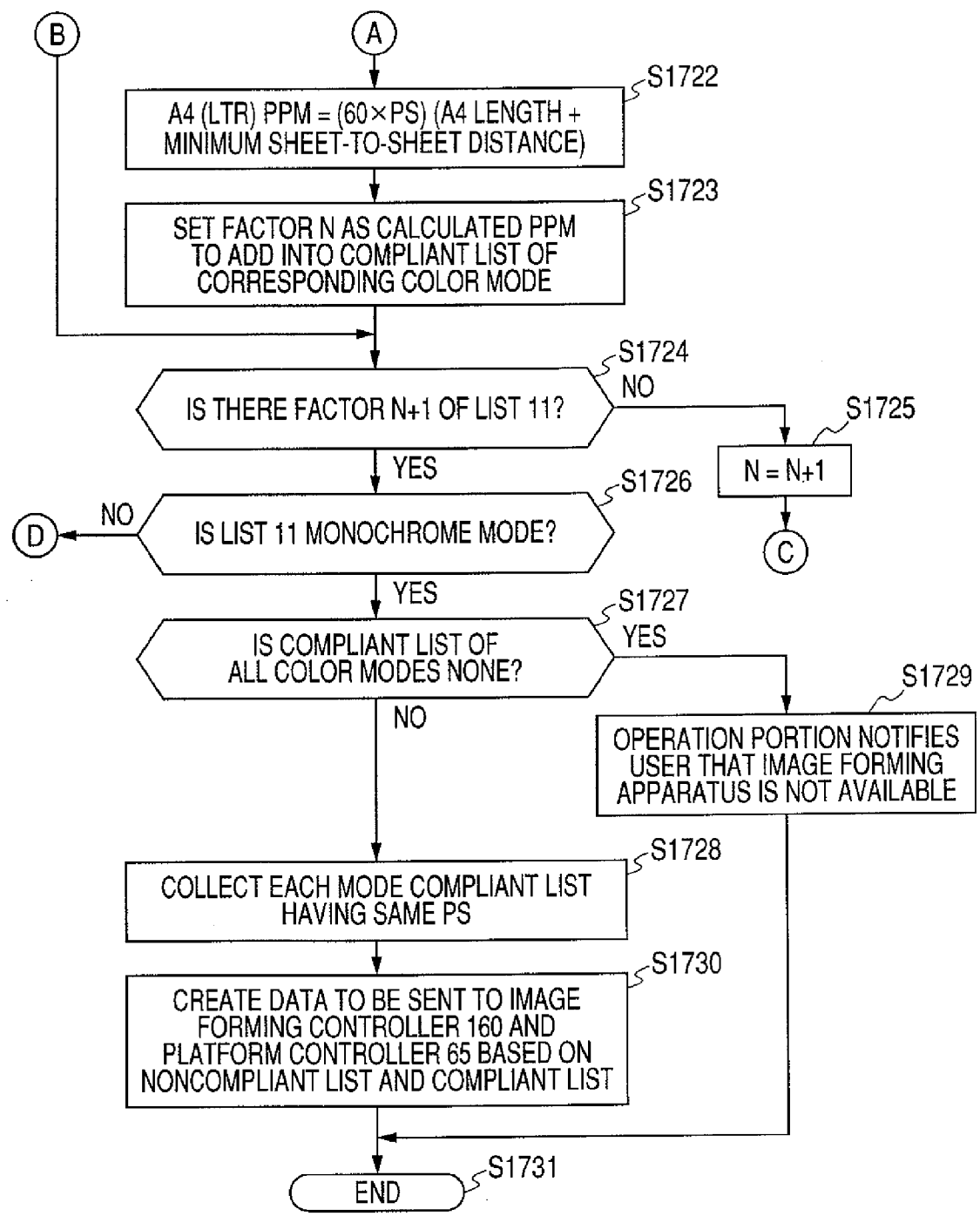
FIG. 27 is a flowchart subsequent to the flowchart shown in FIG. 26.

FIGS. 26 and 27 are flowcharts showing a process for determining the operation specification of the printer engine 100 from data collected from each of the image forming controller 160, the platform controller 65, and the power unit 90 by the printer engine controller 105.

First of all, in Step S1710, the printer engine controller 105 creates the combination list 1 with data of 1 set in the respective PS corresponding to the respective materials in the respective color modes from the inherent information data that has been transmitted from the image forming controller 160.

Next, in Step S1711, the printer engine controller 105 creates the combination list 2 with data from the inherent information data that has been transmitted from the platform controller 65. In addition, in Step S1712, the printer engine controller 105 determines whether a full color mode factor exists in the combination list 1, or not, that is, whether the image forming subsystem 150 is compliant with full color, or not.

In the case where the printer engine controller 105 determines that there exists the full color mode factor in Step S1712, the printer engine controller 105 selects a list 11 of the full color mode factor in the combination list 1 in Step S1713, and then conducts the following processing. On the other hand, in the case where the printer engine controller 105 determines that there does not exist the full color mode factor in Step S1712, the printer engine controller 105 selects a list 11 of the monochrome mode factor in the combination list 1 in Step S1715, and then conducts the following processing.

First, in Step S1714, the printer engine controller 105 substitutes 0 for a variable N as a factor in the post-processing. In Step S1716, the printer engine controller 105 determines whether the same material as that of an N-th factor of the list 11 exists in the list 2, or not. In the case where the printer engine controller 105 determines that the same material exists in the list 2 in Step S1716, the printer engine controller 105 sets a variable M as a factor number of the corresponding list 2 in Step S1717. In the case where the printer engine controller 105 determines that the same material does not exist in the list 2 in Step S1716, the processing is advanced to Step S1721 that will be described later.

In Step S1718 subsequent to Step S1717, the printer engine controller 105 determines whether an upper limit transport speed of an M-th factor in the combination list 2 is larger than PS of the N-th factor in the list 11, or not. In the case where the printer engine controller 105 determines that the result is yes in Step S1718, the printer engine controller 105 determines whether the lower limit transport speed of the M-th factor in the combination list 2 is smaller than PS of the N-th factor in the list 11, or not, in Step S1720. In the case where the printer engine controller 105 determines that the result is no in Step S1718, the printer engine controller 105 sets the upper limit value of the M-th factor in the list 2 as the value of PS of the N-th factor in the list 11 in Step S1719, an the processing is then advanced to Step S1722 that will be described later.

Also, in the case where the printer engine controller 105 determines that the result is yes in Step S1720, the printer engine controller 105 calculates a value of the PPM (print per minute) of a letter size (or A4 size) which is the most standard size in the image forming apparatus in Step S1722. In the calculation formula, a value obtained by multiplying the PS speed of the N-th factor in the list 11 which has been determined up to Step S1720 by 60 (1 minute=60 seconds) is divided by a value obtained by adding a length (216.9 mm) of the letter size in the transport direction to the shortest sheet-to-sheet distance (30 mm in this embodiment) indicated in the transmit data from the image forming controller 160.

In the case where the printer engine controller 105 determines that the result is no in Step S1720, this is equal to a result that the image forming condition of the material in the corresponding color mode does not meet the operating condition as the printer engine. As a result, the material of the N-th factor in the list 11 is added to a noncompliant material list of the corresponding subject color mode. After that, the processing is advanced to Step S1724 that will be described later.

In Step S1723 subsequent to Step S1722, a value of the PPM that has been calculated in Step S1722 is set in the data contents of the N-th factor in the list 11, and the combination data is added into the compliant material list of the corresponding color mode.

After that, in Step S1724, the printer engine controller 105 determines whether there exists the (N+1)-th factor in the list 11, or not, that is, whether there exists a remaining factor in the list to be processed, or not. In the case where the printer engine controller 105 determines that the result is yes in Step S1724, the printer engine controller 105 determines whether the list 11 currently intended is the list of the monochrome mode, or not in Step S1726. In the case where the printer engine controller 105 determines that the result is no in Step S1724, the printer engine controller 105 rewrites the variable N to a value of N+1 in Step S1725, and the processing is returned to the above-mentioned Step S1716.

In the case where the printer engine controller 105 determines that the result is no in Step S1726, the processing is returned to the above-mentioned Step S1715. Then, the printer engine controller 105 initializes the list to the list of the monochrome mode, and repeats the processing subsequent to Step S1714. In the case where the printer engine controller 105 determines that the result is yes in Step S1726, all factors in the intended list have been completed. As a result, in Step S1727, the printer engine controller 105 determines whether the compliant material list of all the color modes is nil, or not.

When the compliant material list of all the color modes is nil, this indicates that the sheet transport platform 60 and the image forming subsystem 150 have the operating conditions which conflict with each other (for example, a case in which the lower limit transport speed of the sheet transport platform 60 is larger than the values of all the processing speed list).

In the case where the printer engine controller 105 determines that the result is yes in Step S1727, since the sheet transport platform 60 and the image forming subsystem 150 have the operating conditions which conflict with each other, a display that the operation as the image forming apparatus is disabled is displayed on the operation portion 260. Then, the configuration communication is completed in Step S1731.

In the case where the printer engine controller 105 determines that the result is no in Step S1727, this case indicates that the processing of all the factors in the list to be processed have been normally completed, and the operation as the image forming apparatus is enabled. Subsequently, in Step S1728, the printer engine controller 105 collects each the mode compliant list having the same PS (PPM also identical) which are set in the each factor of the respective compliant material lists of the full color mode (if existing) and the monochrome mode.

In Step S1730 after processing of Step S1728, the printer engine controller 105 creates data to be sent to the image forming controller 160 and the platform controller 65 with the data structure of reference numeral 704 on the basis of the noncompliant list and compliant list in each of the produced color modes, and subsequently completes a series of processing in Step S1731.

A description will be given of an example of a process of determining the operation specification of the respective parameters in this embodiment based on the flowcharts shown in FIGS. 26 and 27 and its results with reference to FIGS. 28A, 28B, 28C, 29A, 29B and 29C.

Reference numeral 1753 shown in FIG. 28A is indicative of a list at the full color mode of the combination list 1 in Step S1710 in the flowcharts shown in FIGS. 26 and 27. Reference numeral 1754 of FIG. 28B is a list at the monochrome mode, likewise. Reference numeral 1755 shown in FIG. 28C is indicative of a combination list 2 in Step S1711 in the flow-chart shown in FIG. 26.

Data indicated by reference numeral 1756 in FIG. 29A shows the results of applying the processing of the flowcharts shown in FIGS. 26 and 27 to the respective factors of the lists 1753, 1754, and 1755.

The results obtained on the basis of the color mode, the material, the PS, the shortest sheet-to-sheet distance, the upper limit transport speed, and the lower limit transport speed of the respective lists 1753, 1754, and 1755 shown in FIGS. 28A, 28B and 28C are "full color, PS: 180 mm/sec, compliant material: normal, recycle paper, PPM: 43.7", "full color, PS: 90 mm/sec, compliant material: thick paper, OHT, PPM: 21.8", and "monochrome, PS: 250 mm/sec, compliant material: ALL, PPM: 60.7". Also, the noncompliant material list is not created in the parameter of this embodiment.

Reference numeral 1757 shown in FIG. 29B and reference numeral 1758 shown in FIG. 29C are examples of electric energy consumption notice based on the decided operation specification according to the data structure of reference numeral 705 after the image forming controller 160 and the platform controller 65 have received data indicated by reference numeral 704 shown in FIG. 22A.

Reference numeral 1757 is data of the image forming controller 160, which is 800 W since the maximum electric energy consumptions of the specification notified by the configuration data 1750 and the decided operation specification are identical with each other. Reference numeral 1758 denotes data of the platform controller 65, which is 215 W of the electric energy consumption that is reduced as much as the specification of the PS is slightly different from that notified by the configuration data 1751.

The data of reference numeral 1751 to 1758 according to this embodiment is described with reference to specific numerals. This is made for simplifying the description, and more particularly, the rate calculation of the specific electric energy consumption of reference numeral 1758 is merely one example, and the present invention is not limited to the rates described in this embodiment.

<Second Detailed Example of Processing in Determining Operation Specification>

Subsequently, a description will be given of a case in which the units associated with the sheet transport platform 60 and the image forming subsystem 150 have the inherent control means as shown in the above-mentioned FIG. 22B. The description refers to FIGS. 30A, 30B, 31, 32, 33A, 33B, 33D and 34.

An example of FIG. 22B shows a case in which the function units having control means such as a CPU are associated with the sheet transport platform 60 and the image forming subsystem 150, respectively. Therefore, differences from FIG. 22A reside in a process of deciding the operation specification between the respective function units and the platform controller 65, the image forming controller 160. Therefore, a description will be given a process of deciding the operation specification of the image forming subsystem between the image forming unit 170, the fixing unit 180, and image forming controller 160 on the basis of the respective inherent information of the image forming unit 170 and the fixing unit 180 as an example of the difference with reference to FIGS. 30A, 30B, 31, 32, 33A, 33B, 33C and 33D.

Reference numeral 1760 in FIGS. 30A and 30B is indicative of data based on the data structure represented by reference numeral 701 which is transmitted from the image forming controller 170 to the image forming controller 160.

In the example indicated by reference numeral 1760 shown in FIG. 30A, the image forming unit 170 is the configuration of the 4D color system. Two kinds of process speeds are defined, and a first set is "color, material: all, PS: 130 mm/sec, power consumption 300 W". A second set is "monochrome, material: all, PS: 250 mm/sec, power consumption 200 W".

A case in which the designation of the material is "all" indicates that other conditions are met with respect to all of the compliant materials. Then, the shortest sheet-to-sheet distance is 30 mm, and the lowest transport speed is 40 mm/sec. The inherent performance information is transmitted to the image forming controller 160 from the image forming unit 170 and the fixing unit 180 at a timing shown in FIG. 22B.

Figure 31:
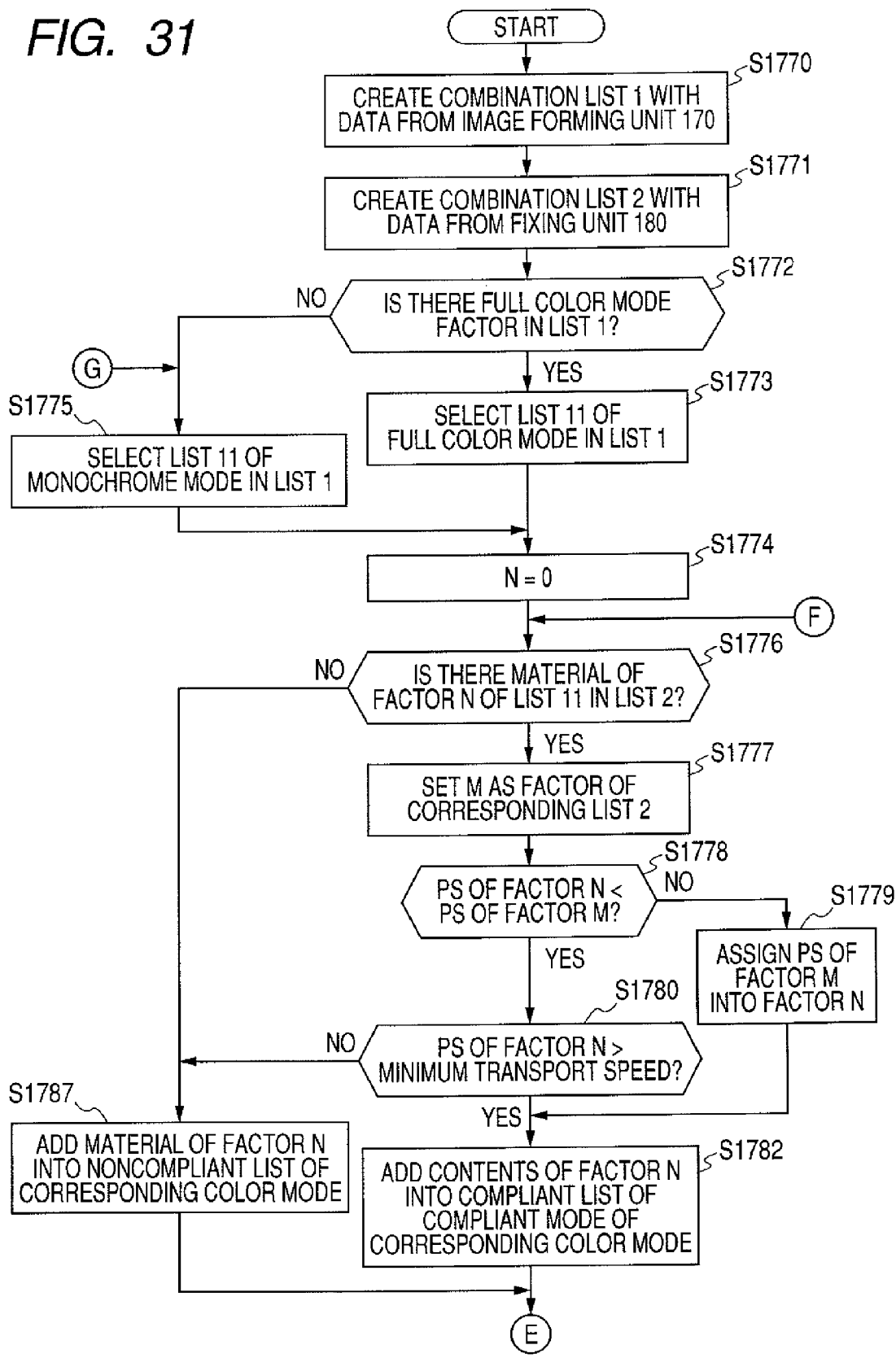
FIG. 31 is a flowchart showing a process up to transmitting a decided operation specification to the image forming unit and the fixing unit.
Figure 32:
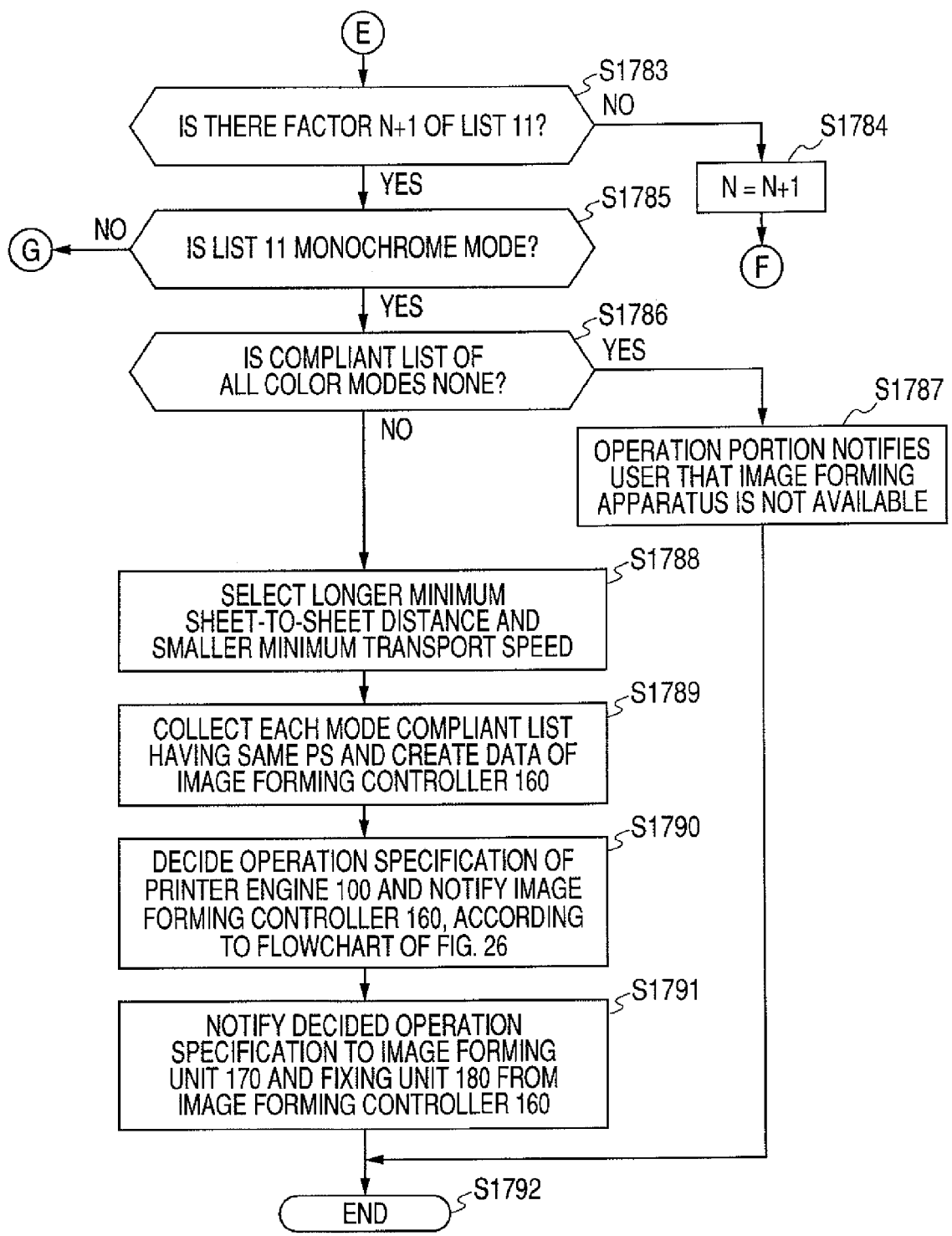
FIG. 32 is a flowchart subsequent to the flowchart shown in FIG. 31.

FIGS. 31 and 32 are flowcharts showing the processing when the image forming controller 160 produces the inherent performance information of the image forming controller 160 which is transmitted to the printer engine controller 105 from the inherent performance information that is collected from the image forming unit 170 and the fixing unit 180, and transmits the operation specification that is decided by the printer engine controller 105 to the image forming unit 170 and the fixing unit 180.

First of all, in Step S1770, the image forming controller 160 creates the combination list 1 with data of 1 set in the respective PS corresponding to the respective materials in the respective color modes from the inherent information data that has been transmitted from the image forming unit 170.

In Step S1771, the image forming controller 160 creates the combination list 2 with data from the inherent information data that has been transmitted from the fixing unit 180 as in Step S1770. In Step S1772, the image forming controller 160 determines whether a full color mode factor exists in the combination list 1, or not, that is, whether the image forming unit 170 is compliant with full color, or not. In the case where the image forming controller 160 determines that there exists the full color mode factor in Step S1772, the image forming controller 160 selects a list 11 composed of the full color mode factors as an initial value from the combination list 1 in Step S1773, and then conducts the following processing. In the case where the image forming controller 160 determines that there does not exist the full color mode factor in Step S1772, the image forming controller 160 selects a list 11 composed of the monochrome mode factor as the initial value from the combination list 1 in Step S1775, and then conducts the following processing.

First, in Step S1774, the image forming controller 160 substitutes 0 for a variable N as an argument in the post-processing. In Step S1776, the image forming controller 160 determines whether the same material as that of an N-th factor of the list 11 exists in the list 2, or not. In the case where the image forming controller 160 determines that the same material exists in the list 2 in Step S1716, the image forming controller 160 sets a variable M as a factor number of the corresponding list 2 in Step S1777.

In the case where the image forming controller 160 determines that the same material does not exist in the list 2 in Step S1776, the material of the N-th factor of the list 11 is added to the noncompliant list of the corresponding color mode in Step S1781. After that, the processing is advanced to Step S1783 that will be described later.

In Step S1778 subsequent to Step S1777, the image processing controller 160 determines whether the PS of an M-th factor in the combination list 2 is larger than the PS of the N-th factor in the list 11, or not. In the case where the image forming controller 160 determines that the result is no in Step S1778, the image forming controller 160 sets the PS value of the M-th factor of the list 2 as the PS value of the N-th factor of the list 11 in Step S1779, and the processing is advanced to the above-mentioned Step S1780. In the case where the image forming controller 160 determines that the result is yes in Step S1778, the image forming controller 160 determines whether the PS value of the factor N is larger than the lowest transport speeds of the image forming unit 170 and the fixing unit 180, or not, in Step S1780.

In the case where the image forming controller 160 determines that the result is no in Step S1780, the processing is advanced to Step S1781, and the image forming controller 160 adds the material of the N-th factor of the list 11 into the noncompliant list of the corresponding color mode. This pattern occurs in the case where a value obtained by substituting the PS of the factor M for the PS of the factor N in Step S1779 is smaller than the lowest transport speed in fact.

In the case where the image forming controller 160 determines that the result is yes in Step S1780, the image forming controller 160 adds the contents of the factor N of the list 11 to the compliant material list of the corresponding color mode in Step S1782. In this stage, the image forming controller 160 determines the PS of the intended material in the corresponding color mode. In Step S1783, the image forming controller 160 decides the PS of the intended material in the corresponding color mode. In Step S1783, the image forming controller 160 determines whether there exists the (N+1)-th factor of the list 11, or not, that is, whether there exists a remaining factor in the list to be processed, or not.

In the case where the image forming controller 160 determines that the result is yes in Step S1783, the image forming controller 160 determines whether the list 11 currently intended is the list of the monochrome mode, or not in Step S1785. In the case where the image forming controller 160 determines that the result is no in Step S1783, the image forming controller 160 rewrites the variable N to a value of N+1 in Step S1784, and the processing is returned to the above-mentioned Step S1776. In the case where the image forming controller 160 determines that the result is no in Step S1785, the processing is returned to the above-mentioned Step S1775. Then, the image forming controller 160 initializes the list to the list of the monochrome mode, and repeats the processing subsequent to Step S1774.

In the case where the image forming controller 160 determines that the result is yes in Step S1785, the processing for all factors in the intended list have been completed. As a result, the image forming controller 160 determines whether the compliant material list of all the color modes is nil, or not in Step S1786.

When the compliant material list of all the color modes is nil, this indicates that the image forming unit 170 and the fixing unit 180 have the operating conditions which conflict with each other (for example, a case in which the lower limit transport speed of the image forming unit 170 is larger than the values of all the processing speed list of the fixing unit 180).

In the case where the image forming controller 160 determines that the result is yes in Step S1786, since the image forming unit 170 and the fixing unit 180 have the operating conditions which conflict with each other, a display that the operation as the image forming apparatus is disabled is displayed on the operation portion 260. Then, the configuration communication per se is completed in Step S1792.

In the case where the image forming controller 160 determines that the result is no in Step S1786, the image forming controller 160 decides the value as the image forming subsystem 150 from the list 1 and the list 2, that is, the data "shortest sheet-to-sheet distance" of the image forming unit 170 and the fixing unit 180, and the data "lowest transport speed" in Step S1788. In this case, any larger one of two values is selected in "shortest sheet-to-sheet distance" and "lowest transport speed".

Further, "electric energy consumption" is also decided in this case. The value is a total of two values. After that, in Step S1789, the image forming controller 160 collects each the mode compliant list having the same PS (PPM also identical) which are set in the each factor of the respective compliant material lists of the full color mode (if existing) and the monochrome mode. Then, the image forming controller 160 collects the mode compliant list as data that is transmitted to the printer engine controller from the image forming controller 160, including the values of "shortest sheet-to-sheet distance" and "lowest transport speed" which are obtained in Step S1788.

Subsequently, in Step S1790, the printer engine controller 105 conducts a process of determining the operation specification of the printer engine controller 105 from the data of the image forming controller 160 and the data of the platform controller 65, and notifies the image forming controller 160 of the determined results.

After that, in Step S1791, the image forming controller 160 transmits the operation specification of the printer engine controller 105 which has been received in Step S1790 to the image forming unit 170 and the fixing unit 180. The respective units recognize so as to operate according to the decided operation specification, and a series of processing is completed in Step S1792.

Subsequently, a description will be given of an example of a case in which the inherent information data of the image forming controller 160 is decided according to the inherent information data of the image forming unit 170 and the fixing unit 180 of this embodiment based on the flowcharts of FIGS. 31 and 32, and its results with reference to FIGS. 33A, 33B, 33C, 33D and 35.

Reference numeral 1762 of FIG. 33A is a list at the time of the full color mode of the combination list 1 of the image forming unit 170 in Step S1770 in the flowcharts of FIGS. 31 and 32.

Reference numeral 1763 of FIG. 33B is a list of the monochrome mode. Reference numeral 1764 of FIG. 33C is a list at the time of the full color mode of the combination list 2 of the fixing unit 180 in Step S1771 in the flowcharts shown in FIGS. 31 and 32. Reference numeral 1765 of FIG. 33D is a list at the monochrome mode, likewise.

Data indicated by reference numeral 1766 shows the results of applying the processing of the flowcharts shown in FIGS. 31 and 32 to the respective factors of the lists 1762, 1763, 1764, and 1765. The results obtained on the basis of the color mode, the material, the PS, the shortest sheet-to-sheet distance, the lowest transport speed, and the electric energy consumption are "full color, PS: 130 mm/sec, compliant material: normal, recycle paper, electric energy consumption: 1100 W", "full color, PS: 70 mm/sec, compliant material: thick paper, OHT, electric energy consumption: 900 W", "monochrome, PS: 250 mm/sec, compliant material: ALL, electric energy consumption: 1000 W", and "shortest sheet-to-sheet distance: 45 mm, lowest transport speed: 50 mm/sec". Also, the noncompliant material list is not generated in the parameter of this embodiment. The sheet transport platform 60 and the image forming subsystem 150 can be made up of finer function units. The inherent information can be held on the function unit basis, and in this case, it is possible that the inherent information is constructed in the order of the finer basis, and the operation specification of the printer engine 100 can be finally decided.

In this embodiment, not only the accessory of the image forming apparatus and the option of the function improvement, but also the subsystem that is the image forming unit that combines the function unit (that is, the image forming unit or the fixing unit made up of the photosensitive drum, ITB, developing unit, and the like) which constitutes the image forming apparatus main body, and the platform that is a sheet transport unit that feeds and transports the sheet for forming the image are interchangeable, respectively. Then, because the subsystem and the platform can be interchanged, respectively, the inherent information related to the performance is provided, and the operation specification of the entire image forming apparatus is decided by the combination of the inherent information.

The image forming apparatus including the platform and the subsystem has the performance information, respectively, and the available operation specification is calculated from the two performance information items to decide the specification of the image forming apparatus per se. As a result, the maximum performance can be brought out without providing the specification data of the combination in advance.

In addition, the performance information is provided in each of the units that constitute the respective subsystem/platform, individually, and after the performance information of the respective subsystem/platform is calculated from the information, the specification of the image forming apparatus per se can be decided. As a result, the interchange or upgrade of the unit basis can be more flexibly conducted. Also, the maximum performance can be brought out without providing the specification data of the combination in advance. Not parts composed of only the predetermined combination, but the available specification can be brought out from the information of the structural factors, so that the parts can operate without any problem even if the parts are interchanged on the fine unit basis, to thereby improve the flexibility as the products.

In the above description, this embodiment is applied to a method in which when the printer engine controller 105 decides the operation specification of the printer engine 100, the printer engine controller 105 selects the parameter that is performed commonly from the respective inherent information of the sheet transport platform 60 and the image forming subsystem 150, and a numeric value such as the PPM is calculated according to the selected parameter. Alternatively, there may be adopted a method in which the printer engine controller 105 produces a plurality of operation specification data tables in advance, and selects the parameter to be performed on the basis of the inherent information notified from the sheet transport platform 60 and the image forming subsystem 150.

Second Embodiment

In a second embodiment, a description will be given of a system in which the printer engine controller 105 operates with the same CPU resource as that of the platform controller 65.

Figure 36:
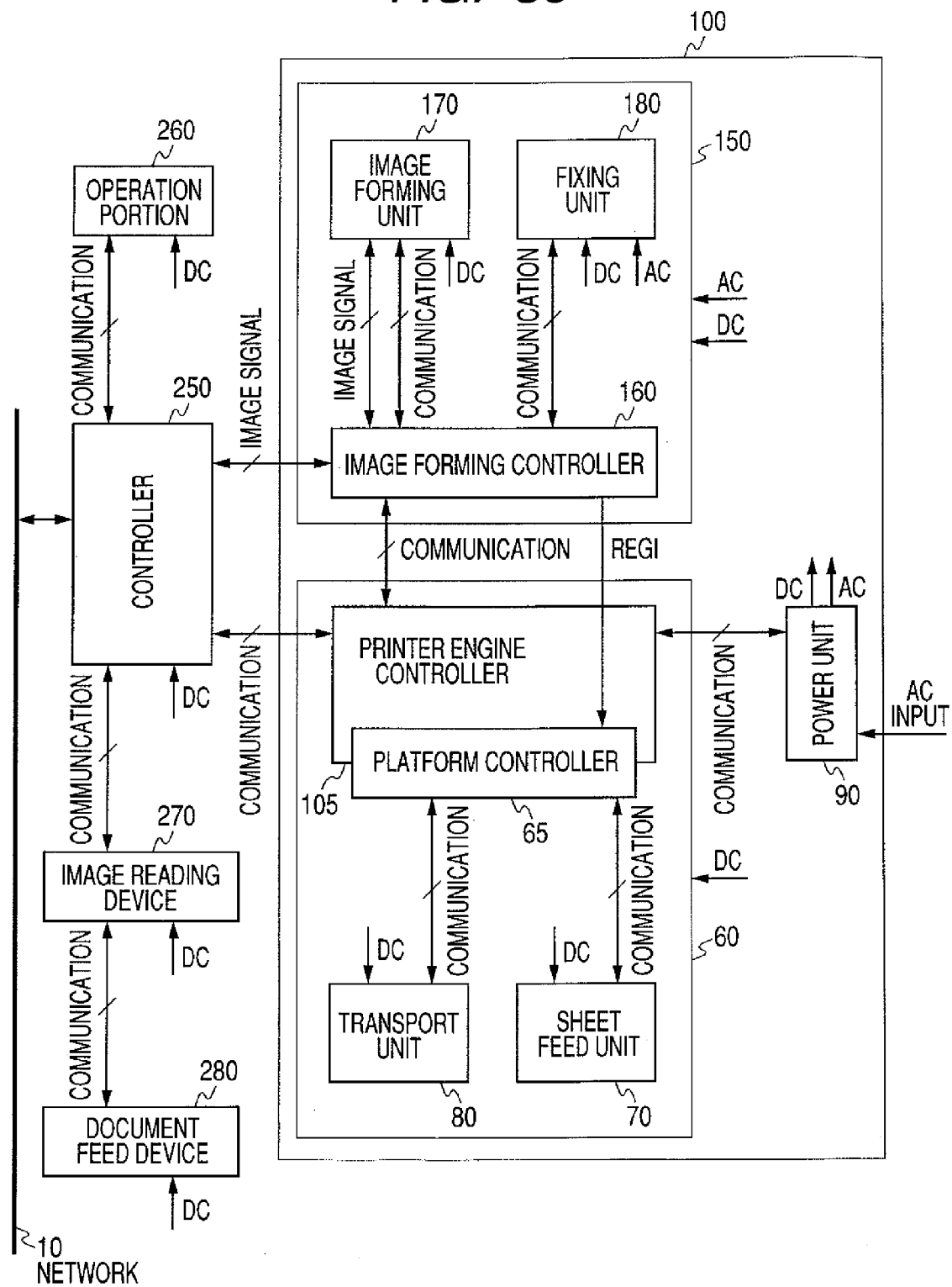
FIG. 36 is a block diagram showing an overall electric connection configuration of an image forming apparatus according to the second embodiment.

FIG. 35 is a schematic diagram showing the overall hardware configuration of an image forming apparatus according to a second embodiment of the present invention. FIG. 36 is a block diagram showing the entire electric connection configuration of the image forming apparatus according to the second embodiment.

Referring to FIG. 36, the printer engine controller 105 controls the control information of the platform controller 65 included therein, the control information of the image forming subsystem which is obtained by communication with the image forming controller 160, and the control information of the power unit which is obtained from the power unit 90. As another method, the same connection and control as those described with reference to FIGS. 1, 2, 3, 4, 5A, 5B, 6A, 6B, 7A, 7B, 8, 9A, 9B, 10, 11, 12 and 13 can be conducted.

In the above description, the units having the control unit with a CPU and the units having no CPU exist as the respective units within the transport platform 60 and the respective units within the image forming subsystem 150. The combination of the respective units each having the CPU and no CPU is not limited by the above description, but is appropriately set according to the control contents of the units.

Also, in the above description, the printer engine 100 is made up of two components composed of the sheet transport platform 60 and the image forming subsystem 150. Two units composed of the sheet feed unit 70 and the transport unit 80 exist within the sheet transport platform 60, and the image forming unit 170 and the fixing unit 180 exist within the image forming subsystem 150. However, the configuration of the subsystem within the printer engine and the configuration of the units within the subsystem are not limited to the above-mentioned system, and are appropriately set according to the control contents of the subsystem and the units.

This embodiment can obtain the same effect as those in the first embodiment.

Also, the object of the present invention is achieved by supplying a recording medium that records the program code of the software which realizes the functions of the embodiments to the system or the device, and then reading and executing the program code stored in the recording medium by the computer (or a CPU or an MPU) in the system or the device.

In this case, the program code per se that is read out of the recording medium realizes the above-mentioned function of the embodiment, and the storage medium that stores the program code and the program code therein constitutes the present invention.

Also, as the storage medium for supplying the program code, there can be applied, for example, a floppy disk, a hard disk, a magnet-optical disk, a CD-ROM, a CD-R, a CD-RW, a DVD-ROM, DVD-RAM, a DVD-RW, a DVD+RW, a magnetic tape, a nonvolatile memory card, or a ROM. Alternatively, the program code may be downloaded on the network.

Also, the present invention includes a case where, with the execution of the program code that is read by the computer, not only the functions of the above embodiment are not realized, but also the OS (operating system) or the like that runs on the computer conducts a part or all of the actual processing, and the functions of the above embodiments are executed by the processing.

In addition, the present invention includes a case in which after the program code that has been read from the storage medium has been written in a memory of a function enhancement board that is inserted in the computer or a function enhancement unit that is connected to the computer, a CPU or the like provided in the function enhancement board or the function enhancement unit execute a part or all of the actual processing on the basis of an instruction of the program code, and this processing realizes the functions of the above embodiments.

In this case, the above-mentioned program is supplied directly from a recording medium that stores the program therein, or by downloading another computer (not shown) or database which is connected to the Internet, the commercial network, or the local network.

The present invention can be applied to a system constituted by a plurality of devices, or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2005-259780, filed Sep. 7, 2005, and 2006-205676, filed Jul. 28, 2006, which are hereby incorporated by reference herein in their entirety.

What is claimed is:

1. An image forming apparatus comprising:
   an attached image forming subsystem that is interchangeable and comprises an image bearing member, an exposure device, a charging device, and a developing device, the attached image forming subsystem being detachable from the image forming apparatus;
   an attached sheet transport subsystem that is interchangeable and transports sheet material within the image forming apparatus, the attached sheet transport subsystem being detachable from the image forming apparatus; and a deciding unit which decides an operation specification of the image forming apparatus according to information stored within and transmitted from the attached image forming subsystem and the attached sheet transport subsystem, wherein the image forming apparatus is capable of attaching a different image forming subsystem and a different sheet transport subsystem that are different in performance than the attached image forming subsystem and the attached sheet transport subsystem, respectively.

2. An image forming apparatus according to claim 1,
wherein the attached image forming subsystem has a plurality of units that are interchangeable, respectively, and is capable of selectively attaching units that are different in performance from each other, and wherein the deciding unit decides the operation specification of the image forming apparatus also according to information about an attached interchangeable unit attached to the image forming subsystem.

3. An image forming apparatus according to claim 1,
wherein the attached sheet transport subsystem has a plurality of units that are interchangeable, respectively, and is capable of selectively attaching units that are different in performance from each other, and wherein the deciding unit decides the operation specification of the image forming apparatus also according to information about an attached interchangeable unit attached to the sheet transport subsystem.

4. An image forming apparatus according to claim 1,
wherein the attached image forming subsystem has a plurality of units that are interchangeable, respectively, and is capable of selectively attaching units that are different in performance from each other, wherein the attached sheet transport subsystem has a plurality of units that are interchangeable, respectively, and is capable of selectively attaching units that are different in performance from each other, and wherein the deciding unit decides the operation specification of the image forming apparatus also according to information about an attached interchangeable unit attached to the image forming subsystem and information about an attached interchangeable unit attached to the sheet transport subsystem.

5. An image forming apparatus according to claim 1, wherein the deciding unit decides the operation specification of a process speed which is a rotating speed of the image bearing member when the attached image forming apparatus forms an image.

6. An image forming apparatus according to claim 5,
wherein the deciding unit receives, from the attached image forming subsystem, a first process speed at which the attached image forming subsystem is operable and first performance information including an operating condition of the attached image forming subsystem at the first process speed, wherein the deciding unit receives, from the attached sheet transport subsystem, a second process speed at which the attached sheet transport subsystem is operable and second performance information including an operating condition of the attached sheet transport subsystem at the second process speed, and wherein the deciding unit decides a third process speed at which the attached image forming subsystem and the attached sheet transport subsystem are both operable, and decides an operation specification of the third process speed at least by referring to the first and second performance information.

7. An image forming apparatus, comprising:

an attached image forming subsystem that is interchangeable and which includes a plurality of units that are interchangeable, respectively, and is capable of selectively attaching units that are different in performance from each other, the attached image forming subsystem being detachable from the image forming apparatus;

an attached sheet transport subsystem that is interchangeable and which includes a plurality of units that are interchangeable, respectively, and is capable of selectively attaching units that are different in performance from each other, the attached sheet transport subsystem being detachable from the image forming apparatus; and a deciding unit which decides an operation specification of the image forming apparatus according to information stored within and transmitted from the attached image forming subsystem and the attached sheet transport subsystem, wherein the information stored within and transmitted from the attached image forming subsystem includes information about an attached interchangeable unit attached to the attached image forming subsystem, and wherein the information stored within and transmitted from the attached sheet transport subsystem includes information about an attached interchangeable unit attached to the attached image forming subsystem.

8. An image forming apparatus according to claim 7, wherein the deciding unit calculates a value associated with an activity performed commonly by the image forming apparatus on the basis of the information stored by and transmitted from the image forming subsystem and the sheet transport subsystem, and decides the operation specification of the image forming apparatus on the basis of the calculated value.

9. An image forming apparatus according to claim 7, wherein the deciding unit decides the operation specification of the image forming apparatus from a predetermined reference table on the basis of the information stored by and transmitted from the image forming subsystem and the sheet transport subsystem.

\* \* \* \* \*